US012098095B2

(12) United States Patent
Gross et al.

(10) Patent No.: US 12,098,095 B2
(45) Date of Patent: Sep. 24, 2024

(54) AUTOMOTIVE GLASS COMPOSITIONS, ARTICLES AND HYBRID LAMINATES

(71) Applicant: CORNING INCORPORATED, Corning, NY (US)

(72) Inventors: Timothy Michael Gross, Corning, NY (US); Zhongzhi Tang, Guangdong (CN); Lisa Anne Tietz Moore, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 622 days.

(21) Appl. No.: 17/313,566

(22) Filed: May 6, 2021

(65) Prior Publication Data

US 2021/0253471 A1 Aug. 19, 2021

Related U.S. Application Data

(62) Division of application No. 16/002,276, filed on Jun. 7, 2018, now Pat. No. 11,028,007.

(60) Provisional application No. 62/523,395, filed on Jun. 22, 2017.

(51) Int. Cl.
| | |
|---|---|
| *C03C 3/087* | (2006.01) |
| *B32B 17/10* | (2006.01) |
| *C03C 3/085* | (2006.01) |
| *C03C 3/097* | (2006.01) |
| *C03C 21/00* | (2006.01) |

(52) U.S. Cl.
CPC ........ *C03C 3/087* (2013.01); *B32B 17/10119* (2013.01); *B32B 17/10137* (2013.01); *C03C 3/085* (2013.01); *C03C 3/097* (2013.01); *C03C 21/002* (2013.01)

(58) Field of Classification Search
CPC ......... C03C 3/085; C03C 3/087; C03C 3/097; C03C 2/00; C03C 21/002; C03C 21/00; B32B 17/10119; B32B 17/10137
See application file for complete search history.

(56) References Cited

U.S. PATENT DOCUMENTS

| | | | | |
|---|---|---|---|---|
| 2011/0014475 | A1 ‡ | 1/2011 | Murata | C03B 17/064 428/410 |
| 2014/0023865 | A1 | 1/2014 | Comte et al. | |
| 2015/0044473 | A1 ‡ | 2/2015 | Murata | C03C 3/083 428/410 |
| 2015/0140299 | A1 | 5/2015 | Ellison et al. | |
| 2015/0314571 | A1* | 11/2015 | Cites | C03C 3/097 501/63 |
| 2016/0090321 | A1 | 3/2016 | Bookbinder et al. | |
| 2016/0251255 | A1 | 9/2016 | Gross et al. | |
| 2016/0251256 | A1 | 9/2016 | Comte et al. | |
| 2016/0264864 | A1 | 9/2016 | Dejneka et al. | |
| 2016/0354996 | A1* | 12/2016 | Alder | B32B 17/10091 |
| 2018/0327303 | A1 | 11/2018 | Gross | |

FOREIGN PATENT DOCUMENTS

| | | |
|---|---|---|
| CN | 1886348 A | 12/2006 |
| CN | 104703937 A | 6/2015 |
| CN | 105408109 A | 3/2016 |
| JP | 2009-084076 A | 4/2009 |
| JP | 2010-527892 A | 8/2010 |
| JP | 2014-015349 A | 1/2014 |
| JP | 2015-527970 A | 9/2015 |
| JP | 2016-113340 A | 6/2016 |
| JP | 2016-529194 A | 9/2016 |
| JP | 2016-529199 A | 9/2016 |
| JP | 2016-537286 A | 12/2016 |
| JP | 2016-538221 A | 12/2016 |
| JP | 2017-506616 A | 3/2017 |
| WO | WO-2014014798 A1 ‡ | 1/2014 |
| WO | 2014/166250 A1 | 10/2014 |
| WO | WO-2016057590 A1 ‡ | 4/2016 |
| WO | WO-2016138329 A1 ‡ | 9/2016 |
| WO | WO-2018098135 A1 ‡ | 5/2018 |
| WO | WO-2018102172 A1 ‡ | 6/2018 |
| WO | WO-2018102173 A1 ‡ | 6/2018 |

OTHER PUBLICATIONS

Chinese Patent Application No. 201880041567.X, Office Action, Office Action, dated Apr. 13, 2022, 14 pages (7 pages of English Translation and 7 pages of Original Document), Chinese Patent Office.
Japanese Patent Application No. 2019-569748, Office Action, dated May 18, 2022, 06 pages (03 pages of English Translation and 03 pages of Original Copy); Japanese Patent Office.
International Search Report and Written Opinion PCT/US2018/038995 Dated Sep. 19, 2018.
Japanese Patent Application No. 2019-569748, Office Action dated Dec. 27, 2021, 10 pages (5 pages of English Translation and 5 pages of Original Document), Japanese Patent Office.
Japanese Patent Application No. 2022-152325, Office Action, dated Nov. 29, 2023, 6 pages (3 pages of English Translation and 3 pages of Original Copy); Japanese Patent Office.

\* cited by examiner
‡ imported from a related application

*Primary Examiner* — Elizabeth A. Bolden
(74) *Attorney, Agent, or Firm* — William M. Johnson; Payal A. Patel; Kevin M. Able

(57) ABSTRACT

Embodiments of glass articles comprising an anneal point (° C.) and a softening point (° C.), and the relationship of (anneal point+softening point)/2 in a range from about 625° C. to about 725° C. are disclosed. In one or more embodiments, the glass articles include a glass composition including $SiO_2$ in an amount in a range from about 63 mol % to about 75 mol %; $Al_2O_3$ in an amount in a range from about 7 mol % to about 13 mol %; $R_2O$ in an amount from about 13 mol % to about 24 mol %; $P_2O_5$ in an amount in a range from about 0 mol % to about 3 mol %, and one or both of MgO and ZnO. Laminates including such glass articles, and methods for making such laminates are also disclosed.

22 Claims, 11 Drawing Sheets

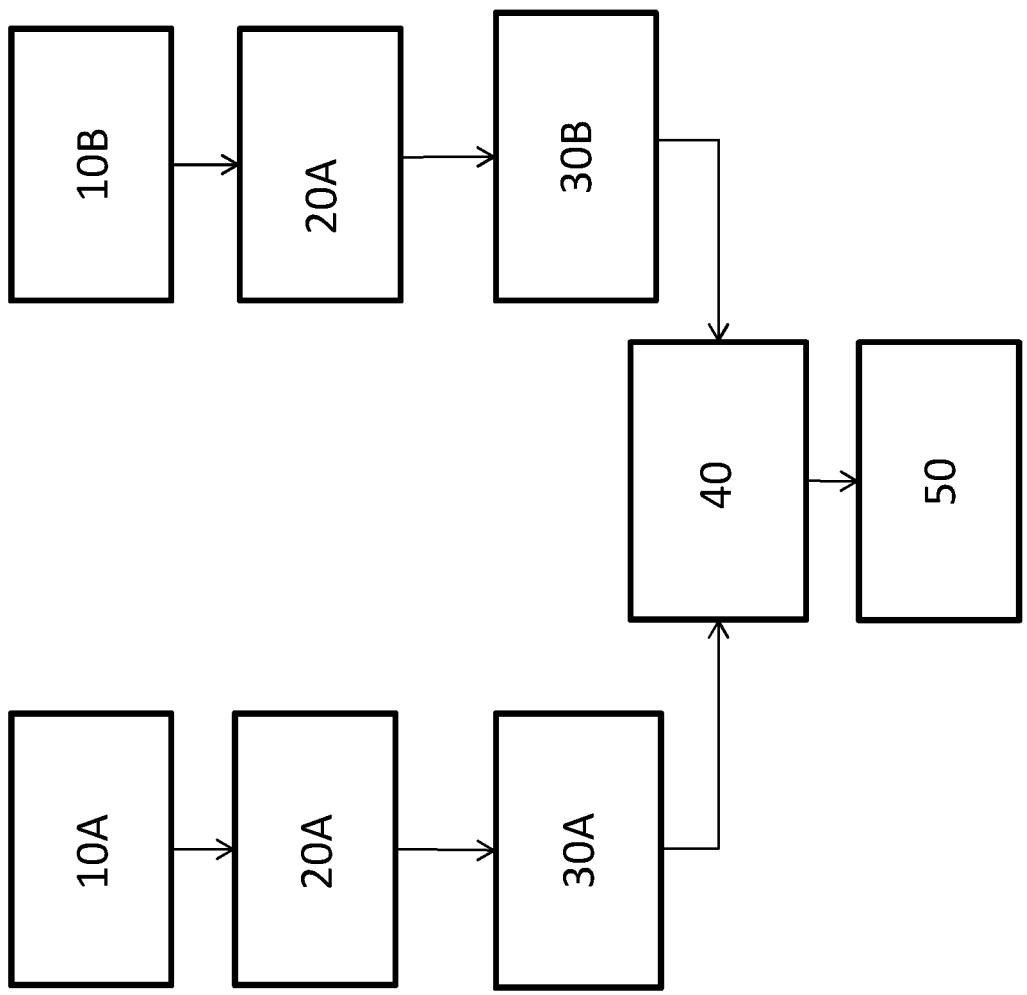

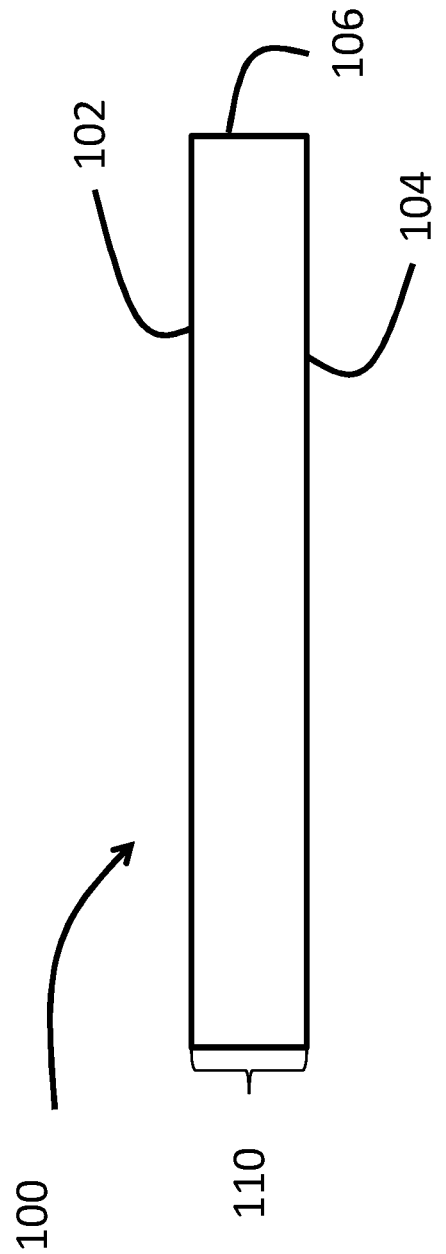

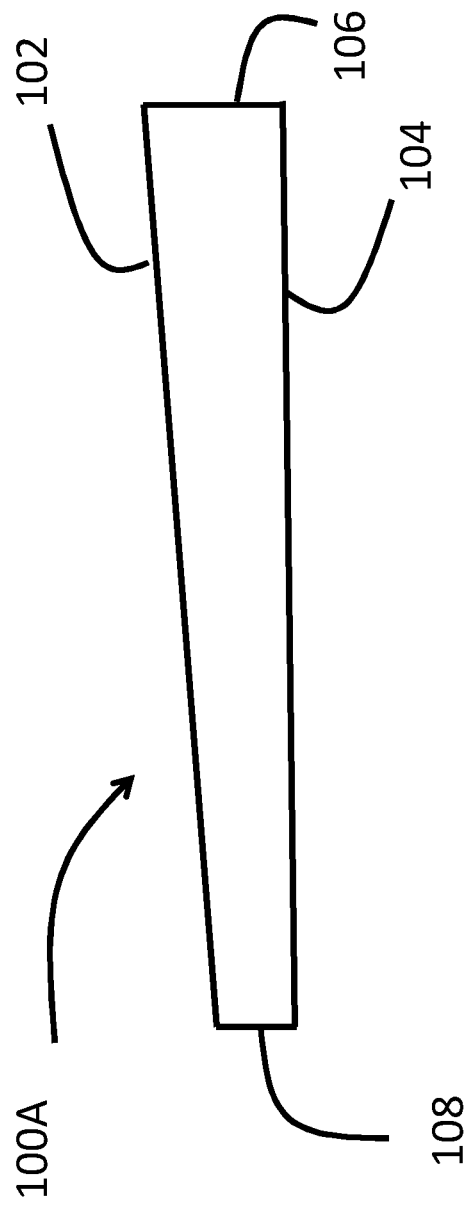

AUTOMOTIVE GLASS COMPOSITIONS, ARTICLES AND HYBRID LAMINATES

CROSS-REFERENCE TO RELATED APPLICATIONS

This application is a divisional of U.S. application Ser. No. 16/002,276 filed on Jun. 7, 2018 which claims the benefit of priority under 35 U.S.C. § 119 of U.S. Provisional Application Ser. No. 62/523,395 filed on Jun. 22, 2017, the content of which is relied upon and incorporated herein by reference in its entirety.

BACKGROUND

The disclosure relates to glass compositions and laminates, and more particularly to glass compositions, glass articles and laminates exhibiting bending properties for use in automotive and architectural applications.

Glass is used in windows due to its optical clarity and durability. Automotive and architectural windows (or glazing) may include a single glass article (in sheet form) referred to as a monolith, or a laminate that includes two glass articles (in sheet form) with an interlayer of a polymeric material disposed in between. This glazing can be used as a windshield, side lite, rear window, sunroofs and the like in automotive applications. Architectural applications may utilize similar glazings in buildings, panels, walls and the like.

As shown in FIG. 1A, the method of making a curved or shaped laminated glazing includes forming two glass articles 10A, 10B (typically soda lime glass (SLG) sheets made via a float process), cutting and finishing the glass articles 20A, 20B, placing one glass article on top of the other glass article and heating the stack of glass articles to a temperature ("sag temperature") at which the glasses sag together to the desired shape. As used herein, "sag temperature" means the temperature at which the log viscosity of the glass article is 9.9 Poise. The sag temperature is determined by fitting the Vogel-Fulcher-Tamman (VFT) equation: Log h=A+B/(T−C), where T is the temperature, A, B and C are fitting constants and h is the dynamic viscosity, to annealing point data measured using the bending beam viscosity (BBV) measurement, to softening point data measured by fiber elongation. When glass articles are sagged together when stacked on top of one another, the process is referred to as "pair sagging") 30. In one or more embodiments, the method further includes separating the two pair sagged glass articles (typically after the shaped stack is cooled), applying an interlayer between the two glass articles, and heating the three-layer stack (including the two pair sagged glass articles and intervening interlayer) to create the laminate 50. The individual soda lime glass (SLG) glass articles in this laminate construction typically have a thickness of about 1.6 mm or greater or about 2.1 mm or greater.

There is a trend toward using lightweight laminates glazing to improve fuel economy. New glazing designs consisting of a thicker outer glass article and a thin inner glass article. In one construction, the thicker glass article is SLG and the thinner glass article is a strengthened glass article. The SLG articles can be annealed but not otherwise strengthened to a level believed acceptable to compensate for strength degradation due to reduction in thickness. For example, even when chemically strengthened, SLG articles do not exhibit sufficient strength attributes (in terms of compressive stress and depth of compressive stress).

Thermal tempering is commonly used to strengthen thick, monolithic glass articles and has the advantage of creating a deep compressive layer on the glass surface, typically 21% of the overall glass thickness; however the magnitude of the compressive stress is relatively low, typically less than 100 MPa. Furthermore, thermal tempering becomes increasingly ineffective for thin glass articles (i.e., glass articles having a thickness of less than 2 mm). As such, standard thermal tempering process(es) are suitable for strengthening SLG articles having a thickness of about 3 mm but not thin SLG articles. Moreover, SLG articles have poor chemical strengthening characteristics.

Aluminosilicate glass articles are uniquely suited for use as the thinner glass article, especially those articles meeting in today's glazing optical requirements. In particular, aluminosilicate glasses compositions that can be formed into very thin glass articles via down draw processes (such as fusion forming processes). Moreover, aluminosilicate glass articles can be strengthened (in particular, chemical strengthened) to exhibit a wide range of compressive stresses (e.g., up to and even exceeding 1,000 MPa) and deep depths of compressive stress (e.g., up to and even exceeding 18% or 20% or the thickness of the glass articles).

Known aluminosilicate glasses tend to exhibit high viscosity relative to SLG articles at the SLG sag temperature (i.e., the temperature at which SLG is typically sagged). Accordingly, this viscosity difference means known aluminosilicate glass articles must be sagged separately, as shown in FIG. 1B, and cannot be pair sagged, which adds cost to the overall manufacturing process. In particular, FIG. 1B shows that when the glass articles cannot be pair sagged, the method by which laminate glazing is made includes an additional step of sagging the glass articles separately, instead of a single sagging step. Specifically, the method includes forming two glass articles 10A, 10B, cutting and finishing the glass articles 20A, 20B, heating each glass article to a sag temperature to sag each glass article separately to the desired shape 30A, 30B. Use of the method of FIG. 1B could result in shape mismatch between the two glass articles from the separate sagging steps. Further by using two separate sagging steps, twice as much energy and time is utilized.

Accordingly, there is a need for a thin glass article that can be pair sagged with another glass article that may differ in composition, strengthened to a sufficient degree, and is optionally, fusion-formed.

SUMMARY

This disclosure relates to glass compositions and glass articles having such glass compositions, which can be pair sagged with different glass articles (which include glass articles formed by a non-fusion processes, and glass articles made from SLG compositions). In some embodiments, glass compositions can be fusion formed or are fusion formable into glass articles. In one or more embodiments, the glass articles can be strengthened or are strengthened. Laminates that include such glass articles and methods for forming such laminates are also disclosed.

A first aspect of this disclosure pertains to a glass article comprising a glass composition that includes $SiO_2$ in an amount in a range from about 63 mol % to about 75 mol %, $Al_2O_3$ in an amount in a range from about 7 mol % to about 13 mol % (or from about 8 mol % to about 11 mol %), $R_2O$ in an amount from about 13 mol % to about 24 mol %, and $P_2O_5$ in an amount in a range from about 0 mol % to about 3 mol %. Unless otherwise specified, $R_2O$ refers to the total amount of alkali metal oxides including $Li_2O$, $Na_2O$, $K_2O$, $Rb_2O$, and $Cs_2O$. In one or more embodiments, the glass composition includes one or both of MgO and ZnO. When the glass composition includes MgO, it is present in an amount in a range from about 0 mol % to about 7 mol %. In some embodiments, MgO is present in an amount in a range from about 0 mol % to about 3 mol %. When the glass composition includes ZnO, it is present in an amount in a range from about 0 mol % to about 7 mol %. In some embodiments, ZnO is present in an amount in a range from about 0 mol % to about 5 mol %.

The glass composition of one or more embodiments may include $Na_2O$ in an amount in a range from about 12 mol % to about 18 mol %. In one or more embodiments, the glass composition includes $K_2O$ in an amount in a range from about 1 mol % to about 3.5 mol %. In some embodiments, the glass composition further comprises CaO in an amount in a range from about 0.01 mol % to about 4 mol %. In some embodiments, In one or more embodiments, the glass article comprises an anneal point temperature (° C.) and a softening point temperature (° C.), and the relationship of half the combination of anneal point temperature and softening point temperature ((anneal point temperature+softening point temperature)/2) is in a range from about 625° C. to about 725° C. In some embodiments, the relationship of (anneal point+softening point)/2 of the glass article equals less than about 700° C. In some embodiments, the glass article comprises a temperature (° C.) at a viscosity of 200 poises ($T_{200}$) and a temperature (C) at a viscosity of 35000 poise ($T_{35000}$), and wherein difference therebetween ($T_{200}-T_{35000}$) has a magnitude in a range from about 400° C. to about 600° C. In one or more embodiments, the glass article comprises a $T_{200}$, and wherein the difference between the relationship (anneal point temperature+softening point temperature)/2 and $T_{200}$ is less than −800° C. In some embodiments, the glass article comprises a $T_{35000}$, and wherein the difference between the relationship (anneal point temperature+softening point temperature)/2 and $T_{35000}$ is less than −300° C. The glass article according to one or more embodiments comprises a $T_{200}$ value, a $T_{35000}$ value, or $T_{200}$ and $T_{35000}$ values that are greater than about 1030° C. In one or more embodiments, the glass article may comprise a sag temperature in a range from about 620° C. to about 720° C.

In one more embodiments, the glass article (or the glass composition used to form the glass article) comprises a liquidus viscosity that is greater than about 100 kiloPoise (kP). In some instances, the glass article (or the glass composition used to form the glass article) comprises a zircon breakdown viscosity that is less than about 35 kP.

The glass article of one or more embodiments may be strengthened. In some instances, the glass article is fusion formed, as described herein.

A second aspect of this disclosure pertains to a glass article that includes a glass composition comprising $Al_2O_3$ in an amount greater than 2 mol %, wherein the glass article comprises an anneal point temperature (° C.) and a softening point temperature (° C.), and the relationship of (anneal point temperature+softening point temperature)/2 is in a range from about 625° C. to about 725° C. In some instances, the anneal point temperature may be less than about 580° C. In one or more embodiments, the glass article comprises a softening point temperature in a range from about 725° C. and 860° C.

In one or more embodiments, the glass composition or the glass articles formed from those compositions may comprise a $T_{35000}$, of greater than about 1000° C. In one or more embodiments, the glass composition or the glass articles formed from those compositions may comprise a $T_{200}$ of greater than about 900° C. In one or more embodiments, the glass composition or the glass articles formed from those compositions comprises a strain point temperature of less than about 530° C.

In one or more embodiments, the glass composition comprises an $R_2O$ amount that is equal to or greater than about 5 mol %. In some embodiments, the glass composition includes an $R_2O$ amount in a range from about 5 mol % to about 20 mol %.

In one or more embodiments, the glass composition may include a specific amount of RO. Unless otherwise specified, RO refers to the total amount of alkaline earth metal oxides such as MgO, CaO, SrO, BaO, ZnO and the like. In one or more embodiments, the glass composition includes one or both of MgO and ZnO. In one or more embodiments, the amount of MgO is in a range from about 0 mol % to about 7 mol %. In one or more embodiments, the amount of ZnO is in a range from about 0 mol % to about 7 mol %.

The glass composition or the glass articles formed from those compositions of one or more embodiments comprises a density of about 2.6 g/cm³ or less. In some instances, the glass articles may be strengthened. In some instances, the glass article is fusion formed.

A third aspect of this disclosure pertains to a vehicle comprising a body defining an interior and an opening in communication with the interior; a glass article disposed in the opening. The glass article comprises a glass composition including $Al_2O_3$ in an amount greater than 2 mol %, an anneal point temperature (° C.), and a softening point temperature (° C.), wherein the relationship of (anneal point temperature+softening point temperature)/2 is in a range from about 625° C. to about 725° C. The glass article (or composition used to form the glass article) may exhibit an anneal point temperature of less than about 600° C. In some instances, the glass article (or composition used to form the glass article) further comprises a strain point temperature of less than about 550° C. The glass article (or composition used to form the glass article) may comprise a sag temperature in a range from about 600° C. to about 700° C. The density of the glass article (or composition used to form the glass article) may be about 2.6 g/cm³ or less. In some embodiments, the glass article (or composition used to form the glass article) comprises a softening point in a range from about 725° C. and 860° C. In some embodiments, the glass article comprises a $T_{35000}$ of greater than about 1000° C. In one or more embodiments, the glass article further comprises a $T_{200}$ of greater than about 900° C.

In one or more embodiments, the glass article comprises a glass composition as otherwise described herein. For example, in some embodiments, the glass composition includes $R_2O$ in an amount of about 16 mol % or greater. In some instances, the glass composition comprises an alkali metal oxide selected from $Li_2O$, $Na_2O$ and $K_2O$, wherein such alkali metal oxide is present in an amount greater than about 5 mol %. In some instances, the glass composition comprises a total amount of amount of alkali metal oxides which includes $Li_2O$, $Na_2O$, $K_2O$ only, in a range from about 5 mol % to about 24 mol % or from about 17 mol % to about 24 mol %. The glass article may be strengthened in some embodiments. In some instances the glass article is fusion formed.

A fourth aspect of this disclosure pertains to a laminate comprising: a first glass layer, an interlayer disposed on the first glass layer, and a second glass layer disposed on the interlayer opposite the first glass layer wherein either one or both the first glass layer and the second glass layer comprises an embodiment of the glass articles described herein. In one or more embodiments, either one of or both the first glass layer and the second glass layer has a thickness less than about 1.6 mm. In one or more embodiments, the first glass layer comprises an embodiment of the glass articles described herein, and has a thickness of less than about 1.6 mm. In some particular embodiments, the second glass layer comprises a thickness of 1.6 or greater. Optionally, the second glass layer differs compositionally from the first glass layer (e.g., the first glass layer comprises an embodiment of the glass composition described herein, and the second glass layer comprises SLG).

A fifth aspect of this disclosure pertains to laminate including a first curved glass layer comprising a first major surface, a second major surface opposing the first major surface, and a first thickness defined as the distance between the first major surface and second major surface, a second curved glass layer comprising a third major surface, a fourth major surface opposing the third major surface, and a second thickness defined as the distance between the third major surface and the fourth major surface, and an interlayer disposed between the first curved glass layer and the second curved glass layer and adjacent the second major surface and third major surface.

In one or more embodiments, the first curved glass layer comprises a first sag depth of about 2 mm or greater (e.g., from about 5 mm to about 30 mm), and the second curved glass layer comprises a second sag depth of about 2 mm or greater (e.g., from about 5 mm to about 30 mm). In one or more embodiments, the second surface forms a concave surface and the third surface forms a concave surface, and vice versa.

In one or more embodiments, the first sag depth is within 10% of the second sag depth and a shape deviation between the first glass layer and the second glass layer of +5 mm or less (e.g., about ±1 mm or less, or about ±0.5 mm or less), as measured by an optical three-dimensional scanner.

The first glass layer comprises a first viscosity and the second glass layer comprises a second viscosity. In one or more embodiments, the first viscosity at 630° C. is greater than the second viscosity at a temperature of 630° C. (e.g., at a temperature of about 630° C., the first viscosity is in a range from about 10 times the second viscosity to about 750 times the second viscosity).

In one or more embodiments, one of or both the first major surface and the fourth major surface comprises an optical distortion of less than 200 millidiopters (or about 100 millidiopters or less) as measured by an optical distortion detector using transmission optics according to ASTM 1561. In some embodiments, the third major surface or the fourth major surface comprises a membrane tensile stress of less than 7 MPa (e.g., about 5 MPa or less or about 3 MPa or less) as measured by a surface stressmeter, according to ASTM C1279.

In accordance with one or more embodiments, the first curved glass layer comprises the glass article described herein. The first thickness may be less than the second thickness. For example, the first thickness may be from about 0.1 mm to less than about 1.6 mm, and the second thickness may be in a range from about 1.6 mm to about 3 mm.

The first curved glass layer may exhibit a sag temperature that differs from the second sag temperature. The magnitude of the difference between the first sag temperature and the second sag temperature is in a range from about 30° C. to about 150° C. In one or more embodiments, the laminate is substantially free of visual distortion as measured by ASTM C1652/C1652M.

Optionally, the first curved glass layer is strengthened (e.g., chemically strengthened, mechanically strengthened or thermally strengthened). The second glass curved layer may be unstrengthened or may be strengthened. In one or more embodiments, the second curved glass layer comprises a soda lime silicate glass.

The first curved glass layer may have a first length and a first width, either one of or both the first length and the first width is about 0.25 meters or greater. In one or more embodiments, the second curved glass layer comprises a second length that is within 5% of the first length, and a second width that is within 5% of the first width. The laminate may be simply curved (as defined herein) or complexly curved (as defined herein), and may optionally be an automotive glazing or architectural glazing.

Another aspect pertains to a vehicle comprising: a body defining an interior and an opening in communication with the interior; and the laminate described herein disposed in the opening. Such laminate may be complexly curved.

Unless otherwise specified, the glass compositions disclosed herein are described in mole percent (mol %) as analyzed on an oxide basis. Additional features and advantages will be set forth in the detailed description which follows, and in part will be readily apparent to those skilled in the art from that description or recognized by practicing the embodiments as described herein, including the detailed description which follows, the claims, as well as the appended drawings.

A sixth aspect of this disclosure pertains to a method for forming a laminate. In one or more embodiments, the method includes stacking a first glass article (which can comprise an embodiment of the glass articles described herein), and a second glass article having a different composition from the first glass article to form a stack, placing the stack on a mold, heating the stack to a temperature greater than an annealing point temperature of the first glass article to form a shaped stack, and placing an interlayer between the first glass article and the second glass layer.

In one or more embodiments, the first glass layer comprises a first surface and an second surface that opposes the first surface, and the second glass article comprises a third surface and a fourth surface that opposes the third surface, and, in the stack, the second surface is adjacent to the third surface. In one or more embodiments, the second surface forms a concave surface and the third surface forms a concave surface, and vice versa.

In one or embodiments, the shaped stack comprises a gap between the second surface and the third surface having a maximum distance of about 10 mm or less (or about 5 mm or less, or about 3 mm or less).

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

FIG. 1B is a process flow chart of a method of making laminated glazing according to the prior art;

FIG. 2 is a side view illustration of a glass article according to one or more embodiments;

FIG. 3 is a side view illustration of a glass article according to one or more embodiments;

DETAILED DESCRIPTION

Reference will now be made in detail to various embodiments, examples of which are illustrated in the accompanying drawings.

Aspects of this disclosure pertain to a glass article that can be pair sagged with another glass article that differs in any one or more of composition, thickness, strengthen or strengthening level, and forming method (e.g., float formed as opposed to fusion formed). In one or more embodiments, the glass article can be fusion formed or is fusion formable, meaning it is or can be formed using a fusion process.

In most cases automotive glazing is curved or bent, and is not flat or planar. Architectural applications may also use similarly curved glass articles. Depending on thicknesses of the glass articles and the desired shape, the glass articles may be cold-formed (without using heat) or thermally shaped (without heat) to achieve the curved shape.

Thermal shaping can include a sagging process, which uses gravity to shape the glass when it is heated. In the sagging step, a glass article is placed on top of another glass article forming a stack (with a potential intervening release layer), which is placed on a mold. The stack and mold are both heated by placing in a furnace (e.g., a box furnace, or a lehr furnace) in which the stack is gradually heated to the sag temperature of the glass articles. During this process, gravity sags the glass articles together to a curved shape.

The heating time and temperature are selected to obtain the desired degree of sagging and final shape. Subsequently, the glass articles are removed from the furnace and cooled. The two glass articles are then separated, re-assembled with an interlayer between the glass articles and heated under vacuum to seal the glass articles and interlayer together into a laminate.

Figure 1A:
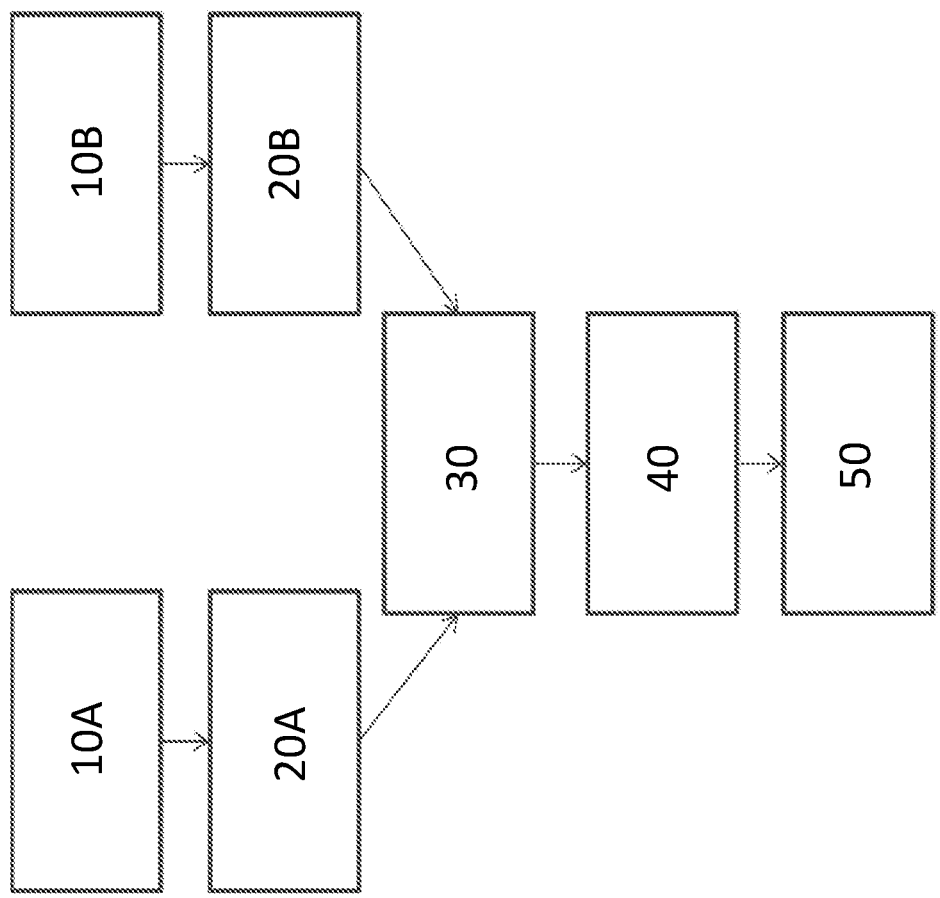
FIG. 1A is a process flow chart of a method of making a laminated glazing using pair sagging according to one or more embodiments.

Sagging the two glass articles together as shown in step 40 of FIG. 1A streamlines the manufacturing process; however, when the glass articles have different sag temperatures, pair sagging becomes a challenge. For example, known aluminosilicate glasses have a sag temperature that is more than 80° C. greater than the sag temperature of SLG. Moreover, known aluminosilicate glasses have viscosities that are more than 200 times greater than the viscosity of typical SLG at their respective sag temperatures.

A first aspect of this disclosure pertains to a glass article that can be pair sagged with another glass article that differs in any one or more of composition, thickness, strengthening level, and forming method (e.g., float formed as opposed to fusion formed). In particular, the embodiments of the glass article can be pair sagged with SLG or other glass articles with lower sag temperatures than known aluminosilicate glass articles, even when at reduced thicknesses (e.g., less than 2.1 mm or less than 1.6 mm). In addition, such glass articles retain their fusion formability and strengthening capability. In one or more embodiments, the glass article includes a glass composition comprising $SiO_2$ in an amount in a range from about 63 mol % to about 75 mol %, $Al_2O_3$ in an amount in a range from about 7 mol % to about 13 mol %, $R_2O$ in an amount from about 13 mol % to about 24 mol % (or about 18 mol % to about 24 mol %), $P_2O_5$ in an amount in a range from about 0 mol % to about 3 mol %. In one or more embodiments, the glass composition can include one or both of MgO and ZnO. When MgO is included in the glass composition, the amount MgO present is in a range from about 0 mol % to about 7 mol %. When ZnO is included in the glass composition, the amount of ZnO present is in a range from about 0 mol % to about 7 mol %. In one or more embodiments, the glass article (or glass composition used to form the glass article) exhibits an anneal point temperature (° C.) and a softening point temperature (° C.), and the relationship of (anneal point temperature+softening point temperature)/2 is in a range from about 625° C. to about 725° C. or from about 650° C. to about 690° C.

In one or more embodiments, the glass article is described as an aluminosilicate glass article or including an aluminosilicate glass composition. In such embodiments, the aluminosilicate glass composition or glass article formed therefrom includes $SiO_2$ and $Al_2O_3$ and is not SLG. In this regard, the glass composition or article formed therefrom includes $Al_2O_3$ in an amount of about 2 mol % or greater, 2.25 mol % or greater, 2.5 mol % or greater, about 2.75 mol % or greater, about 3 mol % or greater.

In one or more embodiments, the glass composition includes $Al_2O_3$ in an amount greater than about 2 mol %, greater than about 5 mol %, or greater than about 6 mol %. In one or more embodiments, the glass composition includes $Al_2O_3$ in a range from greater than about 7 mol % to about 13 mol %, from greater than about 8 mol % to about 13 mol %, from about 9 mol % to about 13 mol %, from about 9 mol % to about 13 mol %, from about 10 mol % to about 13 mol %, from about 7 mol % to about 12 mol %, from 7 mol % to about 11 mol %, from about 7 mol % to about 10 mol %, from about 7 mol % to about 9 mol %, from about 8 mol % to about 12 mol %, from about 8 mol % to about 11 mol %, from about 8 mol % to about 10 mol %, or from about 9 mol % to about 10 mol %, and all ranges and sub-ranges therebetween.

In one or more embodiments, the glass composition includes $SiO_2$ in an amount in the range from about 63 mol % to about 75 mol %, from about 64 mol % to about 75 mol %, from about 65 mol % to about 75 mol %, from about 66 mol % to about 75 mol %, from about 68 mol % to about 75 mol %, from about 70 mol % to about 75 mol %, from about 72 mol % to about 75 mol %, f from about 63 mol % to about 74 mol %, from about 63 mol % to about 72 mol %, from about 63 mol % to about 70 mol %, from about 63 mol % to about 68 mol %, from about 63 mol % to about 66 mol %, from about 63 mol % to about 67 mol %, from about 64 mol % to about 76 mol %, or from about 65 mol % to about 66 mol %, and all ranges and sub-ranges therebetween.

In one or more embodiments, the glass composition may include a total amount of $R_2O$ that is greater than or equal to about 5 mol %, greater than or equal to about 10 mol %, or greater than or equal to about 12 mol %. In some embodiments, the glass composition includes a total amount of $R_2O$ in a range from 5 mol % to about 24 mol %, from about 6 mol % to about 24 mol %, from about 8 mol % to about 24 mol %, from about 10 mol % to about 24 mol %, from about 12 mol % to about 24 mol %, from 13 mol % to about 24 mol %, from 14 mol % to about 24 mol %, from 15 mol % to about 24 mol %, from 16 mol % to about 24 mol %, from about 17 mol % to about 24 mol %, from 18 mol % to about 24 mol %, from about 20 mol % to about 24 mol %, from about 13 mol % to about 22 mol %, from about 13 mol % to about 20 mol %, from about 13 mol % to about 18 mol %, from about 13 mol % to about 16 mol %, 13 mol % to about 15 mol %, from 17 mol % to about 21 mol %, from 18 mol % to about 20 mol %, or from 19 mol % to about 21 mol %, and all ranges and sub-ranges therebetween. In one or more embodiments, the glass composition may be substantially free of $Rb_2O$, $Cs_2O$ or both $Rb_2O$ and $Cs_2O$. As used herein, the phrase "substantially free" with respect to the components of the composition means that the component is not actively or intentionally added to the composition during initial batching, but may be present as an impurity in an amount less than about 0.001 mol %. In one or more embodiments, the glass composition may include $R_2O$, which may include the total amount of $Li_2O$, $Na_2O$ and $K_2O$ only (i.e., the glass composition is substantially free of $Rb_2O$ and $Cs_2O$). In one or more embodiments, the glass composition may include $R_2O$, which may include the total amount of $Na_2O$ and $K_2O$ only (i.e., the glass composition is substantially free of $Li_2O$, $Rb_2O$ and $Cs_2O$). In one or more embodiments, the glass composition may comprise at least one alkali metal oxide selected from $Li_2O$, $Na_2O$ and $K_2O$, wherein the alkali metal oxide is present in an amount greater than about 5 mol %, greater than about 8 mol %, greater than about 10 mol %, or greater than about 12 mol %. In such embodiments, the glass composition or glass article formed therefrom may be characterized as an alkali aluminosilicate glass due to the presence of an alkali metal oxide.

In one or more embodiments, the glass composition comprises $Na_2O$ in an amount greater than or equal to about 10 mol %, greater than or equal to about 11 mol %, greater than or equal to about 12 mol %, or greater than or equal to about 14 mol %. In one or more embodiments, the composition includes $Na_2O$ in a range from about from about 12 mol % to about 20 mol %, from about 14 mol % to about 20 mol %, from about 15 mol % to about 20 mol %, from about 16 mol % to about 20 mol %, from about 18 mol % to about 20 mol %, from about 12 mol % to about 18 mol %, from about 12 mol % to about 16 mol %, from about 12 mol % to about 14 mol %, from about 14 mol % to about 18 mol %, from about 15 mol % to about 18 mol %, from about 16 mol % to about 18 mol %, or from about 16 mol % to about 17 mol %, and all ranges and sub-ranges therebetween.

In one or more embodiments, the glass composition includes less than about 4 mol % $K_2O$, or less than about 3 mol % $K_2O$. In some instances, the glass composition may include $K_2O$ in an amount in a range from about from about 0.5 mol % to about 4 mol %, from about 0.5 mol % to about 3.5 mol %, from about 0.5 mol % to about 3 mol %, from about 0.5 mol % to about 2.5 mol %, from about 0.5 mol % to about 2 mol %, from about 0.5 mol % to about 1.5 mol %, from about 0.5 mol % to about 1 mol %, from about 1 mol % to about 4 mol %, from about 1 mol % to about 3.5 mol %, from about 1 mol % to about 3 mol %, from about 1 mol % to about 2.5 mol %, from about 1.5 mol % to about 4 mol %, from about 1.5 mol % to about 3.5 mol %, from about 1.5 mol % to about 3 mol %, from about 1.5 mol % to about 2.5 mol %, from about 1.75 mol % to about 3 mol %, from about 1.75 mol % to about 2.75 mol %, from about 1.75 mol % to about 3 mol %, or from about 2 mol % to about 3 mol %, and all ranges and sub-ranges therebetween.

In one or more embodiments, the composition includes $Li_2O$ in a range from about 0 mol % to about 4 mol %, from about 0 mol % to about 3.5 mol %, from about 0 mol % to about 3 mol %, from about 0 mol % to about 2.5 mol %, from about 0 mol % to about 2 mol %, from about 0 mol % to about 1.5 mol %, from about 0 mol % to about 1 mol %, from about 0.1 mol % to about 4 mol %, from about 0.1 mol % to about 3.5 mol %, from about 0.1 mol % to about 3 mol %, from about 0.1 mol % to about 2.5 mol %, from about 0.1 mol % to about 2 mol %, from about 0.1 mol % to about 1.5 mol %, from about 0.1 mol % to about 1 mol %, from about 1 mol % to about 4 mol %, from about 1 mol % to about 3.5 mol %, from about 1 mol % to about 3 mol %, from about 1 mol % to about 2.5 mol %, from about 1 mol % to about 2 mol %, or from about 1 mol % to about 1.5 mol %, and all ranges and sub-ranges therebetween. In one or more embodiments, the glass composition is substantially free of $Li_2O$.

In one or more embodiments, the amount of $Na_2O$ in the composition may be greater than the amount of $Li_2O$. In some instances, the amount of $Na_2O$ may be greater than the combined amount of $Li_2O$ and $K_2O$.

In one or more embodiments, the glass composition comprises the composition relationship of a difference between $R_2O$ and the amount of $Al_2O_3$ (i.e., $R_2O-Al_2O_3$) that is in a range from about 4 mol % to about 12 mol %, from about 5 mol % to about 12 mol %, from about 6 mol % to about 12 mol %, from about 7 mol % to about 12 mol %, from about 8 mol % to about 12 mol %, from about 9 mol % to about 12 mol %, from about 4 mol % to about 11 mol %, from about 4 mol % to about 10 mol %, from about 4 mol % to about 9 mol %, from about 4 mol % to about 8 mol %, from about 4 mol % to about 7 mol %, or from about 8 mol % to about 10 mol %, and all ranges and sub-ranges therebetween.

In one or more embodiments, the glass composition comprises the compositional ratio of $R_2O$ to $Al_2O_3$ (i.e., $R_2O:Al_2O_3$) that is about 3 or less, about 2.5 or less, or about 2 or less. In some embodiments, the glass composition comprises the compositional ratio $R_2O:Al_2O_3$ in the range from about 1.5 to about 3. In some embodiments, the glass composition comprises the compositional ratio $R_2O:Al_2O_3$ in a range from about 1.6 to about 3, from about 1.7 to about 3, from about 1.8 to about 3, from about 1.9 to about 3, from about 2 to about 3, from about 2.1 to about 3, from about 2.2 to about 3, from about 2.3 to about 3, from about 2.4 to about 3, from about 2.5 to about 3, from about 1.5 to about 2.9, from about 1.5 to about 2.8, from about 1.5 to about 2.6, from about 1.5 to about 2.5, from about 1.5 to about 2.4, from about 1.5 to about 2.2, from about 1.5 to about 2, from about 1.5 to about 1.9, or from about 1.5 to about 1.8, and all ranges and sub-ranges therebetween.

In one or more embodiments, the glass composition comprises $B_2O_3$ (e.g., about 0.01 mol % or greater). In some embodiments, the glass composition may be substantially free of $B_2O_3$. In one or more embodiments, the glass composition comprises $B_2O_3$ in an amount in a range from about 0 mol % to about 2 mol %, from about 0 mol % to about 1.9 mol %, from about 0 mol % to about 1.8 mol %, from about 0 mol % to about 1.6 mol %, from about 0 mol % to about 1.5 mol %, from about 0 mol % to about 1.4 mol %, from about 0 mol % to about 1.3 mol %, from about 0 mol % to about 1.2 mol %, from about 0 mol % to about 1.1 mol %, from about 0 mol % to about 1 mol %, from about 0.5 mol % to about 2.5 mol %, from about 0.5 mol % to about 2 mol %, or from about 0.5 mol % to about 1.5 mol %, and all ranges and sub-ranges therebetween.

In one or more embodiments, the glass composition comprises $P_2O_5$ (e.g., about 0.01 mol % or greater). In some embodiments, the glass composition may be substantially free of $P_2O_5$. In one or more embodiments, the glass composition comprises $P_2O_5$ in an amount in a range from about 0 mol % to about 3 mol %, from about 0 mol % to about 2.9 mol %, from about 0 mol % to about 2.8 mol %, from about 0 mol % to about 2.6 mol %, from about 0 mol % to about 2.5 mol %, from about 0 mol % to about 2.4 mol %, from about 0 mol % to about 2.3 mol %, from about 0 mol % to about 2.2 mol %, from about 0 mol % to about 2.1 mol %, from about 0 mol % to about 2 mol %, from about 0.5 mol % to about 3 mol %, from about 0.5 mol % to about 2.5 mol %, from about 0.5 mol % to about 2 mol %, from about 0.5 mol % to about 1.5 mol %, from about 0.5 mol % to about 1 mol %, from about 1.5 mol % to about 3 mol %, or from about 2 mol % to about 3 mol %, and all ranges and sub-ranges therebetween.

In one or more embodiments, the glass composition may include a total amount of RO in a range from about 0 mol % to about 18 mol %. In some embodiments, the glass composition includes a non-zero amount of RO up to about 18 mol %. In one or more embodiments, the glass composition comprises RO in an amount from about 0 mol % to about 16 mol %, from about 0 mol % to about 15 mol %, from about 0 mol % to about 14 mol %, from about 0 mol % to about 12 mol %, from about 0 mol % to about 11 mol %, from about 0 mol % to about 10 mol %, from about 0 mol % to about 9 mol %, from about 0 mol % to about 8 mol %, from about 0.1 mol % to about 18 mol %, from about 0.1 mol % to about 16 mol %, from about 0.1 mol % to about 15 mol %, from about 0.1 mol % to about 14 mol %, from about 0.1 mol % to about 12 mol %, from about 0.1 mol % to about 11 mol %, from about 0.1 mol % to about 10 mol %, from about 0.1 mol % to about 9 mol %, or from about 0.1 mol % to about 8 mol %, and all ranges and sub-ranges therebetween.

In one or more embodiments, the glass composition includes CaO in an amount about 5 mol % or less, about 4.5 mol % or less, about 4 mol % or less, about 3.5 mol % or less, about 3 mol % or less, about 2.5 mol % or less, about 2 mol % or less, about 1.5 mol % or less, or about 1 mol % or less. In one or more embodiments, the glass composition is substantially free of CaO. In one or more embodiments, the glass composition comprises CaO in an amount from about 0 mol % to about 5 mol %, from about 0 mol % to about 4.5 mol %, from about 0 mol % to about 4 mol %, from about 0 mol % to about 3.5 mol %, from about 0 mol % to about 3 mol %, from about 0 mol % to about 2.5 mol %, from about 0 mol % to about 2 mol %, from about 0 mol % to about 1.5 mol %, from about 0 mol % to about 1 mol %, from about 0 mol % to about 0.8 mol %, from about 0 mol % to about 0.75 mol %, from about 0 mol % to about 0.5 mol %, from about 0 mol % to about 0.25 mol %, from about 0 mol % to about 0.1 mol %, from about 0.01 mol % to about 5 mol %, from about 0.01 mol % to about 4.5 mol %, from about 0.01 mol % to about 4 mol %, from about 0.01 mol % to about 3.5 mol %, from about 0.01 mol % to about 3 mol %, from about 0.01 mol % to about 2.5 mol %, from about 0.01 mol % to about 2 mol %, from about 0.01 mol % to about 1.5 mol %, from about 0.01 mol % to about 1 mol %, from about 0.01 mol % to about 0.8 mol %, from about 0.01 mol % to about 0.75 mol %, from about 0.01 mol % to about 0.5 mol %, from about 0.01 mol % to about 0.25 mol %, or from about 0.01 mol % to about 0.1 mol %, and all ranges and sub-ranges therebetween.

In some embodiments, the glass composition comprises MgO in an amount in the range from about 0 mol % to about 7 mol %, from about 0 mol % to about 6.5 mol %, from about 0 mol % to about 6 mol %, from about 0 mol % to about 5.5 mol %, from about 0 mol % to about 5 mol %, from about 0 mol % to about 4.5 mol %, from about 0 mol % to about 4 mol %, from about 0 mol % to about 3.5 mol %, from about 0 mol % to about 3 mol %, from about 0 mol % to about 2.5 mol %, from about 0 mol % to about 2 mol %, from about 0 mol % to about 1.5 mol %, from about 0 mol % to about 1 mol %, from about 0.5 mol % to about 6.5 mol %, from about 1 mol % to about 6.5 mol %, from about 1.5 mol % to about 6.5 mol %, from about 2 mol % to about 6.5 mol %, from about 2.5 mol % to about 6.5 mol %, from about 3 mol % to about 6.5 mol %, from about 3.5 mol % to about 6.5 mol %, from about 4 mol % to about 6.5 mol %, from about 4.5 mol % to about 6.5 mol %, from about 5 mol % to about 6.5 mol %, from about 0.5 mol % to about 3.5 mol %, from about 1 mol % to about 3.5 mol %, from about 1.5 mol % to about 3 mol %, from about 0.5 mol % to about 2.5 mol %, or from about 2 mol % to about 4 mol %, and all ranges and sub-ranges therebetween.

In some embodiments, the glass composition comprises ZnO in an amount in the range from about 0 mol % to about 7 mol %, from about 0 mol % to about 7.5 mol %, from about 0 mol % to about 6 mol %, from about 0 mol % to about 5.5 mol %, from about 0 mol % to about 5 mol %, from about 0 mol % to about 4.5 mol %, from about 0 mol % to about 4 mol %, from about 0 mol % to about 3.5 mol %, from about 0 mol % to about 3 mol %, from about 0 mol % to about 2.5 mol %, from about 0 mol % to about 2 mol %, from about 0 mol % to about 1.5 mol %, from about 0 mol % to about 1 mol %, from about 0.5 mol % to about 7 mol %, from about 0.5 mol % to about 6.5 mol %, from about 0.5 mol % to about 6 mol %, from about 0.5 mol % to about 5.5 mol %, from about 0.5 mol % to about 5 mol %, from about 0.5 mol % to about 4.5 mol %, from about 1 mol % to about 7 mol %, from about 1 mol % to about 6.5 mol %, from about 1 mol % to about 6 mol %, from about 1 mol % to about 5.5 mol %, from about 1 mol % to about 5 mol %, from about 1 mol % to about 4.5 mol %, from about 1.5 mol % to about 4.5 mol %, from about 2 mol % to about 4.5 mol %, from about 2.5 mol % to about 4.5 mol %, from about 3 mol % to about 4.5 mol %, from about 3.5 mol % to about 4.5 mol %, from about 0.5 mol % to about 3.5 mol %, from about 1 mol % to about 3.5 mol %, from about 1.5 mol % to about 4 mol %, or from about 2 mol % to about 3.5 mol %, and all ranges and sub-ranges therebetween.

In some embodiments, the glass composition comprises SrO in an amount in the range from about 0 mol % to about 2 mol %, from about 0 mol % to about 1.5 mol %, from about 0 mol % to about 1 mol %, from about 0.5 mol % to about 2 mol %, from about 1 mol % to about 2 mol %, or from about 1.5 mol % to about 2 mol %, and all ranges and sub-ranges therebetween.

In some embodiments, the glass composition comprises BaO in an amount in the range from about 0 mol % to about 2 mol %, from about 0 mol % to about 1.5 mol %, from about 0 mol % to about 1 mol %, from about 0.5 mol % to about 2 mol %, from about 1 mol % to about 2 mol %, or from about 1.5 mol % to about 2 mol %, and all ranges and sub-ranges therebetween.

In one or more embodiments, the glass composition comprises $SnO_2$ in an amount equal to or less than about 0.25 mol %, less than about 0.24 mol %, less than about 0.22 mol %, less than about 0.2 mol %, less than about 0.18 mol %, less than about 0.16 mol %, less than about 0.15 mol %, less than about 0.14 mol %, less than about 0.12 mol %. In one or more embodiments, the glass composition comprises $SnO_2$ in a range from about 0.01 mol % to about 0.25 mol %, from about 0.01 mol % to about 0.24 mol %, from about 0.01 mol % to about 0.22 mol %, from about 0.01 mol % to about 0.2 mol %, from about 0.01 mol % to about 0.18 mol %, from about 0.01 mol % to about 0.16 mol %, from about 0.01 mol % to about 0.15 mol %, from about 0.01 mol % to about 0.14 mol %, from about 0.01 mol % to about 0.12 mol %, or from about 0.01 mol % to about 0.10 mol %, and all ranges and sub-ranges therebetween. In some embodiments, $SnO_2$ may be substituted with another fining agent is a multivalent or other oxygen absorbing agent such as antimony, arsenic, iron, cerium, and the like.

In one or more embodiments, the glass composition may include an oxide that imparts a color or tint to the glass articles. In some embodiments, the glass composition includes an oxide that prevents discoloration of the glass article when the glass article is exposed to ultraviolet radiation. Examples of such oxides include, without limitation oxides of: Ti, V, Cr, Mn, Fe, Co, Ni, Cu, Ce, W, and Mo.

In one or more embodiments, the glass composition includes Fe expressed as $Fe_2O_3$, wherein Fe is present in an amount up to (and including) about 1 mol %. In some embodiments, the glass composition is substantially free of Fe. In one or more embodiments, the glass composition comprises Fe expressed as $Fe_2O_3$ in a range from about 0 mol % to about 1 mol %, from about 0 mol % to about 0.9 mol %, from about 0 mol % to about 0.8 mol %, from about 0 mol % to about 0.7 mol %, from about 0 mol % to about 0.6 mol %, from about 0 mol % to about 0.5 mol %, from about 0 mol % to about 0.4 mol %, from about 0 mol % to about 0.3 mol %, from about 0 mol % to about 0.2 mol %, 0 mol % to about 0.1 mol %, from about 0.01 mol % to about 0.9 mol %, from about 0.01 mol % to about 0.8 mol %, from about 0.01 mol % to about 0.7 mol %, from about 0.01 mol % to about 0.6 mol %, from about 0.01 mol % to about 0.5 mol %, from about 0.01 mol % to about 0.4 mol %, from about 0.01 mol % to about 0.3 mol %, from about 0.01 mol % to about 0.2 mol %, from about 0.05 mol % to about 0.1 mol %, from about 0.1 mol % to about 1 mol %, from about 0.2 mol % to about 1 mol %, from about 0.3 mol % to about 1 mol %, from about 0.4 mol % to about 1 mol %, from about 0.5 mol % to about 1 mol %, from about 0.6 mol % to about 1 mol %, from about 0.2 mol % to about 0.8 mol %, or from about 0.4 to about 0.8 mol % and all ranges and sub-ranges therebetween. In one or more embodiments, the Fe source may be oxalate/12, $Fe_2O_3$/18. In some embodiments, the about of Fe expressed as $Fe_2O_3$ is expressed in weight % in a range from about 0.1 weight % to about 5 weight %, from about 0.1 weight % to about 4 weight %, from about 0.1 weight % to about 3 weight %, from about 0.1 weight % to about 2.5 weight %, from about 0.2 weight % to about 5 weight %, from about 0.3 weight % to about 5 weight %, or from about 0.4 weight % to about 5 weight %, and all ranges and sub-ranges therebetween.

In one or more embodiments, the glass composition comprises a total amount of Co, expressed as $Co_3O_4$ in an amount in the range from about 0.001 mol % to about 0.01 mol %, from about 0.002 mol % to 0.01 mol %, from about 0.003 mol % to 0.01 mol %, from about 0.004 mol % to 0.01 mol %, from about 0.005 mol % to 0.01 mol %, from about 0.006 mol % to 0.01 mol %, from about 0.007 mol % to 0.01 mol %, from about 0.001 mol % to 0.009 mol %, from about 0.001 mol % to 0.008 mol %, from about 0.001 mol % to 0.007 mol %, from about 0.001 mol % to 0.006 mol %, or from about 0.001 mol % to 0.005 mol %, and all ranges and sub-ranges therebetween.

The glass composition of one or more embodiments may include any one or more of NiO, $V_2O_5$, and $TiO_2$.

Where the glass composition includes $TiO_2$, $TiO_2$ may be present in an amount of about 5 mol % or less, about 2.5 mol % or less, about 2 mol % or less or about 1 mol % or less. In one or more embodiments, the glass composition may be substantially free of $TiO_2$. Where the glass composition includes NiO, NiO may be present in an amount of about 0.6 mol % or less, or about 0.1 mol % or less. In one or more embodiments, the glass composition may be substantially free of NiO. In one or more embodiments, the glass composition may be substantially free of $V_2O_5$. In one or more embodiments, the glass composition may be substantially free of $TiO_2$. In one or more embodiments, the glass composition may be substantially free of any two or all three of NiO, $V_2O_5$, and $TiO_2$.

In one or more embodiments, the glass composition may include less than about 0.9 mol % CuO (e.g., less than about 0.5 mol %, less than about 0.1 mol %, or less than about 0.01 mol %). In some embodiments, the glass composition is substantially free of CuO.

In one or more embodiments, the glass composition may include less than about 0.2 mol % Se (e.g., less than about 0.1 mol %, or less than about 0.01 mol %). In some embodiments, the glass composition is substantially free of Se.

In one or more embodiments, the glass composition (or article formed therefrom) comprises a liquidus viscosity that enables the formation of the glass articles via specific techniques. As used herein, the term "liquidus viscosity" refers to the viscosity of a molten glass at the liquidus temperature, wherein the term "liquidus temperature" refers to the temperature at which crystals first appear as a molten glass cools down from the melting temperature (or the temperature at which the very last crystals melt away as temperature is increased from room temperature).

In one or more embodiments, the glass composition (or the glass article formed therefrom) exhibits a liquidus viscosity greater than or equal to about 100 kiloPoise (kP), greater than or equal to about 500 kP, greater than or equal to about 1000 kP, greater than or equal to 5000 kP, greater than or equal to 10,000 kP, greater than or equal to 15,000 kP, greater than or equal to 20,000 kP, greater than or equal to 25,000 kP, greater than or equal to 30,000 kP, greater than or equal to 35,000 kP. In one or more embodiments, the glass composition (or glass article formed therefrom) exhibits a liquidus viscosity in the range from about 100 kP to about 50,000 kP. Such glass compositions can be described as fusion formable and the resulting glass articles formed by a fusion process are characterized as fusion formed, where fusion formable and fusion formed indicate the liquidus viscosity exhibited by the glass composition or glass article, respectively. In some embodiments, the fusion formed glass article is substantially free of draw lines that are present in typical float formed glass articles. The liquidus viscosity is determined by the following method. First the liquidus temperature of the glass is measured in accordance with ASTM C829-81 (2015), titled "Standard Practice for Measurement of Liquidus Temperature of Glass by the Gradient Furnace Method". Next the viscosity of the glass at the liquidus temperature is measured in accordance with ASTM C965-96(2012), titled "Standard Practice for Measuring Viscosity of Glass Above the Softening Point".

The various embodiments of the glass articles described herein have glass compositions that exhibit one or more of relatively low anneal point temperature, softening point temperature, sag temperature and relatively high liquidus viscosities.

In one or more embodiments, the glass composition or glass articles formed from those compositions exhibit a strain point temperature in a range from about 475° C. to about 575° C. In one or more embodiments, the strain point temperature is in a range from about 480° C. to about 575° C., from about 490° C. to about 575° C., from about 500° C. to about 575° C., from about 510° C. to about 575° C., from about 520° C. to about 575° C., from about 530° C. to about 575° C., from about 540° C. to about 575° C., from about 550° C. to about 575° C., from about 475° C. to about 570° C., from about 475° C. to about 560° C., from about 475° C. to about 550° C., from about 475° C. to about 540° C., from about 475° C. to about 530° C., from about 475° C. to about 520° C., from about 475° C. to about 510° C., or from about 475° C. to about 500° C., and all ranges and sub-ranges therebetween. In some instances, the glass composition or glass articles formed from those compositions exhibit a strain point temperature that is less than about 550° C. or less, or about 530° C. or less. The strain point temperature is determined using the beam bending viscosity method of ASTM C598-93(2013).

In one or more embodiments, the glass composition or glass articles formed from those compositions exhibit an annealing point temperature in a range from about 510° C. to about 610° C. In one or more embodiments, the glass composition or glass articles formed from those compositions exhibit an annealing point temperature that is less than about 580° C. The annealing point may be in a range from about 520° C. to about 610° C., from about 530° C. to about 610° C., from about 540° C. to about 610° C., from about 550° C. to about 610° C., from about 560° C. to about 610° C., from about 510° C. to about 600° C., from about 510° C. to about 590° C., from about 510° C. to about 580° C., from about 510° C. to about 570° C., from about 510° C. to about 560° C., from about 510° C. to about 550° C., from about 510° C. to about 540° C., or from about 530° C. to about 570° C., and all ranges and sub-ranges therebetween. In some embodiments, the anneal point temperature is less than about 600° C. The annealing point is determined using the beam bending viscosity method of ASTM C598-93(2013).

In one or more embodiments, the glass composition or glass articles formed from those compositions exhibit a softening point temperature in a range from about 725° C. and 860° C. The softening point temperature may be in a range from about 730° C. to about 860° C., from about 740° C. to about 860° C., from about 750° C. to about 860° C., from about 760° C. to about 860° C., from about 770° C. to about 860° C., from about 780° C. to about 860° C., from about 790° C. to about 860° C., from about 800° C. to about 860° C., from about 725° C. and 850° C., from about 725° C. and 840° C., from about 725° C. and 830° C., from about 725° C. and 820° C., from about 725° C. and 810° C., from about 725° C. and 800° C., from about 725° C. and 790° C., from about 725° C. and 780° C., from about 725° C. and 770° C., from about 725° C. and 760° C., or from about 725° C. and 750° C., and all ranges and sub-ranges therebetween. The softening point temperature is determined using the parallel plate viscosity method of ASTM C1351M-96 (2012).

In one or more embodiments, the glass composition or glass articles formed from those compositions exhibit a difference in magnitude between the annealing point temperature and the softening point temperature that is greater than about 150° C., greater than about 175° C., greater than about 200° C., or greater than about 225° C. In some embodiments, the difference in magnitude between the annealing point temperature and the softening point temperature is in a range from about 175° C. to about 250° C., from about 180° C. to about 250° C., from about 190° C. to about 250° C., from about 200° C. to about 250° C., from about 210° C. to about 250° C., from about 220° C. to about 250° C., from about 225° C. to about 250° C., from about 175° C. to about 240° C., from about 175° C. to about 230° C., from about 175° C. to about 220° C., from about 175° C. to about 210° C., from about 175° C. to about 200° C., from about 175° C. to about 190° C., or from about 200° C. to about 240° C.

In one or more embodiments, the glass composition or glass articles formed from those compositions exhibit a relationship of (anneal point temperature+softening point temperature)/2 that is less than about 720° C. For example, the relationship (anneal point temperature+softening point temperature)/2 may be about 710° C. or less, about 700° C. or less, about 690° C. or less, about 680° C. or less, about 670° C. or less, about 660° C. or less, about 650° C. or less. In some instances, the relationship (anneal point temperature+softening point temperature)/2 is in a range from about 625° C. to about 725° C., from about 625° C. to about 700° C., from about 650° C. to about 700° C. or from about 675° C. to about 700° C. In some embodiments, the glass composting or glass articles formed therefrom exhibit the described relationship of (anneal point temperature+softening point temperature)/2, while also being characterized as an aluminosilicate glass. In one or more particular embodiments, the glass composition or glass articles formed therefrom exhibit the described relationship of (anneal point temperature+softening point temperature)/2 while also including more than about 2 mol % $Al_2O_3$ (e.g., 2.25 mol % or greater, 2.5 mol % or greater, or about 3 mol % or greater).

In one or more embodiments, the glass composition or glass articles formed from those compositions exhibit a $T_{200}$ that is greater than about 900° C. or greater than about 1200° C., as measured by Fulcher fit to high temperature viscosity (HTV) data (i.e., all the temperature measurements from 100 kP to 100 poise). For example, the glass composition or glass articles formed from those compositions may exhibit a $T_{200}$ in a range from about 900° C. to about 1800° C., from about 1000° C. to about 1800° C., from about 1100° C. to about 1800° C., from about 1200° C. to about 1800° C., from about 1300° C. to about 1800° C., from about 1400° C. to about 1800° C., from about 1500° C. to about 1800° C., from about 900° C. to about 1700° C., from about 900° C. to about 1600° C., from about 900° C. to about 1500° C., from about 900° C. to about 1400° C., from about 900° C. to about 1300° C., from about 900° C. to about 1200° C., from about 900° C. to about 1100° C., from about 1200° C. to about 1700° C., from about 1200° C. to about 1600° C., from about 1200° C. to about 1500° C., from about 1200° C. to about 1400° C., or from about 1500° C. to about 1700° C.

In one or more embodiments, the glass composition or glass articles formed from those compositions exhibit a $T_{35000}$ that is greater than about 1000° C., as measured by Fulcher fit to high temperature viscosity (HTV) data (i.e., all the temperature measurements from 100 kP to 100 poise). In some embodiments, the glass composition or glass articles formed from those compositions exhibit a $T_{35000}$ about 1000° C. or greater, 1010° C. or greater, about 1020° C. or greater, about 1030° C. or greater, about 1040° C. or greater, about 1050° C. or greater, about 1060° C. or greater, about 1070° C. or greater, about 1080° C. or greater, about 1090° C. or greater, about 1100° C. or greater, about 1110° C. or greater, about 1120° C. or greater, about 1130° C. or greater, about 1140° C. or greater, about 1150° C. or greater, about 1160° C. or greater, about 1170° C. or greater, about 1180° C. or greater, about 1190° C. or greater, about 1200° C. or greater, about 1210° C. or greater, about 1220° C. or greater, about 1230° C. or greater, about 1240° C. or greater, or about 1250° C. or greater. The $T_{35000}$ may be in a range from about 1000° C. to about 1200° C., from about 1010° C. to about 1200° C., from about 1020° C. to about 1200° C., from about 1030° C. to about 1200° C., from about 1040° C. to about 1200° C., from about 1050° C. to about 1200° C., from about 1000° C. to about 1190° C., from about 1000° C. to about 1180° C., from about 1000° C. to about 1170° C., from about 1000° C. to about 1160° C., from about 1000° C. to about 1150° C., or from about 1000° C. to about 1140° C.

In one or more embodiments, the glass composition or glass articles formed from those compositions exhibit a temperature at a viscosity of about 200 kP ($T_{200000}$) that is greater than about 900° C., as measured by Fulcher fit to HTV data. In some embodiments, the glass composition or glass articles formed from those compositions exhibit a $T_{200000}$ that is about 910° C. or greater, 920° C. or greater, 930° C. or greater, 940° C. or greater, 950° C. or greater, 960° C. or greater, 970° C. or greater, 980° C. or greater, 990° C. or greater, 1000° C. or greater, 1010° C. or greater, about 1020° C. or greater, about 1030° C. or greater, about 1040° C. or greater, about 1050° C. or greater, about 1060° C. or greater, about 1070° C. or greater, about 1080° C. or greater, about 1090° C. or greater, about 1100° C. or greater, about 1150° C. or greater, about 1200° C. or greater, or about 1250° C. or greater. In some embodiments, the glass composition or glass articles formed from those compositions exhibit a $T_{200000}$ in a range from about 900° C. to about 1200° C., from about 925° C. to about 1200° C., from about 950° C. to about 1200° C., from about 975° C. to about 1200° C., from about 1000° C. to about 1200° C., from about 1050° C. to about 1200° C., from about 1100° C. to about 1200° C., from about 1150° C. to about 1200° C., from about 1200° C. to about 1200° C., from about 900° C. to about 1190° C., from about 900° C. to about 1180° C., from about 900° C. to about 1170° C., from about 900° C. to about 1160° C., from about 900° C. to about 1150° C., from about 900° C. to about 1140° C., from about 900° C. to about 1130° C., from about 900° C. to about 1120° C., from about 900° C. to about 1110° C., from about 900° C. to about 1100° C., from about 900° C. to about 1050° C., or from about 900° C. to about 1000° C.

In some embodiments, the glass article exhibits a difference between $T_{200}$ and $T_{35000}$ (or a relationship $T_{200}-T_{35000}$) having a magnitude in a range from about 400° C. to about 600° C. For example, the difference between $T_{200}$ and $T_{35000}$ may have a magnitude in a range from about 420° C. to about 600° C., from about 440° C. to about 600° C., from about 450° C. to about 600° C., from about 460° C. to about 600° C., from about 480° C. to about 600° C., from about 500° C. to about 600° C., from about 520° C. to about 600° C., from about 400° C. to about 580° C., from about 400° C. to about 560° C., from about 400° C. to about 550° C., from about 400° C. to about 540° C., from about 450° C. to about 560° C., or from about 460° C. to about 560° C.

In one or more embodiments, the glass article comprises a difference between the relationship (anneal point+softening point)/2 and $T_{200}$ of less than −800° C. For example, the difference between the relationship (anneal point+softening point)/2 and $T_{200}$ is in a range from about −1050° C. to about −800° C., from about −1000° C. to about −800° C., from about −950° C. to about −800° C., from about −900° C. to about −800° C., from about −1050° C. to about −850° C., from about −1050° C. to about −900° C., from about −1050° C. to about −950° C., or from about −1050° C. to about −1000° C.

In one or more embodiments, the glass article comprises a difference between the relationship (anneal point+softening point)/2 and $T_{35000}$ of less than −300° C. For example, the difference between the relationship (anneal point+softening point)/2 and $T_{35000}$ is in a range from about −500° C. to about −300° C., from about −475° C. to about −300° C., from about −450° C. to about −300° C., from about −425° C. to about −300° C., from about −400° C. to about −300° C., from about −500° C. to about −325° C., from about −500° C. to about −350° C., from about −500° C. to about −375° C., or from about −500° C. to about −400° C.

In one or more embodiments, the glass article comprises a $T_{200}$, a $T_{35000}$, or a $T_{200}$ and $T_{35000}$ that are greater than about 1030° C. (e.g., about 1035° C. or greater, about 1040° C. or greater, about 1045° C. or greater, about 1050° C. or greater, about 1055° C. or greater, about 1060° C. or greater, about 1065° C. or greater, or about 1070° C. or greater).

In one or more embodiments, the glass composition or glass articles formed from those compositions exhibit a sag temperature in a range from about 600° C. to about 720° C., from about 600° C. to about 700° C., or from about 620° C. to about 720° C. In one or more embodiments, the glass composition or glass articles formed from those compositions exhibit a sag temperature in a range from about 605° C. to about 720° C., from about 610° C. to about 720° C., from about 615° C. to about 720° C., from about 620° C. to about 720° C., from about 625° C. to about 720° C., from about 630° C. to about 720° C., from about 635° C. to about 720° C., from about 640° C. to about 720° C., from about 645° C. to about 720° C., from about 650° C. to about 720° C., from about 655° C. to about 720° C., from about 660° C. to about 720° C., from about 665° C. to about 720° C., from about 670° C. to about 720° C., from about 620° C. to about 710° C., from about 620° C. to about 700° C., from about 620° C. to about 690° C., from about 620° C. to about 680° C., from about 620° C. to about 670° C., from about 620° C. to about 660° C., from about 620° C. to about 650° C., from about 620° C. to about 710° C., from about 625° C. to about 695° C., from about 625° C. to about 690° C., from about 625° C. to about 685° C., from about 625° C. to about 680° C., from about 625° C. to about 675° C., from about 625° C. to about 670° C., from about 625° C. to about 665° C., from about 625° C. to about 660° C., from about 625° C. to about 655° C., from about 625° C. to about 650° C., from about 630° C. to about 710° C., from about 635° C. to about 710° C., from about 640° C. to about 710° C., from about 645° C. to about 710° C., from about 650° C. to about 710° C., from about 655° C. to about 710° C., from about 660° C. to about 710° C., from about 665° C. to about 710° C., from about 670° C. to about 710° C., from about 675° C. to about 710° C., from about 680° C. to about 710° C., from about 685° C. to about 710° C., or from about 690° C. to about 710° C. In one or more embodiments, the glass composition or glass article formed from such composition exhibits a sag temperature in a range from about 600° C. to about 700° C., while also having a total alkali metal oxide content of about 16 mol % or greater (e.g., about 17 mol % or greater, about 18 mol % or greater, or about 19 mol % or greater).

Figure 10:
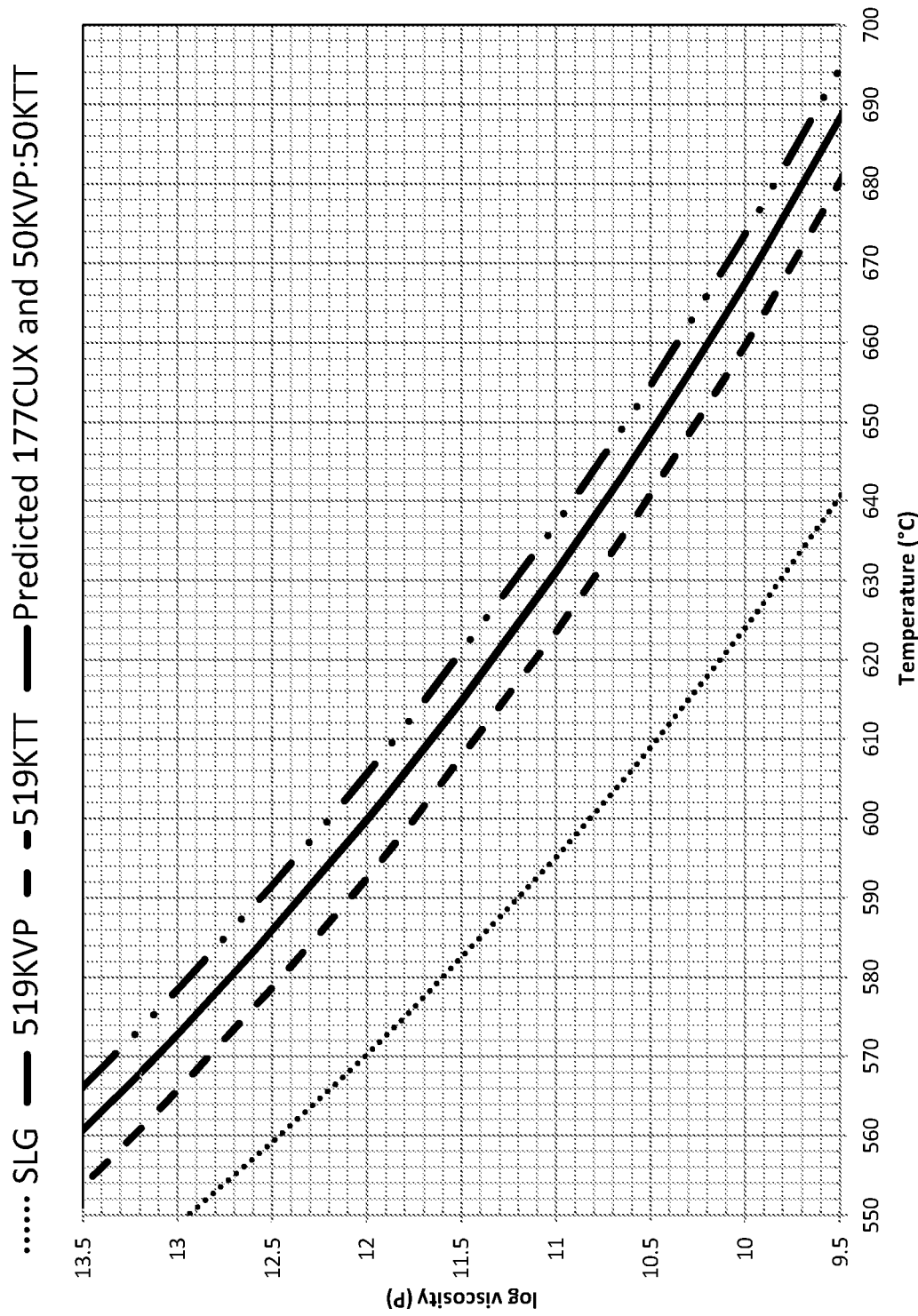
FIG. 10 is a graph showing the log viscosity curves of a known soda lime silicate glass, and Examples 63, 66 and 72 as a function of temperature.

In one or more embodiments, the glass composition or the glass article formed therefrom comprise a log viscosity curve as a function of temperature. An example of this curve is shown in FIG. 10.

In one or more embodiments, the glass composition or the glass article formed therefrom exhibit a density at 20° C. that is less than about 2.6 g/cm$^3$. In one or more embodiments, the density of the glass composition or the glass article formed therefrom is less than about 2.55 g/cm$^3$. For example, the density of the glass composition or the glass article formed therefrom is in a range from about 2.3 g/cm$^3$ to about 2.6 g/cm$^3$ from about 2.32 g/cm$^3$ to about 2.6 g/cm$^3$, from about 2.34 g/cm$^3$ to about 2.6 g/cm$^3$, from about 2.35 g/cm$^3$ to about 2.6 g/cm$^3$, from about 2.36 g/cm$^3$ to about 2.6 g/cm$^3$, from about 2.38 g/cm$^3$ to about 2.6 g/cm$^3$, from about 2.4 g/cm$^3$ to about 2.6 g/cm$^3$, from about 2.42 g/cm$^3$ to about 2.6 g/cm$^3$, from about 2.44 g/cm$^3$ to about 2.6 g/cm$^3$, from about 2.45 g/cm$^3$ to about 2.6 g/cm$^3$, from about 2.46 g/cm$^3$ to about 2.6 g/cm$^3$, from about 2.48 g/cm$^3$ to about 2.6 g/cm$^3$, from about 2.5 g/cm$^3$ to about 2.6 g/cm$^3$, from about 2.3 g/cm$^3$ to about 2.58 g/cm$^3$, from about 2.3 g/cm$^3$ to about 2.56 g/cm$^3$, from about 2.3 g/cm$^3$ to about 2.55 g/cm$^3$, from about 2.3 g/cm$^3$ to about 2.54 g/cm$^3$, from about 2.3 g/cm$^3$ to about 2.52 g/cm$^3$, from about 2.3 g/cm$^3$ to about 2.5 g/cm$^3$, from about 2.3 g/cm$^3$ to about 2.48 g/cm$^3$, from about 2.3 g/cm$^3$ to about 2.46 g/cm$^3$, from about 2.3 g/cm$^3$ to about 2.45 g/cm$^3$, from about 2.3 g/cm$^3$ to about 2.44 g/cm$^3$, from about 2.3 g/cm$^3$ to about 2.42 g/cm$^3$, from about 2.3 g/cm$^3$ to about 2.4 g/cm$^3$, from about 2.45 g/cm$^3$ to about 2.52 g/cm$^3$, or from about 2.48 g/cm$^3$ to about 2.55 g/cm$^3$, The density was determined using the buoyancy method of ASTM C693-93(2013).

In one or more embodiments, the glass composition is fusion formable as characterized by its compatibility with current fusion-draw designs requiring zircon refractory lining and hardware for isopipes. In some instances, glass compositions can to react with the zircon, breaking the zircon down into silica, which dissolves in the glass, and zirconia, which forms solid inclusions that are entrained by flow into the molten glass and ends up in the final glass article. The attack of zircon by the molten glass continues over time and the level or concentration of zirconia inclusions in the glass increases. If the temperature at which the zircon in the isopipe breaks down to form zirconia and silica (also referred to herein as the "breakdown temperature" or "$T^{breakdown}$") is higher than any temperature seen on the isopipe, the problem of zirconia inclusions in fusion-drawn glass (also referred to as "fusion line zirconia") would not occur. In this instance, the temperatures used to form the glass over the isopipe would be too low to create zirconia, and no such defect could form in the glass. Because fusion is essentially an isoviscous process, the highest temperature seen by the glass corresponds to a particular viscosity of the glass. In those standard fusion-draw operations known in the art, this viscosity is about 35,000 poise ("35 kPoise" or "35 kp"). In one or more embodiments, the glass compositions described herein exhibit a zircon breakdown viscosity of less than about 35 kP, while also exhibiting the other properties described herein. In particular, the glass compositions described herein exhibit a zircon breakdown viscosity in a range from about 6 kP up to about 35 kP, while also exhibiting the relationship of (anneal point+softening point)/2 in a range from about 625° C. to about 725° C.

Coefficients of thermal expansion (CTE) are expressed herein in terms of parts per million (ppm)/° C. and represent a value measured over a temperature range from about 20° C. to about 300° C., unless otherwise specified. High temperature (or liquid) coefficients of expansion (high temperature CTE) are also expressed in terms of part per million (ppm) per degree Celsius (ppm/° C.), and represent a value measured in the high temperature plateau region of the instantaneous coefficient of thermal expansion (CTE) vs. temperature curve. The high temperature CTE measures the volume change associated with heating or cooling of the glass through the transformation region.

In one or more embodiments, the glass article exhibits CTE measured over a temperature range from about 20° C. to about 300° C. in the range from about $75\times10^{-7}$ ppm/° C. or greater, or about $80\times10^{-7}$ ppm/° C.

In some embodiments, the glass article exhibits a high temperature (or liquid) CTE in the range from about $75\times10^{-7}$ ppm/° C. to about $120\times10^{-7}$ ppm/° C., from about $80\times10^{-7}$ ppm/° C. to about $120\times10^{-7}$ ppm/° C., from about $85\times10^{-7}$ ppm/° C. to about $120\times10^{-7}$ ppm/° C., from about $90\times10^{-7}$ ppm/° C. to about $120\times10^{-7}$ ppm/° C., from about $95\times10^{-7}$ ppm/° C. to about $120\times10^{-7}$ ppm/° C., from about $100\times10^{-7}$ ppm/° C. to about $120\times10^{-7}$ ppm/° C., from about $75\times10^{-7}$ ppm/° C. to about $115\times10^{-7}$ ppm/° C., from about $75\times10^{-7}$ ppm/° C. to about $110\times10^{-7}$ ppm/° C., from about $75\times10^{-7}$ ppm/° C. to about $105\times10^{-7}$ ppm/° C., from about $75\times10^{-7}$ ppm/° C. to about $100\times10^{-7}$ ppm/° C., from about $75\times10^{-7}$ ppm/° C. to about $95\times10^{-7}$ ppm/° C., from about $80\times10^{-7}$ ppm/° C. to about $100\times10^{-7}$ ppm/° C., from about $90\times10^{-7}$ ppm/° C. to about $100\times10^{-7}$ ppm/° C., or from about $95\times10^{-7}$ ppm/° C. to about $100\times10^{-7}$ ppm/° C.

In one or more embodiments, the glass article exhibits a Young's modulus in the range from about 70 GPa to about 85 GPa, from about 72 GPa to about 85 GPa, from about 74 GPa to about 85 GPa, from about 75 GPa to about 85 GPa, from about 76 GPa to about 85 GPa, from about 70 GPa to about 80 GPa, from about 72 GPa to about 80 GPa, from about 74 GPa to about 80 GPa, from about 75 GPa to about 80 GPa, from about 76 GPa to about 80 GPa, from about 70 GPa to about 78 GPa, from about 70 GPa to about 76 GPa, from about 70 GPa to about 75 GPa, from about 72 GPa to about 78 GPa, from about 75 GPa to about 79 GPa, or from about 70 GPa to about 77 GPa.

Referring to FIG. 3, embodiments of the glass article 100 include a first major surface 102, an opposing second major surface 104 defining a thickness/110 between the first major surface and the second major surface.

In one or more embodiments, the thickness/may be about 3 millimeters or less (e.g., in the range from about 0.01 millimeter to about 3 millimeters, from about 0.1 millimeter to about 3 millimeters, from about 0.2 millimeter to about 3 millimeters, from about 0.3 millimeter to about 3 millimeters, from about 0.4 millimeter to about 3 millimeters, from about 0.01 millimeter to about 2.5 millimeters, from about 0.01 millimeter to about 2 millimeters, from about 0.01 millimeter to about 1.5 millimeters, from about 0.01 millimeter to about 1 millimeter, from about 0.01 millimeter to about 0.9 millimeter, from about 0.01 millimeter to about 0.8 millimeter, from about 0.01 millimeter to about 0.7 millimeter, from about 0.01 millimeter to about 0.6 millimeter, from about 0.01 millimeter to about 0.5 millimeter, from about 0.1 millimeter to about 0.5 millimeter, or from about 0.3 millimeter to about 0.5 millimeter.)

The glass article may be substantially planar sheet, although other embodiments may utilize a curved or otherwise shaped or sculpted article. In some instances, the glass article may have a 3D or 2.5D shape. Additionally or alternatively, the thickness of the glass article may be constant along one or more dimension or may vary along one or more of its dimensions for aesthetic and/or functional reasons. For example, the edges of the glass article may be thicker as compared to more central regions of the glass article. The length, width and thickness dimensions of the glass article may also vary according to the article application or use. In some embodiments, the glass article 100A may have a wedged shape in which the thickness at one minor surface 106 is greater than the thickness at an opposing minor surface 108, as illustrated in FIG. 3. Where the thickness varies, the thickness ranges disclosed herein are the maximum thickness between the major surfaces.

The glass article may have a refractive index in the range from about 1.45 to about 1.55. As used herein, the refractive index values are with respect to a wavelength of 550 nm.

The glass article may be characterized by the manner in which it is formed. For instance, where the glass article may be characterized as float-formable (i.e., formed by a float process, or float-formed), or down-drawable (i.e., formed by a down-draw process, or down-drawn). Particular examples of down draw processes include a fusion draw process or a slot draw process. Glass articles made by fusion draw processes are fusion formed, and glass articles formed by a slot draw process are slot drawn.

Some embodiments of the glass articles described herein may be formed by a float process. A float-formed glass article may be characterized by smooth surfaces and uniform thickness is made by floating molten glass on a bed of molten metal, typically tin. In an example process, molten glass that is fed onto the surface of the molten tin bed forms a floating glass ribbon. As the glass ribbon flows along the tin bath, the temperature is gradually decreased until the glass ribbon solidifies into a solid glass article that can be lifted from the tin onto rollers. Once off the bath, the glass article can be cooled further and annealed to reduce internal stress. In some embodiments, float formed glass articles exhibit draw lines from the tin bath.

Some embodiments of the glass articles described herein may be formed by a down-draw process. Down-drawn glass articles have a uniform thickness and relatively pristine surfaces. Because the average flexural strength of the glass article is controlled by the amount and size of surface flaws, a pristine surface that has had minimal contact has a higher initial strength. In addition, down drawn glass articles have a very flat, smooth surface that can be used in its final application without costly grinding and polishing.

The fusion process uses a drawing tank that has a channel for accepting molten glass raw material. The channel has weirs that are open at the top along the length of the channel on both sides of the channel. When the channel fills with molten material, the molten glass overflows the weirs. Due to gravity, the molten glass flows down the outside surfaces of the drawing tank as two flowing glass films. These outside surfaces of the drawing tank extend down and inwardly so that they join at an edge below the drawing tank. The two flowing glass films join at this edge to fuse and form a single flowing glass article. The fusion draw method offers the advantage that, because the two glass films flowing over the channel fuse together, neither of the outside surfaces of the resulting glass article comes in contact with any part of the apparatus. Thus, the surface properties of the fusion drawn glass article are not affected by such contact.

Some embodiments of the glass articles described herein may be formed by a slot draw process. The slot draw process is distinct from the fusion draw method. In slow draw processes, the molten raw material glass is provided to a drawing tank. The bottom of the drawing tank has an open slot with a nozzle that extends the length of the slot. The molten glass flows through the slot/nozzle and is drawn downward as a continuous glass article and into an annealing region.

In one or more embodiments, the glass articles described herein may exhibit an amorphous microstructure and may be substantially free of crystals or crystallites. In other words, the glass articles exclude glass-ceramic materials.

In one or more embodiments, the glass article exhibits a total solar transmittance of about 90% or less, over a wavelength range from about 300 nm to about 2500 nm, when the glass article has a thickness of 0.7 mm. For example, the glass article exhibits a total solar transmittance in a range from about 60% to about 88%, from about 62% to about 88%, from about 64% to about 88%, from about 65% to about 88%, from about 66% to about 88%, from about 68% to about 88%, from about 70% to about 88%, from about 72% to about 88%, from about 60% to about 86%, from about 60% to about 85%, from about 60% to about 84%, from about 60% to about 82%, from about 60% to about 80%, from about 60% to about 78%, from about 60% to about 76%, from about 60% to about 75%, from about 60% to about 74%, or from about 60% to about 72%.

In one or embodiments, the glass article exhibits an average transmittance in the range from about 75% to about 85%, at a thickness of 0.7 mm or 1 mm, over a wavelength range from about 380 nm to about 780 nm. In some embodiments, the average transmittance at this thickness and over this wavelength range may be in a range from about 75% to about 84%, from about 75% to about 83%, from about 75% to about 82%, from about 75% to about 81%, from about 75% to about 80%, from about 76% to about 85%, from about 77% to about 85%, from about 78% to about 85%, from about 79% to about 85%, or from about 80% to about 85%. In one or more embodiments, the glass article exhibits Tuv-380 or Tuv-400 of 50% or less (e.g., 49% or less, 48% or less, 45% or less, 40% or less, 30% or less, 25% or less, 23% or less, 20% or less, or 15% or less), at a thickness of 0.7 mm or 1 mm, over a wavelength range from about 300 nm to about 400 nm.

In one or more embodiments, the glass article may be strengthened to include compressive stress (CS) that extends from a surface to a depth of compression (DOC). The surface (CS) regions are balanced by a central portion exhibiting a tensile stress (CT). At the DOC, the stress crosses from a positive (compressive) stress to a negative (tensile) stress; however compressive stress and tensile stress values provided herein are absolute values.

In one or more embodiments, the glass article may be strengthened mechanically by utilizing a mismatch of the coefficient of thermal expansion between portions of the article to create a compressive stress region and a central region exhibiting a tensile stress. In some embodiments, the glass article may be strengthened thermally by heating the glass to a temperature below the glass transition point and then rapidly quenching.

In one or more embodiments, the glass article may be chemically strengthening by ion exchange. In the ion exchange process, ions at or near the surface of the glass article are replaced by—or exchanged with—larger ions having the same valence or oxidation state. In those embodiments in which the glass article comprises an alkali aluminosilicate glass, ions in the surface layer of the article and the larger ions are monovalent alkali metal cations, such as $Li^+$, $Na^+$, $K^+$, $Rb^+$, and $Cs^+$. Alternatively, monovalent cations in the surface layer may be replaced with monovalent cations other than alkali metal cations, such as Ag+ or the like. In such embodiments, the monovalent ions (or cations) exchanged into the glass article generate a stress.

Ion exchange processes are typically carried out by immersing a glass article in a molten salt bath (or two or more molten salt baths) containing the larger ions to be exchanged with the smaller ions in the glass article. It should be noted that aqueous salt baths may also be utilized. In addition, the composition of the bath(s) may include more than one type of larger ion (e.g., Na+ and K+) or a single larger ion. It will be appreciated by those skilled in the art that parameters for the ion exchange process, including, but not limited to, bath composition and temperature, immersion time, the number of immersions of the glass article in a salt bath (or baths), use of multiple salt baths, additional steps such as annealing, washing, and the like, are generally determined by the composition of the glass article (including the structure of the article and any crystalline phases present) and the desired DOC and CS of the glass article that results from strengthening. Exemplary molten bath composition may include nitrates, sulfates, and chlorides of the larger alkali metal ion. Typical nitrates include $KNO_3$, $NaNO_3$, $LiNO_3$, $NaSO_4$ and combinations thereof. The temperature of the molten salt bath typically is in a range from about 380° C. up to about 450° C., while immersion times range from about 15 minutes up to about 100 hours depending on glass article thickness, bath temperature and glass (or monovalent ion) diffusivity. However, temperatures and immersion times different from those described above may also be used.

In one or more embodiments, the glass articles may be immersed in a molten salt bath of 100% $NaNO_3$, 100% $KNO_3$, or a combination of $NaNO_3$ and $KNO_3$ having a temperature in a range from about 370° C. to about 480° C.

In some embodiments, the glass article may be immersed in a molten mixed salt bath including from about 5% to about 90% $KNO_3$ and from about 10% to about 95% $NaNO_3$. In one or more embodiments, the glass article may be immersed in a second bath, after immersion in a first bath. The first and second baths may have different compositions and/or temperatures from one another. The immersion times in the first and second baths may vary. For example, immersion in the first bath may be longer than the immersion in the second bath.

In one or more embodiments, the glass article may be immersed in a molten, mixed salt bath including $NaNO_3$ and $KNO_3$ (e.g., 49%/51%, 50%/50%, 51%/49%) having a temperature less than about 420° C. (e.g., about 400° C. or about 380° C.). for less than about 5 hours, or even about 4 hours or less.

Ion exchange conditions can be tailored to provide a "spike" or to increase the slope of the stress profile at or near the surface of the resulting glass article. The spike may result in a greater surface CS value. This spike can be achieved by single bath or multiple baths, with the bath(s) having a single composition or mixed composition, due to the unique properties of the glass compositions used in the glass articles described herein.

In one or more embodiments, where more than one monovalent ion is exchanged into the glass article, the different monovalent ions may exchange to different depths within the glass article (and generate different magnitudes stresses within the glass article at different depths). The resulting relative depths of the stress-generating ions can be determined and cause different characteristics of the stress profile.

Surface CS is measured using those means known in the art, such as by surface stress meter (FSM) using commercially available instruments such as the FSM-6000, manufactured by Orihara Industrial Co., Ltd. (Japan). Surface stress measurements rely upon the accurate measurement of the stress optical coefficient (SOC), which is related to the birefringence of the glass. SOC in turn is measured by those methods that are known in the art, such as fiber and four point bend methods, both of which are described in ASTM standard C770-98 (2013), entitled "Standard Test Method for Measurement of Glass Stress-Optical Coefficient," the contents of which are incorporated herein by reference in their entirety, and a bulk cylinder method. As used herein CS may be the "maximum compressive stress" which is the highest compressive stress value measured within the compressive stress layer. In some embodiments, the maximum compressive stress is located at the surface of the glass article. In other embodiments, the maximum compressive stress may occur at a depth below the surface, giving the compressive profile the appearance of a "buried peak."

DOC may be measured by FSM or by a scattered light polariscope (SCALP) (such as the SCALP-04 scattered light polariscope available from Glasstress Ltd., located in Tallinn, Estonia), depending on the strengthening method and conditions. When the glass article is chemically strengthened by an ion exchange treatment, FSM or SCALP may be used depending on which ion is exchanged into the glass article. Where the stress in the glass article is generated by exchanging potassium ions into the glass article, FSM is used to measure DOC. Where the stress is generated by exchanging sodium ions into the glass article, SCALP is used to measure DOC. Where the stress in the glass article is generated by exchanging both potassium and sodium ions into the glass, the DOC is measured by SCALP, since it is believed the exchange depth of sodium indicates the DOC and the exchange depth of potassium ions indicates a change in the magnitude of the compressive stress (but not the change in stress from compressive to tensile); the exchange depth of potassium ions in such glass articles is measured by FSM.

In one or more embodiments, the glass article may be strengthened to exhibit a DOC that is described a fraction of the thickness t of the glass article (as described herein). For example, in one or more embodiments, the DOC may be equal to or greater than about 0.03t, equal to or greater than about 0.05t, equal to or greater than about 0.06t, equal to or greater than about 0.1t, equal to or greater than about 0.11t, equal to or greater than about 0.12t, equal to or greater than about 0.13t, equal to or greater than about 0.14t, equal to or greater than about 0.15t, equal to or greater than about 0.16t, equal to or greater than about 0.17t, equal to or greater than about 0.18t, equal to or greater than about 0.19t, equal to or greater than about 0.2t, equal to or greater than about 0.21t. In some embodiments, The DOC may be in a range from about 0.03t to about 0.25t, from about 0.04t to about 0.25t, from about 0.05t to about 0.25t, from about 0.06t to about 0.25t, from about 0.07t to about 0.25t, from about 0.08t to about 0.25t, from about 0.09t to about 0.25t, from about 0.18t to about 0.25t, from about 0.11t to about 0.25t, from about 0.12t to about 0.25t, from about 0.13t to about 0.25t, from about 0.14t to about 0.25t, from about 0.15t to about 0.25t, from about 0.03t to about 0.24t, from about 0.03t to about 0.23t, from about 0.03t to about 0.22t, from about 0.03t to about 0.21t, from about 0.03t to about 0.2t, from about 0.03t to about 0.19t, from about 0.03t to about 0.18t, from about 0.03t to about 0.17t, from about 0.03t to about 0.16t, or from about 0.03t to about 0.15t. In some instances, the DOC may be about 20 µm or less. In one or more embodiments, the DOC may be about 35 µm or greater (e.g., from about 40 µm to about 300 µm, from about 50 µm to about 300 µm, from about 60 µm to about 300 µm, from about 70 µm to about 300 µm, from about 80 µm to about 300 µm, from about 90 µm to about 300 µm, from about 100 µm to about 300 µm, from about 110 µm to about 300 µm, from about 120 µm to about 300 µm, from about 140 µm to about 300 µm, from about 150 µm to about 300 µm, from about 40 µm to about 290 µm, from about 40 µm to about 280 µm, from about 40 µm to about 260 µm, from about 40 µm to about 250 µm, from about 40 µm to about 240 µm, from about 40 µm to about 230 µm, from about 40 µm to about 220 µm, from about 40 µm to about 210 µm, from about 40 µm to about 200 µm, from about 40 µm to about 180 µm, from about 40 µm to about 160 µm, from about 40 µm to about 150 µm, from about 40 µm to about 140 µm, from about 40 µm to about 130 µm, from about 40 µm to about 120 µm, from about 40 µm to about 110 µm, or from about 40 µm to about 100 µm).

In one or more embodiments, the strengthened glass article may have a CS (which may be found at the surface or a depth within the glass article) of about 200 MPa or greater, 300 MPa or greater, 400 MPa or greater, about 500 MPa or greater, about 600 MPa or greater, about 700 MPa or greater, about 800 MPa or greater, about 900 MPa or greater, about 930 MPa or greater, about 1000 MPa or greater, or about 1050 MPa or greater.

In one or more embodiments, the strengthened glass article may have a maximum CT of about 20 MPa or greater, about 30 MPa or greater, about 40 MPa or greater, about 45 MPa or greater, about 50 MPa or greater, about 60 MPa or greater, about 70 MPa or greater, about 75 MPa or greater, about 80 MPa or greater, or about 85 MPa or greater. In some embodiments, the maximum CT may be in a range from about 40 MPa to about 100 MPa.

In one or more particular embodiments, the glass article glass article (having a thickness of about 1 mm or less) exhibits a surface CS in a range from about 650 MPa to about 850 MPa and a corresponding DOC in a range from about 35 micrometers to about 65 micrometers. In such embodiments, the strengthening levels (in terms of surface CS and DOC) is exhibited by the glass article after being immersed in a molten salt bath of 100% KNO$_3$ for less than about 8 hours, about 6 hours or less, or about 4 hours or less. The temperature may be in a range from about 380° C. to about 420° C.

Figure 4:
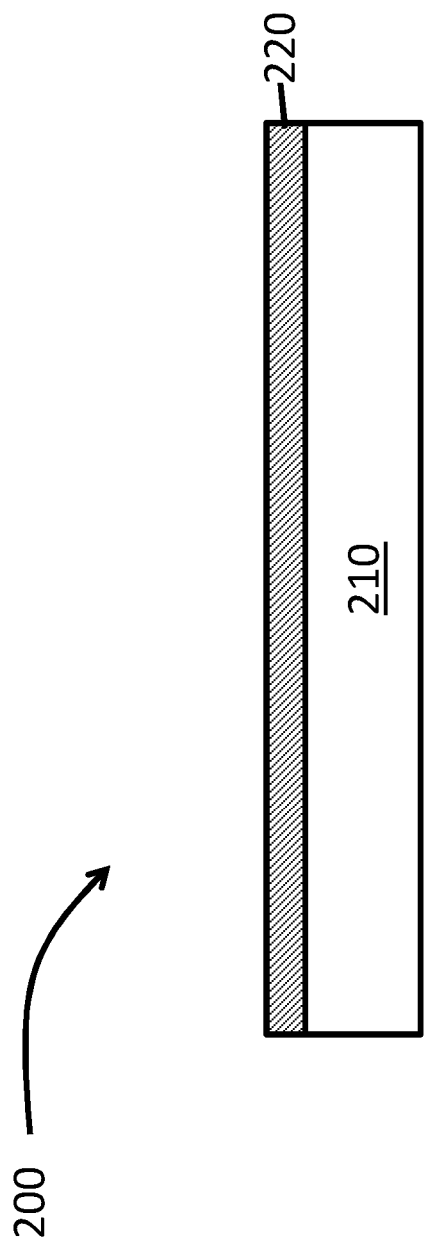
FIG. 4 is a side view illustration of a laminate including a glass article according to one or more embodiments.
Figure 5:
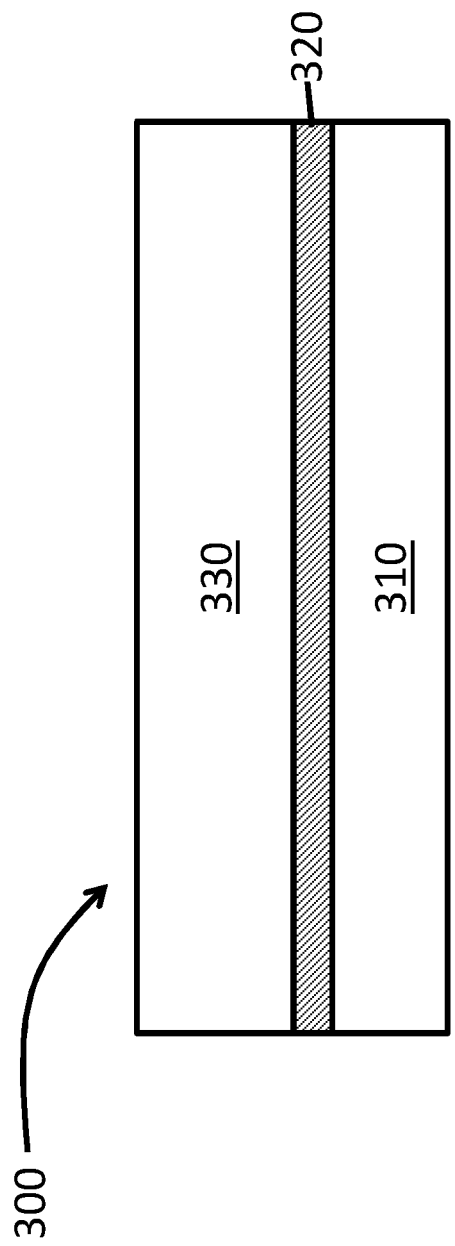
FIG. 5 is a side view illustration of a laminate including a glass article according to one or more embodiments.

Another aspect of this disclosure pertains to a laminate comprising a glass article as described herein. In one or more embodiments, the laminate 200 may include a first glass layer 210 comprising a glass article according to one or more embodiments, and an interlayer 220 disposed on the first glass layer, as illustrated in FIG. 4. As shown in FIG. 5, the laminate 300 may include a first glass layer 310, an interlayer 320 disposed on the first layer, and a second glass layer 330 disposed on the interlayer 320 opposite the first glass layer 310. Either one or both of the first glass layer and the second glass layer used in the laminate can include a glass article described herein. As shown in FIG. 5, the interlayer 320 is disposed between the first and second glass layers.

In one or more embodiments, the laminate 300 may include a first glass layer comprising a glass article as described herein, and a second glass layer that includes a different composition than the glass articles described herein. For example, the second glass layer may include soda-lime glass, alkali aluminosilicate glass, alkali containing borosilicate glass, alkali aluminophosphosilicate glass, or alkali aluminoborosilicate glass. In some embodiments, both the first and second glass layers are comprise a glass article described herein, which may be the same or different from one another.

In one or more embodiments, either one or both the first glass layer and the second glass layer comprise a thickness less than 1.6 mm (e.g., 1.55 mm or less, 1.5 mm or less, 1.45 mm or less, 1.4 mm or less, 1.35 mm or less, 1.3 mm or less, 1.25 mm or less, 1.2 mm or less, 1.15 mm or less, 1.1 mm or less, 1.05 mm or less, 1 mm or less, 0.95 mm or less, 0.9 mm or less, 0.85 mm or less, 0.8 mm or less, 0.75 mm or less, 0.7 mm or less, 0.65 mm or less, 0.6 mm or less, 0.55 mm or less, 0.5 mm or less, 0.45 mm or less, 0.4 mm or less, 0.35 mm or less, 0.3 mm or less, 0.25 mm or less, 0.2 mm or less, 0.15 mm or less, or about 0.1 mm or less). The lower limit of thickness may be 0.1 mm, 0.2 mm or 0.3 mm. In some embodiments, the thickness of either one or both the first glass layer and the second glass layer is in the range from about 0.1 mm to less than about 1.6 mm, from about 0.1 mm to about 1.5 mm, from about 0.1 mm to about 1.4 mm, from about 0.1 mm to about 1.3 mm, from about 0.1 mm to about 1.2 mm, from about 0.1 mm to about 1.1 mm, from about 0.1 mm to about 1 mm, from about 0.1 mm to about 0.9 mm, from about 0.1 mm to about 0.8 mm, from about 0.1 mm to about 0.7 mm, from about 0.1 mm, from about 0.2 mm to less than about 1.6 mm, from about 0.3 mm to less than about 1.6 mm, from about 0.4 mm to less than about 1.6 mm, from about 0.5 mm to less than about 1.6 mm, from about 0.6 mm to less than about 1.6 mm, from about 0.7 mm to less than about 1.6 mm, from about 0.8 mm to less than about 1.6 mm, from about 0.9 mm to less than about 1.6 mm, from about 1 mm to about 1.6 mm, from about 0.4 mm to about 1.2 mm, from about 0.5 mm to about 1.2 mm, from about 0.7 mm to about 1.2 mm, from about 0.4 mm to about 1 mm, from about 0.5 mm to about 1 mm, or from about 0.7 mm to about 1 mm. In some embodiments, the first glass layer and the second glass layer have substantially the same thickness as one another.

In some embodiments, while one of the first and second glass layers has a thickness less than about 1.6 mm, the other of the first and second glass layers has a thickness that is about 1 mm or greater, or about 1.6 mm or greater. In one or more embodiments, the first and the second glass layers have thicknesses that differ from one another. For example, the while one of the first and second glass layers has a thickness less than about 1.6 mm, the other of the first and second glass layers has a thickness that is about 1.7 mm or greater, about 1.75 mm or greater, about 1.8 mm or greater, about 1.7 mm or greater, about 1.7 mm or greater, about 1.7 mm or greater, about 1.85 mm or greater, about 1.9 mm or greater, about 1.95 mm or greater, about 2 mm or greater, about 2.1 mm or greater, about 2.2 mm or greater, about 2.3 mm or greater, about 2.4 mm or greater, 2.5 mm or greater, 2.6 mm or greater, 2.7 mm or greater, 2.8 mm or greater, 2.9 mm or greater, 3 mm or greater, 3.2 mm or greater, 3.4 mm or greater, 3.5 mm or greater, 3.6 mm or greater, 3.8 mm or greater, 4 mm or greater, 4.2 mm or greater, 4.4 mm or greater, 4.6 mm or greater, 4.8 mm or greater, 5 mm or greater, 5.2 mm or greater, 5.4 mm or greater, 5.6 mm or greater, 5.8 mm or greater, or 6 mm or greater. In some embodiments the first and/or second glass layers has a thickness in a range from about 1.6 mm to about 6 mm, from about 1.7 mm to about 6 mm, from about 1.8 mm to about 6 mm, from about 1.9 mm to about 6 mm, from about 2 mm to about 6 mm, from about 2.1 mm to about 6 mm, from about 2.2 mm to about 6 mm, from about 2.3 mm to about 6 mm, from about 2.4 mm to about 6 mm, from about 2.5 mm to about 6 mm, from about 2.6 mm to about 6 mm, from about 2.8 mm to about 6 mm, from about 3 mm to about 6 mm, from about 3.2 mm to about 6 mm, from about 3.4 mm to about 6 mm, from about 3.6 mm to about 6 mm, from about 3.8 mm to about 6 mm, from about 4 mm to about 6 mm, from about 1.6 mm to about 5.8 mm, from about 1.6 mm to about 5.6 mm, from about 1.6 mm to about 5.5 mm, from about 1.6 mm to about 5.4 mm, from about 1.6 mm to about 5.2 mm, from about 1.6 mm to about 5 mm, from about 1.6 mm to about 4.8 mm, from about 1.6 mm to about 4.6 mm, from about 1.6 mm to about 4.4 mm, from about 1.6 mm to about 4.2 mm, from about 1.6 mm to about 4 mm, from about 3.8 mm to about 5.8 mm, from about 1.6 mm to about 3.6 mm, from about 1.6 mm to about 3.4 mm, from about 1.6 mm to about 3.2 mm, or from about 1.6 mm to about 3 mm.

In one or more embodiments the first glass layer is relatively thin in comparison to the second glass layer. In other words, the second glass layer has a thickness greater than the first glass layer. In one or more embodiments, the second glass layer may have a thickness that is more than two times the thickness of the first glass layer. In one or more embodiments, the second glass layer may have a thickness in the range from about 1.5 times to about 2.5 times the thickness of the first glass layer.

In one or more embodiments, the first glass layer and the second glass layer may have the same thickness; however, the second glass layer is more rigid or has a greater stiffness than the first glass layer, and in very specific embodiments, both the first glass layer and the second glass layer have a thickness in the range of 0.2 mm and 1.6 mm.

In one or more embodiments, the laminate 200, 300 may have a thickness of 6.85 mm or less, or 5.85 mm or less, where the thickness comprises the sum of thicknesses of the first glass layer, the second glass layer, the interlayer and any other layers. In various embodiments, the laminate may have a thickness in the range of about 1.8 mm to about 6.85 mm, or in the range of about 1.8 mm to about 5.85 mm, or in the range of about 1.8 mm to about 5.0 mm, or 2.1 mm to about 6.85 mm, or in the range of about 2.1 mm to about 5.85 mm, or in the range of about 2.1 mm to about 5.0 mm, or in the range of about 2.4 mm to about 6.85 mm, or in the range of about 2.4 mm to about 5.85 mm, or in the range of about 2.4 mm to about 5.0 mm, or in the range of about 3.4 mm to about 6.85 mm, or in the range of about 3.4 mm to about 5.85 mm, or in the range of about 3.4 mm to about 5.0 mm.

In one or more embodiments, the laminate 300, 400 exhibits at least one radius of curvature that is less than 1000 mm, or less than 750 mm, or less than 500 mm, or less than 300 mm. In one or more embodiments, the laminate 300 exhibits at least one radius of curvature of about 10 m or less, or about 5 m or less along at least one axis. In one or more embodiments, the laminate 400 may have a radius of curvature of 5 m or less along at least a first axis and along the second axis that is perpendicular to the first axis. In one or more embodiments, the laminate may have a radius of curvature of 5 m or less along at least a first axis and along the second axis that is not perpendicular to the first axis.

In one or more embodiments, the first glass layer has a first sag temperature and the second glass layer has a second sag temperature, wherein the difference between the first sag temperature and the second sag temperature is about 100° C. or less, about 90° C. or less, about 80° C. or less, about 75° C. or less, about 70° C. or less, about 60° C. or less, about 50° C. or less, about 40° C. or less, about 30° C. or less, about 20° C. or less, or about 10° C. or less.

In one or more embodiments, the first or second glass layer may utilize a glass article that is strengthened, as described herein. In one or more embodiments, the first glass layer comprises a strengthened glass article according to the embodiments described herein, while the second glass layer is not strengthened. In one or more embodiments, the first glass layer comprises a strengthened glass article according to the embodiments described herein, while the second glass layer is annealed. In one or more embodiments, the first glass layer is strengthened chemically, mechanically and/or thermally, while the second glass layer is strengthened in different manner than the first glass layer (chemically, mechanically and/or thermally). In one or more embodiments, the first glass layer is strengthened chemically, mechanically and/or thermally, while the second glass layer is strengthened in the same manner than the first glass layer (chemically, mechanically and/or thermally).

In one or more embodiments, the interlayer used herein (e.g., 320) may include a single layer or multiple layers. The interlayer (or layers thereof) may be formed polymers such as polyvinyl butyral (PVB), acoustic PBV (APVB), ionomers, ethylene-vinyl acetate (EVA) and thermoplastic polyurethane (TPU), polyester (PE), polyethylene terephthalate (PET) and the like. The thickness of the interlayer may be in the range from about 0.5 mm to about 2.5 mm, from about 0.8 mm to about 2.5 mm, from about 1 mm to about 2.5 mm or from about 1.5 mm to about 2.5 mm.

Figure 6:
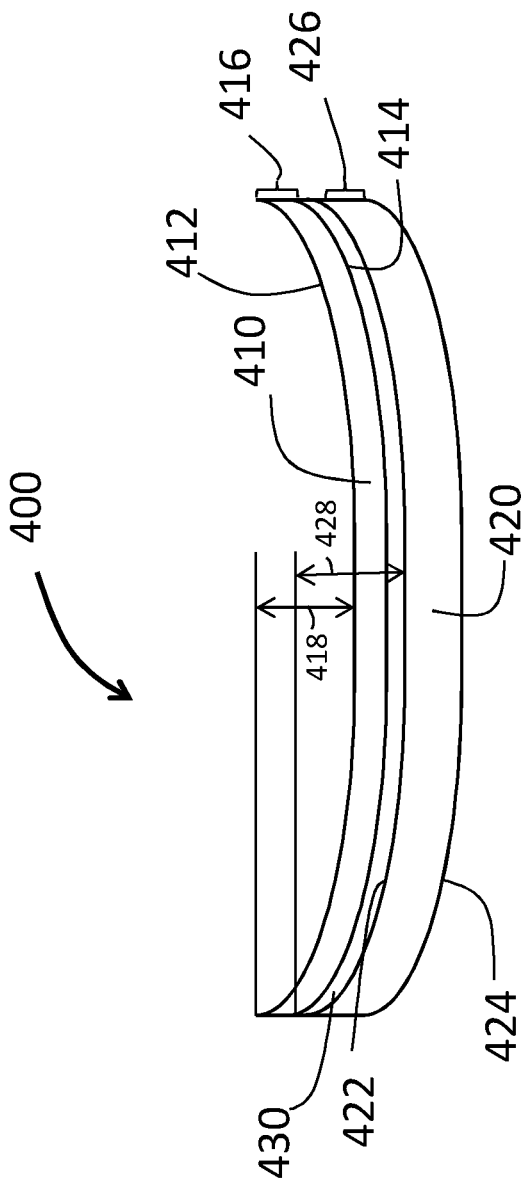
FIG. 6 is a side view of a laminate including a glass article according to one or more embodiments.

Another aspect of this disclosure pertains to a laminate 400 comprising a first curved glass layer 410, a second curved glass layer 420 and an interlayer 530 disposed between the first curved glass layer and the second curved glass layer, as illustrated in FIG. 6. In one or more embodiments, the first curved glass layer 410 includes a first major surface 412, a second major surface 414 opposing the first major surface, a first thickness 416 defined as the distance between the first major surface and second major surface, and a first sag depth 418. In one or more embodiments, the second curved glass layer 420 includes a third major surface 422, a fourth major surface 424 opposing the third major surface, a second thickness 426 defined as the distance between the third major surface and the fourth major surface, and a second sag depth 428. The orientation of the laminate 400 of FIG. 6 shows the second surface 414 as a convex surface and the third surface 422 as a concave surface. In one or more embodiments, the positions of the first curved glass layer can be reversed. In one or more embodiments, the first curved glass layer exhibits a first viscosity and the second curved glass layer exhibits a second viscosity that differs from the first viscosity at a given temperature. In one or more embodiments, the first curved glass layer is formed from one or more embodiments of the glass compositions described herein. The temperature at which the first viscosity and second viscosity is measured may be from about 590° C. to about 650° C. (or about 630° C.). In some embodiments, the first viscosity is equal to or greater than about 2 times, about 3 times, about 4 times, about 5 times, about 6 times, about 7 times, about 8 times, about 9 times, or about 10 times the first viscosity, at a temperature of 630° C.

In one or more embodiments, at 600° C., the first viscosity is in a range from about $2\times10^{11}$ poises to about $1\times10^{15}$ poises, from about $4\times10^{11}$ poises to about $1\times10^{15}$ poises, from about $5\times10^{11}$ poises to about $1\times10^{15}$ poises, from about $6\times10^{11}$ poises to about $1\times10^{15}$ poises, from about $8\times10^{11}$ poises to about $1\times10^{15}$ poises, from about $1\times10^{12}$ poises to about $1\times10^{15}$ poises, from about $2\times10^{12}$ poises to about $1\times10^{15}$ poises, from about $4\times10^{12}$ poises to about $1\times10^{15}$ poises, from about $5\times10^{12}$ poises to about $1\times10^{15}$ poises, from about $6\times10^{12}$ poises to about $1\times10^{15}$ poises, from about $8\times10^{12}$ poises to about $1\times10^{15}$ poises, from about $1\times10^{13}$ poises to about $1\times10^{15}$ poises, from about $2\times10^{13}$ poises to about $1\times10^{15}$ poises, from about $4\times10^{13}$ poises to about $1\times10^{15}$ poises, from about $5\times10^{13}$ poises to about $1\times10^{15}$ poises, from about $6\times10^{13}$ poises to about $1\times10^{15}$ poises, from about $8\times10^{13}$ poises to about $1\times10^{15}$ poises, from about $1\times10^{14}$ poises to about $1\times10^{15}$ poises, from about $2\times10^{11}$ poises to about $8\times10^{14}$ poises, from about $2\times10^{11}$ poises to about $6\times10^{14}$ poises, from about $2\times10^{11}$ poises to about $5\times10^{14}$ poises, from about $2\times10^{11}$ poises to about $4\times10^{14}$ poises, from about $2\times10^{11}$ poises to about $2\times10^{14}$ poises, from about $2\times10^{11}$ poises to about $1\times10^{14}$ poises, from about $2\times10^{11}$ poises to about $8\times10^{13}$ poises, from about $2\times10^{11}$ poises to about $6\times10^{13}$ poises, from about $2\times10^{11}$ poises to about $5\times10^{13}$ poises, from about $2\times10^{11}$ poises to about $4\times10^{13}$ poises, from about $2\times10^{11}$ poises to about $2\times10^{13}$ poises, from about $2\times10^{11}$ poises to about $1\times10^{13}$ poises, from about $2\times10^{11}$ poises to about $8\times10^{12}$ poises, from about $2\times10^{11}$ poises to about $6\times10^{12}$ poises, or from about $2\times10^{11}$ poises to about $5\times10^{12}$ poises.

In one or more embodiments, at 630° C., the first viscosity is in a range from about $2\times10^{10}$ poises to about $1\times10^{13}$ poises, from about $4\times10^{10}$ poises to about $1\times10^{13}$ poises, from about $5\times10^{10}$ poises to about $1\times10^{13}$ poises, from about $6\times10^{10}$ poises to about $1\times10^{13}$ poises, from about $8\times10^{10}$ poises to about $1\times10^{13}$ poises, from about $1\times10^{11}$ poises to about $1\times10^{13}$ poises, from about $2\times10^{11}$ poises to about $1\times10^{13}$ poises, from about $4\times10^{11}$ poises to about $1\times10^{13}$ poises, from about $5\times10^{11}$ poises to about $1\times10^{13}$ poises, from about $6\times10^{11}$ poises to about $1\times10^{13}$ poises, from about $8\times10^{11}$ poises to about $1\times10^{13}$ poises, from about $1\times10^{12}$ poises to about $1\times10^{13}$ poises, from about $2\times10^{10}$ poises to about $8\times10^{12}$ poises, from about $2\times10^{10}$ poises to about $6\times10^{12}$ poises, from about $2\times10^{10}$ poises to about $5\times10^{12}$ poises, from about $2\times10^{10}$ poises to about $4\times10^{12}$ poises, from about $2\times10^{10}$ poises to about $2\times10^{12}$ poises, from about $2\times10^{10}$ poises to about $1\times10^{12}$ poises, from about $2\times10^{10}$ poises to about $8\times10^{11}$ poises, from about $2\times10^{10}$ poises to about $6\times10^{11}$ poises, from about $2\times10^{10}$ poises to about $5\times10^{11}$ poises, from about $2\times10^{10}$ poises to about $4\times10^{11}$ poises, or from about $2\times10^{10}$ poises to about $2\times10^{11}$ poises.

In one or more embodiments, at 650° C., the first viscosity is in a range from about $1\times10^{10}$ poises to about $1\times10^{13}$ poises, from about $2\times10^{10}$ poises to about $1\times10^{13}$ poises, from about $4\times10^{10}$ poises to about $1\times10^{13}$ poises, from about $5\times10^{10}$ poises to about $1\times10^{13}$ poises, from about $6\times10^{10}$ poises to about $1\times10^{13}$ poises, from about $8\times10^{10}$ poises to about $1\times10^{13}$ poises, from about $1\times10^{11}$ poises to about $1\times10^{13}$ poises, from about $2\times10^{11}$ poises to about $1\times10^{13}$ poises, from about $4\times10^{11}$ poises to about $1\times10^{13}$ poises, from about $4\times10^{11}$ poises to about $1\times10^{13}$ poises, from about $5\times10^{11}$ poises to about $1\times10^{13}$ poises, from about $6\times10^{11}$ poises to about $1\times10^{13}$ poises, from about $8\times10^{11}$ poises to about $1\times10^{13}$ poises, from about $1\times10^{12}$ poises to about $1\times10^{13}$ poises, from about $1\times10^{10}$ poises to about $8\times10^{12}$ poises, from about $1\times10^{10}$ poises to about $6\times10^{12}$ poises, from about $1\times10^{10}$ poises to about $5\times10^{12}$ poises, from about $1\times10^{10}$ poises to about $4\times10^{12}$ poises, from about $1\times10^{10}$ poises to about $2\times10^{12}$ poises, from about $1\times10^{10}$ poises to about $1\times10^{12}$ poises, from about $1\times10^{10}$ poises to about $8\times10^{11}$ poises, from about $1\times10^{10}$ poises to about $6\times10^{11}$ poises, from about $1\times10^{10}$ poises to about $5\times10^{11}$ poises, from about $1\times10^{10}$ poises to about $4\times10^{11}$ poises, from about $1\times10^{10}$ poises to about $2\times10^{11}$ poises, or from about $1\times10^{10}$ poises to about $1\times10^{11}$ poises.

In one or more embodiments, at 600° C., the second viscosity is in a range from about $3\times10^{10}$ poises to about $8\times10^{10}$ poises, from about $4\times10^{10}$ poises to about $8\times10^{10}$ poises, from about $5\times10^{10}$ poises to about $8\times10^{10}$ poises, from about $6\times10^{10}$ poises to about $8\times10^{10}$ poises, from about $3\times10^{10}$ poises to about $7\times10^{10}$ poises, from about $3\times10^{10}$ poises to about $6\times10^{10}$ poises, from about $3\times10^{10}$ poises to about $5\times10^{10}$ poises, or from about $4\times10^{10}$ poises to about $6\times10^{10}$ poises.

In one or more embodiments, at 630° C., the second viscosity is in a range from about $1\times10^{9}$ poises to about $1\times10^{10}$ poises, from about $2\times10^{9}$ poises to about $1\times10^{10}$ poises, from about $3\times10^{9}$ poises to about $1\times10^{10}$ poises, from about $4\times10^{9}$ poises to about $1\times10^{10}$ poises, from about $5\times10^{9}$ poises to about $1\times10^{10}$ poises, from about $6\times10^{9}$ poises to about $1\times10^{10}$ poises, from about $1\times10^{9}$ poises to about $9\times10^{9}$ poises, from about $1\times10^{9}$ poises to about $8\times10^{9}$ poises, from about $1\times10^{9}$ poises to about $7\times10^{9}$ poises, from about $1\times10^{9}$ poises to about $6\times10^{9}$ poises, from about $4\times10^{9}$ poises to about $8\times10^{9}$ poises, or from about $5\times10^{9}$ poises to about $7\times10^{9}$ poises.

In one or more embodiments, at 650° C., the second viscosity is in a range from about $5\times10^{8}$ poises to about $5\times10^{9}$ poises, from about $6\times10^{8}$ poises to about $5\times10^{9}$ poises, from about $7\times10^{8}$ poises to about $5\times10^{9}$ poises, from about $8\times10^{8}$ poises to about $5\times10^{9}$ poises, from about $9\times10^{8}$ poises to about $5\times10^{9}$ poises, from about $1\times10^{9}$ poises to about $5\times10^{9}$ poises, from about $1\times10^{9}$ poises to about $4\times10^{9}$ poises, from about $1\times10^{9}$ poises to about $3\times10^{9}$ poises, from about $5\times10^{8}$ poises to about $4\times10^{9}$ poises, from about $5\times10^{8}$ poises to about $3\times10^{9}$ poises, from about $5\times10^{8}$ poises to about $2\times10^{9}$ poises, from about $5\times10^{8}$ poises to about $1\times10^{9}$ poises, from about $5\times10^{8}$ poises to about $9\times10^{8}$ poises, from about $5\times10^{8}$ poises to about $8\times10^{8}$ poises, or from about $5\times10^{8}$ poises to about $7\times10^{8}$ poises.

In one or more embodiments, one or both the first sag depth 418 and the second sag depth 428 is about 2 mm or greater. For example, one or both the first sag depth 418 and the second sag depth 428 may be in a range from about 2 mm to about 30 mm, from about 4 mm to about 30 mm, from about 5 mm to about 30 mm, from about 6 mm to about 30 mm, from about 8 mm to about 30 mm, from about 10 mm to about 30 mm, from about 12 mm to about 30 mm, from about 14 mm to about 30 mm, from about 15 mm to about 30 mm, from about 2 mm to about 28 mm, from about 2 mm to about 26 mm, from about 2 mm to about 25 mm, from about 2 mm to about 24 mm, from about 2 mm to about 22 mm, from about 2 mm to about 20 mm, from about 2 mm to about 18 mm, from about 2 mm to about 16 mm, from about 2 mm to about 15 mm, from about 2 mm to about 14 mm, from about 2 mm to about 12 mm, from about 2 mm to about 10 mm, from about 2 mm to about 8 mm, from about 6 mm to about 20 mm, from about 8 mm to about 18 mm, from about 10 mm to about 15 mm, from about 12 mm to about 22 mm, from about 15 mm to about 25 mm, or from about 18 mm to about 22 mm.

In one or more embodiments, the first sag depth 418 and the second sag depth 428 are substantially equal to one another. In one or more embodiments, the first sag depth is within 10% of the second sag depth. For example, the first sag depth is within 9%, within 8%, within 7%, within 6% or within 5% of the second sag depth. For illustration, the second sag depth is about 15 mm, and the first sag depth is in a range from about 14.5 mm to about 16.5 mm (or within 10% of the second sag depth).

In one or more embodiments, the first curved glass layer and the second curved glass layer comprise a shape deviation therebetween of +5 mm or less as measured by an optical three-dimensional scanner such as the ATOS Triple Scan supplied by GOM GmbH, located in Braunschweig, Germany. In one or more embodiments, the shape deviation is measured between the second surface 414 and the third surface 422, or between the first surface 412 and the fourth surface 424. In one or more embodiments, the shape deviation between the first glass layer and the second glass layer is about ±4 mm or less, about ±3 mm or less, about ±2 mm or less, about ±1 mm or less, about ±0.8 mm or less, about =0.6 mm or less, about ±0.5 mm or less, about ±0.4 mm or less, about ±0.3 mm or less, about ±0.2 mm or less, or about ±0.1 mm or less. As used herein, the shape deviation refers to the maximum shape deviation measured on the respective surfaces.

In one or more embodiments, one of or both the first major surface 412 and the fourth major surface 424 exhibit minimal optical distortion. For example, one of or both the first major surface 412 and the fourth major surface 424 exhibit optical distortion of less than about 400 millidiopters, less than about 300 millidiopters, or less than about 250 millidiopters, as measured by an optical distortion detector using transmission optics according to ASTM 1561. A suitable optical distortion detector is supplied by ISRA VISIION AG, located in Darmstadt, Germany, under the tradename SCREENSCAN-Faultfinder. In one or more embodiments, one of or both the first major surface 312 and the fourth major surface 324 exhibit optical distortion of about 190 millidiopters or less, about 180 millidiopters or less, about 170 millidiopters or less, about 160 millidiopters or less, about 150 millidiopters or less, about 140 millidiopters or less, about 130 millidiopters or less, about 120 millidiopters or less, about 110 millidiopters or less, about 100 millidiopters or less, about 90 millidiopters or less, about 80 millidiopters or less, about 70 millidiopters or less, about 60 millidiopters or less, or about 50 millidiopters or less. As used herein, the optical distortion refers to the maximum optical distortion measured on the respective surfaces.

In one or more embodiments, the third major surface or the fourth major surface of the second curved glass layer exhibits low membrane tensile stress. Membrane tensile stress can occur during cooling of curved layers and laminates. As the glass cools, the major surfaces and edge surfaces (orthogonal to the major surfaces) can develop surface compression, which is counterbalanced by a central region exhibiting a tensile stress. Bending or shaping can introduce additional surface tension near the edge and causes the central tensile region to approach the glass surface. Accordingly, membrane tensile stress is the tensile stress measured near the edge (e.g., about 10-25 mm from the edge surface). In one or more embodiments, the membrane tensile stress at the third major surface or the fourth major surface of the second curved glass layer is less than about 7 MPa as measured by a surface stress meter according to ASTM C1279. An example of such a surface stress meter is supplied by Strainoptic Technologies under the trademark GASP® (Grazing Angle Surface Polarimeter). In one or more embodiments, the membrane tensile stress at the third major surface or the fourth major surface of the second curved glass layer is about 6 MPa or less, about 5 MPa or less, about 4 MPa or less, or about 3 MPa or less. In one or more embodiments, the lower limit of membrane tensile stress is about 0.01 MPa or about 0.1 MPa.

In one or more embodiments, the membrane compressive stress at the third major surface or the fourth major surface of the second curved glass layer is less than about 7 MPa as measured by a surface stress meter according to ASTM C1279. A surface stress meter such as the surface stress meter supplied by Strainoptic Technologies under the trademark GASP® (Grazing Angle Surface Polarimeter) may be used. In one or more embodiments, the membrane compressive stress at the third major surface or the fourth major surface of the second curved glass layer is about 6 MPa or less, about 5 MPa or less, about 4 MPa or less, or about 3 MPa or less. In one or more embodiments, the lower limit of membrane compressive stress is about 0.01 MPa or about 0.1 MPa.

In one or more embodiments, the laminate 400 may have a thickness of 6.85 mm or less, or 5.85 mm or less, where the thickness comprises the sum of thicknesses of the first curved glass layer, the second curved glass layer, the interlayer (and any other layers). In various embodiments, the laminate may have a thickness in the range of about 1.8 mm to about 6.85 mm, or in the range of about 1.8 mm to about 5.85 mm, or in the range of about 1.8 mm to about 5.0 mm, or 2.1 mm to about 6.85 mm, or in the range of about 2.1 mm to about 5.85 mm, or in the range of about 2.1 mm to about 5.0 mm, or in the range of about 2.4 mm to about 6.85 mm, or in the range of about 2.4 mm to about 5.85 mm, or in the range of about 2.4 mm to about 5.0 mm, or in the range of about 3.4 mm to about 6.85 mm, or in the range of about 3.4 mm to about 5.85 mm, or in the range of about 3.4 mm to about 5.0 mm.

In one or more embodiments, the laminate 400 exhibits at least one radius of curvature that is less than 1000 mm, or less than 750 mm, or less than 500 mm, or less than 300 mm. In one or more embodiments, the laminate 300 exhibits at least one radius of curvature of about 10 m or less, or about 5 m or less along at least one axis. In one or more embodiments, the laminate 400 may have a radius of curvature of 5 m or less along at least a first axis and along the second axis that is perpendicular to the first axis. In one or more embodiments, the laminate may have a radius of curvature of 5 m or less along at least a first axis and along the second axis that is not perpendicular to the first axis.

In one or more embodiments the first curved glass layer 410 is relatively thin in comparison to the second curved glass layer 420. In other words, the second curved glass layer has a thickness greater than the first curved glass layer. In one or more embodiments, the second thickness is more than two times the first thickness. In one or more embodiments, the second thickness is in the range from about 1.5 times to about 10 times the first thickness (e.g., from about 1.75 times to about 10 times, from about 2 times to about 10 times, from about 2.25 times to about 10 times, from about 2.5 times to about 10 times, from about 2.75 times to about 10 times, from about 3 times to about 10 times, from about 3.25 times to about 10 times, from about 3.5 times to about 10 times, from about 3.75 times to about 10 times, from about 4 times to about 10 times, from about 1.5 times to about 9 times, from about 1.5 times to about 8 times, from about 1.5 times to about 7.5 times, from about 1.5 times to about 7 times, from about 1.5 times to about 6.5 times, from about 1.5 times to about 6 times, from about 1.5 times to about 5.5 times, from about 1.5 times to about 5 times, from about 1.5 times to about 4.5 times, from about 1.5 times to about 4 times, from about 1.5 times to about 3.5 times, from about 2 times to about 7 times, from about 2.5 times to about 6 times, from about 3 times to about 6 times).

In one or more embodiments, the first curved glass layer 410 and the second curved glass layer 420 may have the same thickness. In one or more specific embodiments, the second curved glass layer is more rigid or has a greater stiffness than the first curved glass layer, and in very specific embodiments, both the first curved glass layer and the second curved glass layer have a thickness in the range of 0.2 mm and 1.6 mm.

In one or more embodiments, either one or both the first thickness 416 and the second thickness 426 is less than 1.6 mm (e.g., 1.55 mm or less, 1.5 mm or less, 1.45 mm or less, 1.4 mm or less, 1.35 mm or less, 1.3 mm or less, 1.25 mm or less, 1.2 mm or less, 1.15 mm or less, 1.1 mm or less, 1.05 mm or less, 1 mm or less, 0.95 mm or less, 0.9 mm or less, 0.85 mm or less, 0.8 mm or less, 0.75 mm or less, 0.7 mm or less, 0.65 mm or less, 0.6 mm or less, 0.55 mm or less, 0.5 mm or less, 0.45 mm or less, 0.4 mm or less, 0.35 mm or less, 0.3 mm or less, 0.25 mm or less, 0.2 mm or less, 0.15 mm or less, or about 0.1 mm or less). The lower limit of thickness may be 0.1 mm, 0.2 mm or 0.3 mm. In some embodiments, either one or both the first thickness) and the second thickness is in the range from about 0.1 mm to less than about 1.6 mm, from about 0.1 mm to about 1.5 mm, from about 0.1 mm to about 1.4 mm, from about 0.1 mm to about 1.3 mm, from about 0.1 mm to about 1.2 mm, from about 0.1 mm to about 1.1 mm, from about 0.1 mm to about 1 mm, from about 0.1 mm to about 0.9 mm, from about 0.1 mm to about 0.8 mm, from about 0.1 mm to about 0.7 mm, from about 0.1 mm to about 0.2 mm to less than about 1.6 mm, from about 0.3 mm to less than about 1.6 mm, from about 0.4 mm to less than about 1.6 mm, from about 0.5 mm to less than about 1.6 mm, from about 0.6 mm to less than about 1.6 mm, from about 0.7 mm to less than about 1.6 mm, from about 0.8 mm to less than about 1.6 mm, from about 0.9 mm to less than about 1.6 mm, or from about 1 mm to about 1.6 mm.

In some embodiments, while one of the first thickness 416 and the second thickness 426 is less than about 1.6 mm, the other of the first thickness and the second thickness is about 1.6 mm or greater. In such embodiments, first thickness and the second thickness differ from one another. For example, the while one of the first thickness 416 and the second thickness 426 is less than about 1.6 mm, the other of the first thickness and the second thickness is about 1.7 mm or greater, about 1.75 mm or greater, about 1.8 mm or greater, about 1.7 mm or greater, about 1.7 mm or greater, about 1.7 mm or greater, about 1.85 mm or greater, about 1.9 mm or greater, about 1.95 mm or greater, about 2 mm or greater, about 2.1 mm or greater, about 2.2 mm or greater, about 2.3 mm or greater, about 2.4 mm or greater, about 2.5 mm or greater, 2.6 mm or greater, 2.7 mm or greater, 2.8 mm or greater, 2.9 mm or greater, 3 mm or greater, 3.2 mm or greater, 3.4 mm or greater, 3.5 mm or greater, 3.6 mm or greater, 3.8 mm or greater, 4 mm or greater, 4.2 mm or greater, 4.4 mm or greater, 4.6 mm or greater, 4.8 mm or greater, 5 mm or greater, 5.2 mm or greater, 5.4 mm or greater, 5.6 mm or greater, 5.8 mm or greater, or 6 mm or greater. In some embodiments the first thickness or the second thickness is in a range from about 1.6 mm to about 6 mm, from about 1.7 mm to about 6 mm, from about 1.8 mm to about 6 mm, from about 1.9 mm to about 6 mm, from about 2 mm to about 6 mm, from about 2.1 mm to about 6 mm, from about 2.2 mm to about 6 mm, from about 2.3 mm to about 6 mm, from about 2.4 mm to about 6 mm, from about 2.5 mm to about 6 mm, from about 2.6 mm to about 6 mm, from about 2.8 mm to about 6 mm, from about 3 mm to about 6 mm, from about 3.2 mm to about 6 mm, from about 3.4 mm to about 6 mm, from about 3.6 mm to about 6 mm, from about 3.8 mm to about 6 mm, from about 4 mm to about 6 mm, from about 1.6 mm to about 5.8 mm, from about 1.6 mm to about 5.6 mm, from about 1.6 mm to about 5.5 mm, from about 1.6 mm to about 5.4 mm, from about 1.6 mm to about 5.2 mm, from about 1.6 mm to about 5 mm, from about 1.6 mm to about 4.8 mm, from about 1.6 mm to about 4.6 mm, from about 1.6 mm to about 4.4 mm, from about 1.6 mm to about 4.2 mm, from about 1.6 mm to about 4 mm, from about 3.8 mm to about 5.8 mm, from about 1.6 mm to about 3.6 mm, from about 1.6 mm to about 3.4 mm, from about 1.6 mm to about 3.2 mm, or from about 1.6 mm to about 3 mm.

In one or more embodiments, the laminate 400 is substantially free of visual distortion as measured by ASTM C1652/C1652M. In specific embodiments, the laminate, the first curved glass layer 410 and/or the second curved glass layer 420 are substantially free of wrinkles or distortions that can be visually detected by the naked eye, according to ASTM C1652/C1652M.

In one or more embodiments, the third major surface 422 or the fourth major surface 424 comprises a surface compressive stress of less than 3 MPa as measured by a FSM surface stress meter. In some embodiments, the second curved glass layer is unstrengthened as will be described herein (but may optionally be annealed), and exhibits a surface compressive stress of less than about 3 MPa, or about 2.5 MPa or less, 2 MPa or less, 1.5 MPa or less, 1 MPa or less, or about 0.5 MPa or less, as measured on the third surface 422 or the fourth surface 424. In some embodiments, such surface compressive stress ranges are present on both the third major surface and the fourth major surface.

In one or more embodiments, either one or both the first curved glass layer 410 and the second curved glass layer 420 is strengthened, as described herein. In one or more embodiments, the first curved glass layer comprises a strengthened glass article according to the embodiments described herein, while the second curved glass layer is not strengthened. In one or more embodiments, the first curved glass layer comprises a strengthened glass article according to the embodiments described herein, while the second curved glass layer is annealed. In one or more embodiments, the first curved glass layer is strengthened chemically, mechanically and/or thermally, while the second curved glass layer is strengthened in different manner than the first curved glass layer (chemically, mechanically and/or thermally). In one or more embodiments, the first curved glass layer is strengthened chemically, mechanically and/or thermally, while the second curved glass layer is strengthened in the same manner than the first curved glass layer (chemically, mechanically and/or thermally). In one or more embodiments, the first curved glass layer is strengthened and the second curved glass layer is not strengthened. In one or more embodiments, the first curved glass layer is strengthened and the second curved glass layer is annealed. In one or more embodiments, both the first curved glass layer and the second curved glass layer are strengthened (either in the same manner or differently from one another). In one or more embodiments, the second curved glass layer comprises a soda lime silicate glass, while the first glass substrate may be characterized as including one or more embodiments of the glass article described herein.

In one or more embodiments, the first curved glass layer 410 comprises a first length and a first width wherein, either one of or both the first length and the first width is about 0.25 meters or greater. In one or more embodiments, the second curved glass layer comprises a second length that is within 5% of the first length, and a second width that is within 5% of the first width. In one or more embodiments, the laminate 400 may be described as curved or complexly curved, as defined herein.

In one or more embodiments, the laminate 400 is automotive glazing or architectural glazing.

Another aspect of this disclosure includes a vehicle including a body defining an interior and an opening in communication with the interior; and laminate 400 disposed in the opening. In such embodiments, the laminate 400 may be complexly curved or simply curved, as defined herein.

Figure 7:
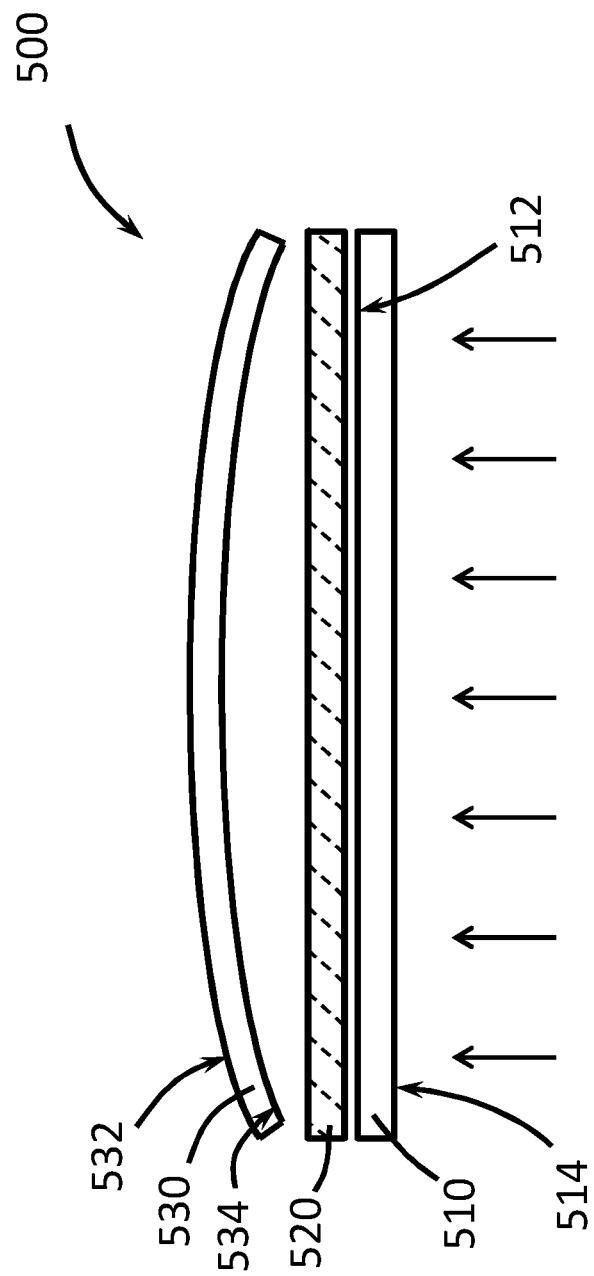
FIG. 7 is an exploded side view of the glass article to be cold-formed to another glass article according to one or more embodiments.

Another aspect of this disclosure pertains to a laminate 500 in which a first glass layer comprising an embodiment of a glass article described herein may be cold-formed (with an intervening interlayer) to a second glass layer. In an exemplary cold-formed laminate 500 shown in FIGS. 7-8, a first glass layer 510 (including a glass article according to one or more embodiments) is laminated to a relatively thicker and curved second glass layer 530. In FIG. 7, second glass layer 530 includes a first surface 532 and a second surface 534 in contact with an interlayer 520, and the first glass layer 510 includes a third surface 512 in contact with the interlayer 520 and a fourth surface 514. An indicator of a cold-formed laminate is the fourth surface 514 has a greater surface CS than the third surface 512. Accordingly, a cold-formed laminate can comprise a high compressive stress level on fourth surface 514 making this surface more resistant to fracture.

In one or more embodiments, prior to the cold-forming process, the respective compressive stresses in the third surface 512 and fourth surface 514 are substantially equal. In one or more embodiments in which the first glass layer is unstrengthened, the third surface 512 and the fourth surface 514 exhibit no appreciable compressive stress, prior to cold-forming. In one or more embodiments in which the first glass layer 510 is strengthened (as described herein), the third surface 512 and the fourth surface 514 exhibit substantially equal compressive stress with respect to one another, prior to cold-forming. In one or more embodiments, after cold-forming, the compressive stress on the fourth surface 514 increases (i.e., the compressive stress on the fourth surface 514 is greater after cold-forming than before cold-forming). Without being bound by theory, the cold-forming process increases the compressive stress of the glass layer being shaped (i.e., the first glass layer) to compensate for tensile stresses imparted during bending and/or forming operations. In one or more embodiments, the cold-forming process causes the third surface of that glass layer (i.e., the third surface 512) to experience tensile stresses, while the fourth surface of the glass layer (i.e., the fourth surface 514) experiences compressive stresses.

When a strengthened first glass layer 510 is utilized, the third and fourth surfaces (512, 514) are already under compressive stress, and thus the third surface 512 can experience greater tensile stress. This allows for the strengthened first glass layer 510 to conform to more tightly curved surfaces.

In one or more embodiments, the first glass layer 510 has a thickness less than the second glass layer 530. This thickness differential means the first glass layer 510 is more flexible to conform to the shape of the second glass layer 530. Moreover, a thinner first glass layer 510 may deform more readily to compensate for shape mismatches and gaps created by the shape of the second glass layer 530. In one or more embodiments, a thin and strengthened first glass layer 510 exhibits greater flexibility especially during cold-forming. In one or more embodiments, the first glass layer 510 conforms to the second glass layer 530 to provide a substantially uniform distance between the second surface 534 and the third surface 512, which is filled by the interlayer.

In some non-limiting embodiments, the cold-formed laminate 500 may be formed using an exemplary cold forming process that is performed at a temperature at or just above the softening temperature of the interlayer material (e.g., 520) (e.g., about 100° C. to about 120° C.), that is, at a temperature less than the softening temperature of the respective glass layers. In one embodiment as shown in FIG. 7, the cold-formed laminate may be formed by: placing an interlayer between the second glass layer (which is curved) and a first glass layer (which may be flat) to form a stack; applying pressure to the stack to press the second glass layer against the interlayer layer which is pressed against the first glass layer; and heating the stack to a temperature below 400° C. to form the cold-formed laminate in which the second glass layer conforms in shape to the first glass layer. Such a process can occur using a vacuum bag or ring in an autoclave or another suitable apparatus. The stress of an exemplary first glass layer 410 may change from substantially symmetrical to asymmetrical according to some embodiments of the present disclosure.

As used herein, "flat" and "planar" are used interchangeably and mean a shape having curvature less than a curvature at which lamination defects are created due to curvature mismatch, when such a flat layer is cold-formed to another layer (i.e., a radius of curvature of greater than or equal to about 3 meters, greater than or equal to about 4 meters or greater than or equal to about 5 meters). A flat layer has the foregoing shape when placed on a surface. As used herein, a "simple curve" or "simply curved" means a non-planar shape having curvature along one axis (forming a cylindrical shape or bend). As used herein "complex curve" and "complexly curved" mean a non-planar shape having curvature along two orthogonal axes that are different from one another. Examples of complexly curved shapes include having simple or compound curves, also referred to as non-developable shapes, which include but are not limited to spherical, aspherical, and toroidal. The complexly curved shapes may also include segments or portions of such surfaces, or be comprised of a combination of such curves and surfaces. In one or more embodiments, a laminate may have a simple curve or complex curve. In one or more embodiments the first glass layer, the second glass layer, the laminate or a combination thereof may have a simple curve or complexly curved shape and may be cold-formed. As a non-limiting example, the simply-curved laminate may have length and width dimensions of 0.5 m by 1.0 m and a radius of curvature of 2 to 5 m along a single axis.

A complexly curved laminate according to one or more embodiments may have a distinct radius of curvature in two independent directions. According to one or more embodiments, complexly curved laminates may thus be characterized as having "cross curvature," where the laminate is curved along an axis (i.e., a first axis) that is parallel to a given dimension and also curved along an axis (i.e., a second axis) that is perpendicular to the same dimension. The curvature of the laminate can be even more complex when a significant minimum radius is combined with a significant cross curvature, and/or depth of bend. Some laminates may also include bending along axes that are not perpendicular to one another. As a non-limiting example, the complexly-curved laminate may have length and width dimensions of 0.5 m by 1.0 m and a radius of curvature of 2 to 2.5 m along the minor axis, and a radius of curvature of 4 to 5 m along the major axis. In one or more embodiments, the complexly-curved laminate may have a radius of curvature of 5 m or less along at least one axis. In one or more embodiments, the complexly-curved laminate may have a radius of curvature of 5 m or less along at least a first axis and along the second axis that is perpendicular to the first axis. In one or more embodiments, the complexly-curved laminate may have a radius of curvature of 5 m or less along at least a first axis and along the second axis that is not perpendicular to the first axis.

Figure 8:
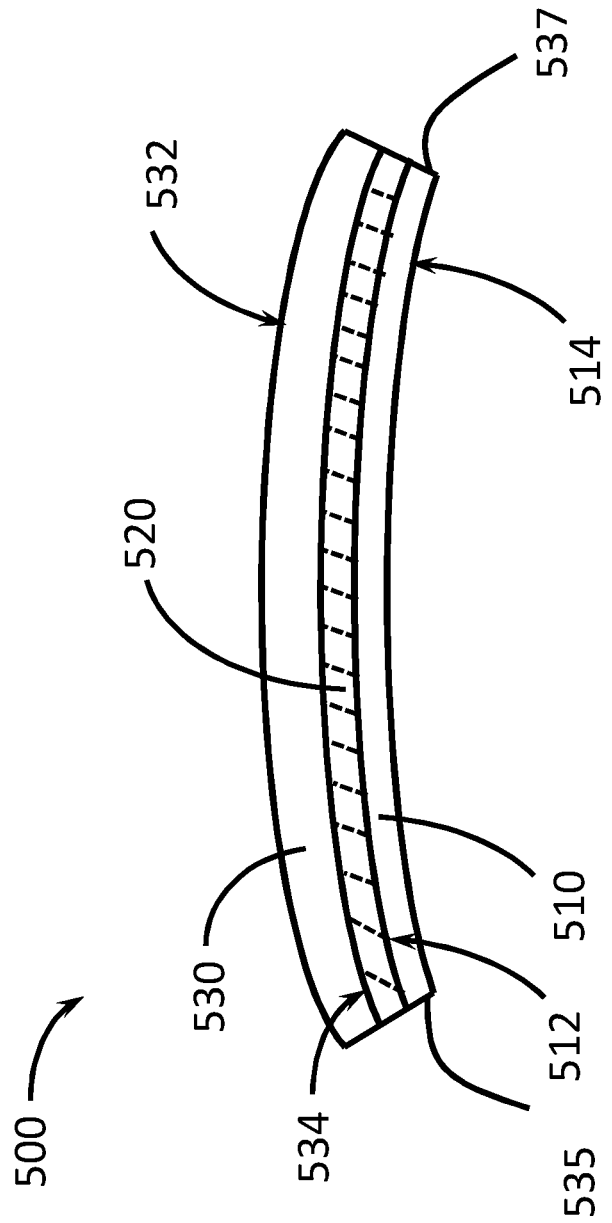
FIG. 8 is a side view illustration of the resulting cold-formed laminate of FIG. 6.

As shown in FIG. 8, first glass layer 410 may be simply-curved or complexly-curved and have at least one concave surface (e.g., surface 514) providing a fourth surface of the laminate and at least one convex surface (e.g., surface 512) to provide a third surface of the laminate opposite the first surface with a thickness therebetween. In the cold-forming embodiment, the second glass sheet 530 may be complexly-curved and have at least one concave surface (e.g., second surface 534) and at least one convex surface (e.g., first surface 532) with a thickness therebetween.

In one or more embodiments, one or more of interlayer 520, first glass layer 510, and second glass layer 530 comprise a first edge (e.g., 535) with a first thickness and a second edge (e.g., 537) opposite the first edge with a second thickness greater than the first thickness.

Figure 9:
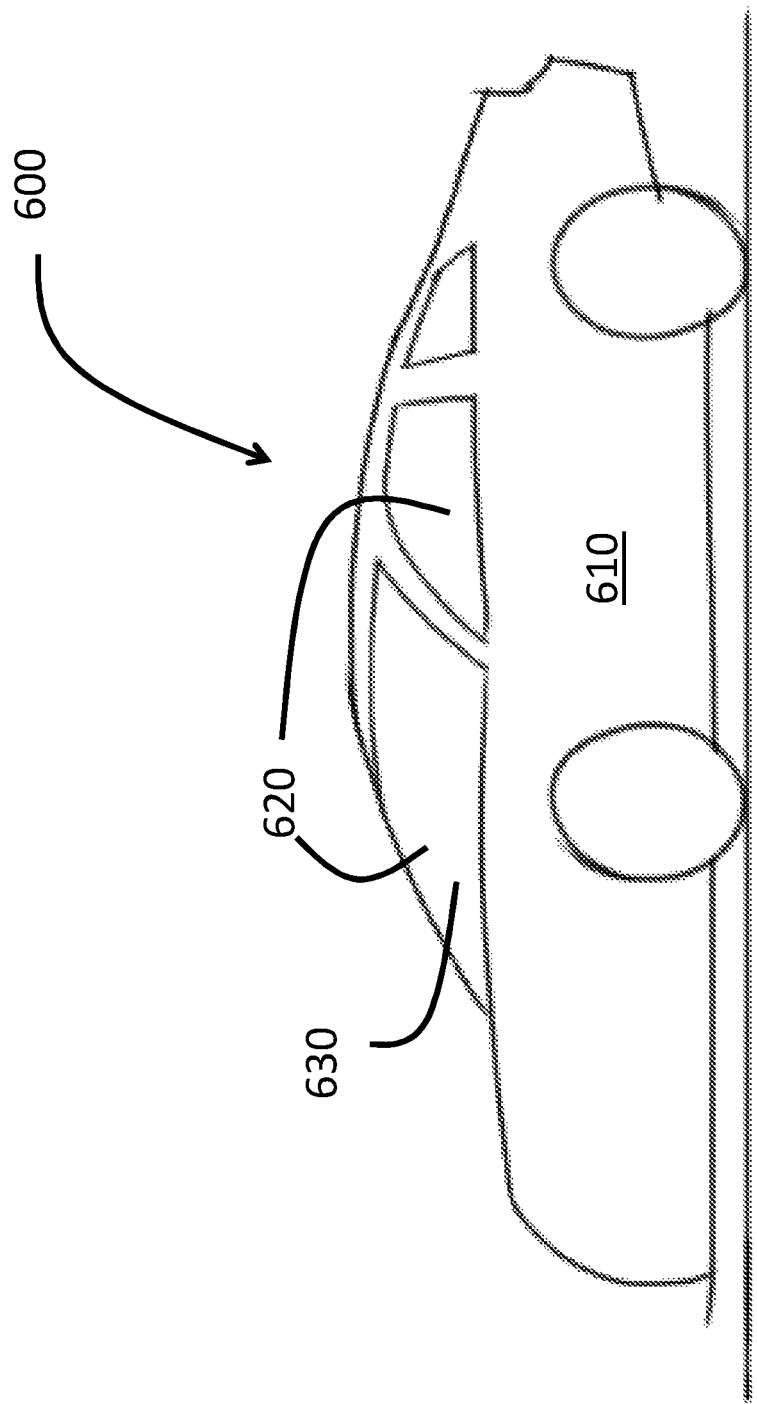
FIG. 9 is an illustration of a vehicle including a glass article or laminate according to one or more embodiments.

As otherwise described herein, one aspect of this disclosure pertains to a vehicle that includes the glass articles or laminates described herein. For example, as shown in FIG. 9 shows a vehicle 600 comprising a body 610 defining an interior, at least one opening 620 in communication with the interior, and a window disposed in the opening, wherein the window comprises a laminate or a glass article 630, according to one or more embodiments described herein. The laminate or glass article 630 may form the sidelights, windshields, rear windows, windows, rearview mirrors, and sunroofs in the vehicle. In some embodiments, the laminate or glass article 630 may form an interior partition (not shown) within the interior of the vehicle, or may be disposed on an exterior surface of the vehicle and form an engine block cover, headlight cover, taillight cover, door panel cover, or pillar cover. In one or more embodiments, the vehicle may include an interior surface (not shown, but may include door trim, seat backs, door panels, dashboards, center consoles, floor boards, rear view mirror and pillars), and the laminate or glass article 630 described herein is disposed on the interior surface. In one or more embodiment, the interior surface includes a display and the glass layer is disposed over the display. As used herein, vehicle includes automobiles, rolling stock, locomotive, boats, ships, and airplanes, helicopters, drones, space craft and the like.

Another aspect of this disclosure pertains to an architectural application that includes the glass articles or laminates described herein. In some embodiments, the architectural application includes balustrades, stairs, decorative panels or covering for walls, acoustic panels or coverings, columns, partitions, elevator cabs, household appliances, windows, furniture, and other applications, formed at least partially using a laminate or glass article according to one or more embodiments.

In one or more embodiments, the portion of the laminate including the glass article is positioned within a vehicle or architectural application such that the glass article faces the interior of the vehicle or the interior of a building or room, such that the glass article is adjacent to the interior (and the other glass ply is adjacent the exterior). In some embodiments, the glass article of the laminate is in direct contact with the interior (i.e., the surface of the glass article facing the interior is bare and is free of any coatings).

In one or more embodiments, the portion of the laminate including the glass article is positioned within a vehicle or architectural application such that the glass article faces the exterior of the vehicle or the exterior of a building or room, such that the glass article is adjacent to the exterior (and the other glass ply is adjacent the interior). In some embodiments, the glass article of the laminate is in direct contact with the exterior (i.e., the surface of the glass article facing the exterior is bare and is free of any coatings).

In one or more embodiments, the glass articles and/or laminates described herein may have added functionality in terms of incorporating display aspects (e.g., headsup display, projection surfaces, and the like), antennas, solar insulation, acoustic performance (e.g., sound dampening), anti-glare performance, anti-reflective performance, scratch-resistance and the like. Such functionality may be imparted by coatings or layers applied to the exposed surfaces of the laminate or to interior (unexposed) surfaces (e.g., between the glass layers or between a glass layer and an interlayer). In some embodiments, the laminate may have a thickness or configuration to enable improved optical performance when the laminate is used as a heads-up display (e.g., by incorporating a wedged shaped polymer interlayer between the glass layers or by shaping one of the glass layers to have a wedged shape). In one or more embodiments, the laminate includes a textured surface that provides anti-glare functionality and such textured surface may be disposed on an exposed surface or an interior surface that is unexposed. In one or more embodiments, the laminate may include an anti-reflective coating, a scratch-resistant coating or a combination thereof disposed on an exposed surface. In one or more embodiments, the laminate may include an antenna disposed on an exposed surface, and interior surface that is not exposed or embedded in any one of the glass layers. In one or more embodiments, the interlayer can be modified to have one or more of the following properties: ultraviolet (UV) absorption, Infrared (IR) absorption, IR reflection, acoustic control/dampening, adhesion promotion, and tint. The interlayer can be modified by a suitable additive such as a dye, a pigment, dopants, etc. to impart the desired property.

In a first example (referring to FIG. 5, 7 or 9), the laminate includes a first glass layer 310, 410, 510 comprising a glass article according to one or more embodiments, a second glass layer 330, 430, 520 comprising a SLG article, and an interlayer 320, 420, 530 comprising PVB. In one or more embodiments, the glass article used in the first layer has a thickness of about 1 mm or less. In some embodiments, the glass article in the first layer is chemically strengthened. In some embodiments, the SLG article used in the second glass layer is annealed. In one or more embodiments, the laminate is positioned in a vehicle such that the first glass layer (comprising the glass article according to one or more embodiments) faces the interior of the vehicle.

In a second example (referring to FIG. 5, 7 or 9), the laminate includes a first glass layer 310, 410, 510 comprising a glass article according to one or more embodiments, a second glass layer 330, 430, 520 comprising a SLG article, and an interlayer 320, 420, 530 comprising PVB. In one or more embodiments, the glass article used in the first layer has a thickness of about 1 mm or less. In some embodiments, the glass article in the first layer is thermally strengthened. In some embodiments, the SLG article used in the second glass layer is annealed. In one or more embodiments, the laminate is positioned in a vehicle such that the first glass layer (comprising the glass article according to one or more embodiments) faces the interior of the vehicle.

Another aspect of this disclosure pertains to a method for forming the laminate including a glass article as described herein. In one or more embodiments, the method includes stacking a first glass article according to any one or more embodiments described herein, and a second glass article that differs from the first glass article to form a stack, wherein the first glass layer comprises a first surface and an second surface that opposes the first surface, and the second glass article comprises a third surface and a fourth surface that opposes the third surface, and wherein the second surface is adjacent to the third surface. In one or more embodiments, the first glass article and the second glass article differ in any one or more of composition, thickness, strengthening level, and forming method. In one or more embodiments, the method includes placing the stack on a mold, heating the stack to a temperature at which the second glass article exhibits a viscosity of $10^{10}$ poise to form a shaped stack, and placing an interlayer between the first glass article and the second glass layer. In one or more embodiments, the shaped stack comprises a gap between the second surface and the third surface having a maximum distance of about 10 mm or less, 5 mm or less, or about 3 mm or less. In one or more embodiments, the second glass article is a SLG article. In one or more embodiments, the first glass article has a thickness of less than 1.6 mm (e.g., 1.5 mm or less, 1 mm or less, or 0.7 mm or less) and the second glass article has a thickness of 1.6 mm or greater (e.g., 1.8 mm or more, 2.0 mm or greater or 2.1 mm or greater). In one or more embodiments, the first glass article is fusion formed and the second glass article is float formed.

Another aspect of this disclosure pertains to devices that include the glass articles or laminates described herein. For example, the devices may include any device including a display. In one or more embodiments the devices are electronic devices, which can include mobile devices such as mobile phones, laptops, tablets, mp3 players, navigation devices and the like, or stationary devices such as computers, electronic displays, in vehicle information/entertainment systems, billboards, point of sale systems, navigation systems, and the like). An exemplary an electronic device includes a housing having front, back, and side surfaces; electrical components that are at least partially inside or entirely within the housing and including at least a controller, a memory, and a display at or adjacent to the front surface of the housing. The glass articles or laminates described herein may be disposed at or over the front surface of the housing such that it is over the display (i.e., forming a cover over the display). In some embodiments, the glass article or laminate may be used as a back cover.

EXAMPLES

Various embodiments will be further clarified by the following examples.

Examples 1-67

Examples 1-67 are exemplary glass compositions according to one or more embodiments of this disclosure. The glass compositions (in mol %) of Examples 1-67 are provided in Table 1. Table 1 also includes information related to the density at 20° C., strain point temperature (as measured by beam bending viscometer), annealing point temperature (as measured by beam bending viscometer), softening point temperature (as measured by fiber elongation), CTE, Stress Optical Coefficient, refractive index, $T_{200}$, $T_{35000}$, $T_{200000}$, liquidus temperature, liquidus viscosity, zircon breakdown temperature, zircon breakdown viscosity, and other attributes.

Examples 1-51, and 53-58, and 61 were fusion formed into glass articles having a thickness 1 mm or 0.55 mm as shown in Table 1, annealed and then chemically strengthened, as provided in Table 1. The resulting surface CS (MPa) and DOC (micrometers) values of the strengthened glass articles after being chemically strengthened are also provided in Table 1. The DOC values were measured using FSM.

TABLE 1

| Examples 1-67. | | | | | |
|---|---|---|---|---|---|
| Examples | 1 | 2 | 3 | 4 | 5 |
| Analyzed mol % | 177BUP | 177BUT | 177BUU | 177CLQ | 177CLR |
| $SiO_2$ | 73.13 | 73.02 | 72.51 | 70.48 | 70.70 |
| $Al_2O_3$ | 9.95 | 9.16 | 9.05 | 8.97 | 9.00 |
| $P_2O_5$ | 0.00 | 0.00 | 0.00 | 0.00 | 0.00 |
| $Na_2O$ | 13.13 | 13.02 | 14.32 | 15.50 | 16.32 |
| $K_2O$ | 1.94 | 2.64 | 1.87 | 2.93 | 2.90 |
| MgO | 0.05 | 0.05 | 0.05 | 0.05 | 0.03 |
| ZnO | 0.00 | 0.00 | 0.00 | 0.00 | 0.00 |
| CaO | 1.61 | 1.91 | 2.00 | 1.97 | 0.95 |
| $SnO_2$ | 0.20 | 0.20 | 0.19 | 0.10 | 0.10 |
| $R_2O - Al_2O_3$ | 5.11 | 6.50 | 7.14 | 9.46 | 10.22 |
| $R_2O:Al_2O_3$ | 1.51 | 1.71 | 1.79 | 2.06 | 2.14 |
| Density (g/cm³) | 2.428 | 2.434 | 2.439 | 2.453 | 2.447 |
| Strain Point (° C.) | 544 | 525 | 522 | 502 | 488 |
| Anneal Point (° C.) | 596 | 574 | 569 | 547 | 533 |
| Softening Point (° C.) | 839.1 | 808.5 | 795.5 | 756.3 | 745 |
| [Anneal Point (° C.) + Softening Point (° C.)]/2 | 718 | 691 | 682 | 652 | 639 |
| Coefficient of Thermal Expansion × $10^{-7}$ (1/° C.) | 82.6 | 85.4 | 86.7 | 95.5 | 96.2 |
| Stress Optical Coefficient (nm/mm/MPa) | 3.015 | 2.991 | 2.957 | 2.847 | 2.857 |
| Refractive Index | 1.4993 | 1.5005 | 1.5013 | 1.5035 | 1.5019 |
| 200 Poise Temperature (° C.) | 1733 | 1689 | 1660 | 1580 | 1577 |
| 35000 Poise Temperature (° C.) | 1169 | 1135 | 1117 | 1057 | 1050 |
| 200000 Poise Temperature (° C.) | 1055 | 1024 | 1010 | 955 | 946 |
| Liquidus Temperature (° C.) | | | | 875 | |
| Liquidus Viscosity (kP) | | | | 1075 | |
| Zircon Breakdown Temperature (° C.) | | | | 1155 | |

TABLE 1-continued

Examples 1-67.

| | | | | | |
|---|---|---|---|---|---|
| Zircon Breakdown Viscosity (kP) | | | | 9.0 | |
| T200P − T35kP (° C.) | 564 | 554 | 543 | 523 | 527 |
| Anneal Point (° C.) − Softening Point (° C.) | −243.1 | −234.5 | −226.5 | −209.3 | −212 |
| [Anneal Point (° C.) + Softening Point (° C.)]/2 − $T^{200}$ | −1016 | −998 | −978 | −928 | −938 |
| [Anneal Point (° C.) + Softening Point (° C.)]/2 − $T^{35000}$ | −452 | −444 | −435 | −406 | −411 |
| Ion-Exchange of Annealed parts in refined $KNO_3$ at 410° C. for 4 hours | | | | | |
| Thickness (mm) | 1.0 | 1.0 | 1.0 | 1.0 | 1.0 |
| Surface CS (MPa) | 673 | 564 | 586 | 639 | 565 |
| DOC (microns) | 20 | 38 | 33 | 37 | 43 |

| Examples | 6 | 7 | 8 | 9 | 10 |
|---|---|---|---|---|---|
| Analyzed mol % | 177CLS | 177CLT | 177CLU | 177CLV | 177CMC |
| $SiO_2$ | 70.85 | 69.62 | 69.76 | 70.04 | 70.55 |
| $Al_2O_3$ | 8.99 | 8.94 | 9.07 | 8.88 | 9.33 |
| $P_2O_5$ | 0.00 | 0.00 | 0.00 | 0.00 | 0.00 |
| $Na_2O$ | 14.22 | 15.91 | 17.21 | 14.10 | 14.02 |
| $K_2O$ | 2.85 | 2.91 | 2.88 | 2.88 | 2.77 |
| MgO | 0.07 | 0.06 | 0.02 | 0.09 | 0.07 |
| ZnO | 0.00 | 0.00 | 0.00 | 0.00 | 0.00 |
| CaO | 2.93 | 2.46 | 0.95 | 3.91 | 3.15 |
| $SnO_2$ | 0.10 | 0.10 | 0.10 | 0.10 | 0.10 |
| $R_2O$—$Al_2O_3$ | 8.08 | 9.88 | 11.02 | 8.11 | 7.46 |
| $R_2O$:$Al_2O_3$ | 1.90 | 2.10 | 2.22 | 1.91 | 1.80 |
| Density (g/cm³) | 2.453 | 2.461 | 2.454 | 2.467 | 2.453 |
| Strain Point (° C.) | 516 | 499 | 485 | 519 | 525 |
| Anneal Point (° C.) | 562 | 544 | 529 | 564 | 570 |
| Softening Point (° C.) | 776.4 | 749.6 | 736.6 | 772.6 | 787 |
| [Anneal Point (° C.) + Softening Point (° C.)]/2 | 669 | 647 | 633 | 668 | 679 |
| Coefficient of Thermal Expansion × $10^{-7}$(1/° C.) | 91.7 | 97 | 99.7 | 93.4 | 91.2 |
| Stress Optical Coefficient (nm/mm/MPa) | 2.869 | 2.851 | 2.816 | 2.86 | 2.9 |
| Refractive Index | 1.5044 | 1.5056 | 1.5033 | 1.5080 | 1.5000 |
| 200 Poise Temperature (° C.) | 1600 | 1542 | 1543 | 1558 | 1615 |
| 35000 Poise Temperature (° C.) | 1079 | 1041 | 1030 | 1063 | 1091 |
| 200000 Poise Temperature (° C.) | 976 | 940 | 927 | 964 | 988 |
| Liquidus Temperature (° C.) | 895 | 850 | 820 | 910 | |
| Liquidus Viscosity (kP) | 1067 | 1373 | 1976 | 628 | |
| Zircon Breakdown Temperature (° C.) | 1185 | 1155 | 1160 | 1155 | |
| Zircon Breakdown Viscosity (kP) | 8.2 | 7.2 | 6.1 | 9.3 | |
| T200P − T35kP (° C.) | 521 | 501 | 512 | 495 | 524 |
| Anneal Point (° C.) − Softening Point (° C.) | −214.4 | −205.6 | −207.6 | −208.6 | −217 |
| [Anneal Point (° C.) + Softening Point (° C.)]/2 − $T^{200}$ | −931 | −895 | −910 | −889 | −937 |
| [Anneal Point (° C.) + Softening Point (° C.)]/2 − $T^{35000}$ | −410 | −394 | −398 | −395 | −413 |
| Ion-Exchange of Annealed parts in refined $KNO_3$ at 410° C. for 4 hours | | | | | |
| Thickness (mm) | 1.0 | 1.0 | 1.0 | 1.0 | 1.0 |
| Surface CS (MPa) | 700 | 641 | 547 | 743 | 737 |
| DOC (microns) | 31 | 37 | 43 | 29 | 31 |

| Examples | 11 | 12 | 13 | 14 | 15 |
|---|---|---|---|---|---|
| Analyzed mol % | 177CMD | 177CME | 177CMF | 177CMG | 177CMH |
| $SiO_2$ | 69.65 | 69.04 | 70.23 | 69.49 | 69.31 |
| $Al_2O_3$ | 9.49 | 9.76 | 9.31 | 9.61 | 9.96 |
| $P_2O_5$ | 0.00 | 0.00 | 0.00 | 0.00 | 0.00 |
| $Na_2O$ | 14.38 | 14.44 | 14.50 | 14.87 | 14.79 |
| $K_2O$ | 2.88 | 2.90 | 2.87 | 2.92 | 2.86 |
| MgO | 0.07 | 0.08 | 0.07 | 0.06 | 0.07 |
| ZnO | 0.00 | 0.00 | 0.00 | 0.00 | 0.00 |
| CaO | 3.43 | 3.69 | 2.92 | 2.95 | 2.92 |
| $SnO_2$ | 0.10 | 0.10 | 0.10 | 0.10 | 0.10 |

TABLE 1-continued

| Examples 1-67. | | | | | |
|---|---|---|---|---|---|
| $R_2O$—$Al_2O_3$ | 7.76 | 7.58 | 8.06 | 8.18 | 7.69 |
| $R_2O$:$Al_2O_3$ | 1.82 | 1.78 | 1.87 | 1.85 | 1.77 |
| Density (g/cm$^3$) | 2.462 | 2.466 | 2.455 | 2.46 | 2.46 |
| Strain Point (° C.) | 525 | 525 | 518 | 518 | 523 |
| Anneal Point (° C.) | 569 | 570 | 563 | 563 | 568 |
| Softening Point (° C.) | 781.6 | 783.7 | 777.7 | 775.8 | 783.4 |
| [Anneal Point (° C.) + Softening Point (° C.)]/2 | 675 | 677 | 670 | 669 | 676 |
| Coefficient of Thermal Expansion × $10^{-7}$(1/° C.) | 93.3 | 93.4 | 93.1 | 94.2 | 94 |
| Stress Optical Coefficient (nm/mm/MPa) | 2.86 | 2.83 | 2.885 | 2.876 | 2.88 |
| Refractive Index | 1.5000 | 1.5000 | 1.5000 | 1.5000 | 1.5000 |
| 200 Poise Temperature (° C.) | 1598 | 1586 | 1595 | 1592 | 1594 |
| 35000 Poise Temperature (° C.) | 1082 | 1080 | 1076 | 1073 | 1081 |
| 200000 Poise Temperature (° C.) | 979 | 978 | 974 | 971 | 978 |
| Liquidus Temperature (° C.) | | | | | |
| Liquidus Viscosity (kP) | | | | | |
| Zircon Breakdown Temperature (° C.) | | | | | |
| Zircon Breakdown Viscosity (kP) | | | | | |
| T200P − T35kP (° C.) | 516 | 506 | 518 | 518 | 513 |
| Anneal Point (° C.) − Softening Point (° C. | −212.6 | −213.7 | −214.7 | −212.8 | −215.4 |
| [Anneal Point (° C.) + Softening Point (° C.)]/2 − $T^{200}$ | −922 | −909 | −924 | −922 | −918 |
| [Anneal Point (° C.) + Softening Point (° C.)]/2 − $T^{35000}$ | −406 | −403 | −406 | −404 | −406 |
| Ion-Exchange of Annealed parts in refined $KNO_3$ at 410° C. for 4 hours | | | | | |
| Thickness (mm) | 1.0 | 1.0 | 1.0 | 1.0 | 1.0 |
| Surface CS (MPa) | 748 | 765 | 703 | 738 | 747 |
| DOC (microns) | 31 | 31 | 34 | 31 | 33 |

| Examples | 16 | 17 | 18 | 19 | 20 |
|---|---|---|---|---|---|
| Analyzed mol % | 177CMI | 177CMJ | 177CMK | 177CML | 177CMM |
| $SiO_2$ | 67.72 | 67.19 | 66.23 | 66.77 | 65.69 |
| $Al_2O_3$ | 11.04 | 11.25 | 11.75 | 11.47 | 11.92 |
| $P_2O_5$ | 0.00 | 0.00 | 0.00 | 0.00 | 0.00 |
| $Na_2O$ | 16.24 | 16.30 | 16.24 | 16.25 | 16.32 |
| $K_2O$ | 2.91 | 2.92 | 2.90 | 2.91 | 2.94 |
| MgO | 0.05 | 0.06 | 0.06 | 0.06 | 0.07 |
| ZnO | 0.00 | 0.00 | 0.00 | 0.00 | 0.00 |
| CaO | 1.95 | 2.19 | 2.71 | 2.44 | 2.96 |
| $SnO_2$ | 0.10 | 0.10 | 0.10 | 0.10 | 0.10 |
| $R_2O$—$Al_2O_3$ | 8.11 | 7.97 | 7.39 | 7.70 | 7.34 |
| $R_2O$:$Al_2O_3$ | 1.74 | 1.71 | 1.63 | 1.67 | 1.62 |
| Density (g/cm$^3$) | 2.464 | 2.468 | 2.474 | 2.472 | 2.478 |
| Strain Point (° C.) | 520 | 523 | 532 | 528 | 534 |
| Anneal Point (° C.) | 564 | 568 | 576 | 572 | 578 |
| Softening Point (° C.) | 779.7 | 783.4 | 791.5 | 786.2 | 791.4 |
| [Anneal Point (° C.) + Softening Point (° C.)]/2 | 672 | 676 | 684 | 679 | 685 |
| Coefficient of Thermal Expansion × $10^{-7}$(1/° C.) | 97.4 | 97.6 | 97.9 | 97.6 | 99 |
| Stress Optical Coefficient (nm/mm/MPa) | 2.878 | 2.849 | 2.829 | 2.823 | 2.837 |
| Refractive Index | 1.5056 | 1.5067 | 1.5082 | 1.5073 | 1.5091 |
| 200 Poise Temperature (° C.) | 1598 | 1587 | 1599 | | 1591 |
| 35000 Poise Temperature (° C.) | 1082 | 1082 | 1091 | | 1090 |
| 200000 Poise Temperature (° C.) | 976 | 980 | 989 | | 988 |
| Liquidus Temperature (° C.) | | | | | |
| Liquidus Viscosity (kP) | | | | | |
| Zircon Breakdown Temperature (° C.) | | | | | |
| Zircon Breakdown Viscosity (kP) | | | | | |
| T200P − T35kP (° C.) | 515 | 504 | 508 | 0 | 501 |
| Anneal Point (° C.) − Softening Point (° C. | −215.7 | −215.4 | −215.5 | −214.2 | −213.4 |
| [Anneal Point (° C.) + Softening Point (° C.)]/2 − $T^{200}$ | −926 | −911 | −915 | | −906 |

TABLE 1-continued

Examples 1-67.

| | | | | | |
|---|---|---|---|---|---|
| [Anneal Point (° C.) + Softening Point (° C.)]/2 − $T^{35000}$ | −410 | −407 | −407 | | −405 |
| Ion-Exchange of Annealed parts in refined $KNO_3$ at 410° C. for 4 hours | | | | | |
| Thickness (mm) | 1.0 | 1.0 | 1.0 | 1.0 | 1.0 |
| Surface CS (MPa) | 753 | 747 | 809 | 774 | 804 |
| DOC (microns) | 37 | 38 | 35 | 35 | 35 |
| Ion-Exchange of Annealed parts in refined $KNO_3$ at 410° C. for 6 hours | | | | | |
| Thickness (mm) | 1.0 | 1.0 | 1.0 | 1.0 | 1.0 |
| Surface CS (MPa) | 727 | 774 | 814 | 774 | 806 |
| DOC (microns) | 45 | 43 | 42 | 43 | 43 |

| Examples | 21 | 22 | 23 | 24 | 25 |
|---|---|---|---|---|---|
| Analyzed mol % | 177CMN | 177CNK | 177CNL | 177CNM | 177CNN |
| $SiO_2$ | 65.63 | 68.04 | 67.43 | 66.97 | 66.55 |
| $Al_2O_3$ | 12.26 | 9.01 | 9.29 | 9.55 | 9.73 |
| $P_2O_5$ | 0.00 | 0.00 | 0.00 | 0.00 | 0.00 |
| $Na_2O$ | 15.90 | 16.03 | 16.08 | 16.01 | 16.09 |
| $K_2O$ | 2.83 | 2.86 | 2.87 | 2.86 | 2.87 |
| MgO | 0.08 | 2.02 | 2.03 | 2.04 | 1.99 |
| ZnO | 0.00 | 0.00 | 0.00 | 0.00 | 0.00 |
| CaO | 3.19 | 1.95 | 2.20 | 2.46 | 2.67 |
| $SnO_2$ | 0.10 | 0.10 | 0.10 | 0.10 | 0.10 |
| $R_2O$—$Al_2O_3$ | 6.48 | 9.87 | 9.67 | 9.32 | 9.23 |
| $R_2O$:$Al_2O_3$ | 1.53 | 2.10 | 2.04 | 1.98 | 1.95 |
| Density (g/cm³) | 2.478 | 2.466 | 2.47 | 2.472 | 2.475 |
| Strain Point (° C.) | 544 | 505 | 510 | 513 | 515 |
| Anneal Point (° C.) | 589 | 550 | 554 | 558 | 559 |
| Softening Point (° C.) | 804 | 762.7 | 763.1 | 766.3 | 766.4 |
| [Anneal Point (° C.) + Softening Point (° C.)]/2 | 697 | 656 | 659 | 662 | 663 |
| Coefficient of Thermal Expansion × $10^{-7}$(1/° C.) | 97.1 | 98.8 | 98.1 | 98.4 | 99.3 |
| Stress Optical Coefficient (nm/mm/MPa) | 2.84 | 2.832 | 2.825 | 2.855 | 2.829 |
| Refractive Index | 1.5098 | 1.5065 | 1.5074 | 1.5078 | 1.5085 |
| 200 Poise Temperature (° C.) | 1602 | 1545 | 1541 | 1540 | 1538 |
| 35000 Poise Temperature (° C.) | 1104 | 1048 | 1048 | 1052 | 1053 |
| 200000 Poise Temperature (° C.) | 1002 | 950 | 951 | 955 | 956 |
| Liquidus Temperature (° C.) | | 830 | 830 | 830 | 860 |
| Liquidus Viscosity (kP) | | 3374 | 3629 | 3861 | 1823 |
| Zircon Breakdown Temperature (C) | | 1115 | 1120 | 1105 | 1080 |
| Zircon Breakdown Viscosity (kP) | | 13.0 | 12.0 | 15.7 | 23.0 |
| T200P − T35kP (° C.) | 497 | 497 | 493 | 488 | 485 |
| Anneal Point (° C.) − Softening Point (° C. | −215 | −212.7 | −209.1 | −208.3 | −207.4 |
| [Anneal Point (° C.) + Softening Point (° C.)]/2 − $T^{200}$ | −905 | −889 | −882 | −878 | −876 |
| [Anneal Point (° C.) + Softening Point (° C.)]/2 − $T^{35000}$ | −408 | −392 | −390 | −390 | −391 |
| Ion-Exchange of Annealed parts in refined $KNO_3$ at 410° C. for 4 hours | | | | | |
| Thickness (mm) | 1.0 | 1.0 | 1.0 | 1.0 | 1.0 |
| Surface CS (MPa) | 854 | 705 | 732 | 766 | 766 |
| DOC (microns) | 34 | 36 | 34 | 33 | 33 |
| Ion-Exchange of Annealed parts in refined $KNO_3$ at 410° C. for 6 hours | | | | | |
| Thickness (mm) | 1.0 | 1.0 | 1.0 | 1.0 | 1.0 |
| Surface CS (MPa) | 848 | 690 | 735 | 757 | 761 |
| DOC (microns) | 41 | 42 | 41 | 39 | 39 |

| Examples | 26 | 27 | 28 | 29 | 30 |
|---|---|---|---|---|---|
| Analyzed mol % | 177CNO | 177CNP | 177CPV | 177CPW | 177CPX |
| $SiO_2$ | 66.06 | 65.42 | 67.47 | 66.43 | 65.44 |
| $Al_2O_3$ | 9.94 | 10.15 | 7.89 | 8.06 | 8.26 |

TABLE 1-continued

Examples 1-67.

| | | | | | |
|---|---|---|---|---|---|
| P$_2$O$_5$ | 0.00 | 0.00 | 0.00 | 0.00 | 0.00 |
| Na$_2$O | 16.07 | 16.23 | 16.25 | 16.70 | 16.50 |
| K$_2$O | 2.88 | 2.92 | 2.84 | 3.02 | 3.02 |
| MgO | 2.01 | 1.99 | 5.40 | 5.65 | 6.64 |
| ZnO | 0.00 | 0.00 | 0.00 | 0.00 | 0.00 |
| CaO | 2.94 | 3.20 | 0.04 | 0.04 | 0.04 |
| SnO$_2$ | 0.10 | 0.10 | 0.11 | 0.11 | 0.11 |
| R$_2$O—Al$_2$O$_3$ | 9.01 | 8.99 | 11.20 | 11.66 | 11.25 |
| R$_2$O:Al$_2$O$_3$ | 1.91 | 1.89 | 2.42 | 2.45 | 2.36 |
| Density (g/cm$^3$) | 2.48 | 2.484 | 2.451 | 2.456 | 2.461 |
| Strain Point (° C.) | 519 | 518 | 501 | 505 | 509 |
| Anneal Point (° C.) | 563 | 563 | 548 | 552 | 556 |
| Softening Point (° C.) | 770.7 | 769.8 | 765.2 | 766.4 | 771.5 |
| [Anneal Point (° C.) + Softening Point (° C.)]/2 | 667 | 666 | 657 | 659 | 664 |
| Coefficient of Thermal Expansion × 10$^{-7}$(1/° C.) | 99.2 | 100.6 | 100.5 | 100.4 | 101.5 |
| Stress Optical Coefficient (nm/mm/MPa) | 2.808 | 2.798 | 2.864 | 2.866 | 2.852 |
| Refractive Index | 1.5097 | 1.5107 | 1.5043 | 1.5070 | 1.5071 |
| 200 Poise Temperature (° C.) | 1531 | 1527 | 1525 | 1523 | 1521 |
| 35000 Poise Temperature (° C.) | 1053 | 1051 | 1049 | 1055 | 1056 |
| 200000 Poise Temperature (° C.) | 957 | 955 | 952 | 958 | 963 |
| Liquidus Temperature (° C.) | 850 | | <780 | <790 | 825 |
| Liquidus Viscosity (kP) | 2235 | | >16869 | >20613 | 3294 |
| Zircon Breakdown Temperature (° C.) | 1090 | | 1105 | 1105 | 1055 |
| Zircon Breakdown Viscosity (kP) | 19.8 | | 15 | 16 | 35 |
| T200P − T35kP (° C.) | 478 | 476 | 476 | 468 | 465 |
| Anneal Point (° C.) − Softening Point (° C.) | −207.7 | −206.8 | −217.2 | −214.4 | −215.5 |
| [Anneal Point (° C.) + Softening Point (° C.)]/2 − T$^{200}$ | −865 | −860 | −869 | −864 | −857 |
| [Anneal Point (° C.) + Softening Point (° C.)]/2 − T$^{35000}$ | −387 | −384 | −392 | −396 | −392 |
| Ion-Exchange of Annealed parts in refined KNO$_3$ at 410° C. for 4 hours | | | | | |
| Thickness (mm) | 1.0 | 1.0 | 1.0 | 1.0 | 1.0 |
| Surface CS (MPa) | 855 | 839 | 684 | 757 | 771 |
| DOC (microns) | 30 | 30 | 42 | 38 | 40 |
| Ion-Exchange of Annealed parts in refined KNO$_3$ at 410° C. for 6 hours | | | | | |
| Thickness (mm) | 1.0 | 1.0 | 1.0 | 1.0 | 1.0 |
| Surface CS (MPa) | 859 | 829 | 675 | 725 | 771 |
| DOC (microns) | 35 | 38 | 49 | 46 | 47 |

| Examples | 31 | 32 | 33 | 34 | 35 |
|---|---|---|---|---|---|
| Analyzed mol % | 177CPY | 177CPZ | 177CQA | 177CPD | 177CPE |
| SiO$_2$ | 66.91 | 66.72 | 65.80 | 67.73 | 67.41 |
| Al$_2$O$_3$ | 8.53 | 8.64 | 8.87 | 9.00 | 8.95 |
| P$_2$O$_5$ | 0.00 | 0.00 | 0.00 | 0.23 | 0.47 |
| Na$_2$O | 16.84 | 16.69 | 16.56 | 16.10 | 16.21 |
| K$_2$O | 3.04 | 2.95 | 2.96 | 2.89 | 2.90 |
| MgO | 0.01 | 0.01 | 0.01 | 2.00 | 1.99 |
| ZnO | 4.54 | 4.85 | 5.66 | 0.00 | 0.00 |
| CaO | 0.04 | 0.04 | 0.04 | 1.95 | 1.97 |
| SnO$_2$ | 0.10 | 0.10 | 0.10 | 0.10 | 0.10 |
| R$_2$O—Al$_2$O$_3$ | 11.34 | 10.99 | 10.66 | 9.98 | 10.16 |
| R$_2$O:Al$_2$O$_3$ | 2.33 | 2.27 | 2.20 | 2.11 | 2.14 |
| Density (g/cm$^3$) | 2.524 | 2.531 | 2.545 | 2.465 | 2.464 |
| Strain Point (° C.) | 498 | 503 | 510 | 503 | 503 |
| Anneal Point (° C.) | 544 | 550 | 556 | 549 | 549 |
| Softening Point (° C.) | 755.6 | 760.1 | 761.9 | 759.2 | 759.7 |
| [Anneal Point (° C.) + Softening Point (° C.)]/2 | 650 | 655 | 659 | 654 | 654 |
| Coefficient of Thermal Expansion × 10$^{-7}$ (1/° C.) | 99.8 | 101 | 101.4 | 98.3 | 98.8 |
| Stress Optical Coefficient (nm/mm/MPa) | 2.982 | 3.08 | 3.113 | 2.828 | 2.838 |
| Refractive Index | 1.5104 | 1.5135 | 1.5115 | 1.5061 | 1.5054 |
| 200 Poise Temperature (° C.) | 1516 | 1511 | 1512 | 1556 | 1541 |
| 35000 Poise Temperature (° C.) | 1034 | 1040 | 1043 | 1053 | 1047 |

TABLE 1-continued

Examples 1-67.

| | | | | | |
|---|---|---|---|---|---|
| 200000 Poise Temperature (° C.) | 940 | 945 | 952 | 955 | 949 |
| Liquidus Temperature (° C.) | 815 | 840 | 805 | | |
| Liquidus Viscosity (kP) | 4733 | 3273 | 7812 | | |
| Zircon Breakdown Temperature (° C.) | 1100 | 1090 | 1060 | | |
| Zircon Breakdown Viscosity (kP) | 13 | 16 | 26 | | |
| T200P − T35kP (° C.) | 481 | 471 | 470 | 503 | 494 |
| Anneal Point (° C.) − Softening Point (° C.) | −211.6 | −210.1 | −205.9 | −210.2 | −210.7 |
| [Anneal Point (° C.) + Softening Point (° C.)]/2 − $T^{200}$ | −866 | −856 | −853 | −901 | −887 |
| [Anneal Point (° C.) + Softening Point (° C.)]/2 − $T^{35000}$ | −385 | −384 | −384 | −398 | −393 |
| Ion-Exchange of Annealed parts in refined $KNO_3$ at 410° C. for 4 hours | | | | | |
| Thickness (mm) | 1.0 | 1.0 | 1.0 | 1.0 | 1.0 |
| Surface CS (MPa) | 701 | 694 | 777 | 704 | 683 |
| DOC (microns) | 44 | 42 | 43 | 37 | 39 |
| Ion-Exchange of Annealed parts in refined $KNO_3$ at 410° C. for 6 hours | | | | | |
| Thickness (mm) | 1.0 | 1.0 | 1.0 | 1.0 | 1.0 |
| Surface CS (MPa) | 660 | 670 | 746 | 694 | 650 |
| DOC (microns) | 53 | 52 | 49 | 44 | 47 |

| Examples | 36 | 37 | 38 | 39 | 40 |
|---|---|---|---|---|---|
| Analyzed mol % | 177CPF | 177CPG | 177CPH | 177CPI | 177CPJ |
| $SiO_2$ | 67.00 | 66.87 | 66.54 | 66.18 | 67.30 |
| $Al_2O_3$ | 8.98 | 8.96 | 8.94 | 8.99 | 9.03 |
| $P_2O_5$ | 0.68 | 0.91 | 1.17 | 1.44 | 0.24 |
| $Na_2O$ | 16.35 | 16.31 | 16.38 | 16.41 | 16.34 |
| $K_2O$ | 2.93 | 2.90 | 2.91 | 2.91 | 2.92 |
| MgO | 1.99 | 1.99 | 1.99 | 1.99 | 0.01 |
| ZnO | 0.00 | 0.00 | 0.00 | 0.01 | 4.04 |
| CaO | 1.96 | 1.96 | 1.97 | 1.96 | 0.02 |
| $SnO_2$ | 0.10 | 0.10 | 0.10 | 0.10 | 0.10 |
| $R_2O$—$Al_2O_3$ | 10.31 | 10.25 | 10.36 | 10.34 | 10.23 |
| $R_2O$:$Al_2O_3$ | 2.15 | 2.14 | 2.16 | 2.15 | 2.13 |
| Density (g/cm³) | 2.465 | 2.464 | 2.465 | 2.468 | 2.516 |
| Strain Point (° C.) | 499 | 499 | 499 | 499 | 507 |
| Anneal Point (° C.) | 545 | 545 | 545 | 545 | 554 |
| Softening Point (° C.) | 758.4 | 765.3 | 766.5 | 772 | 768.9 |
| [Anneal Point (° C.) + Softening Point (° C.)]/2 | 652 | 655 | 656 | 659 | 661 |
| Coefficient of Thermal Expansion × $10^{-7}$(1/° C.) | 99.6 | 99.8 | 99.6 | 100.3 | 98.5 |
| Stress Optical Coefficient (nm/mm/MPa) | 2.826 | 2.823 | 2.811 | 2.826 | 3.07 |
| Refractive Index | 1.5051 | 1.5046 | 1.5045 | 1.5048 | 1.5083 |
| 200 Poise Temperature (° C.) | 1530 | 1535 | 1539 | 1532 | 1543 |
| 35000 Poise Temperature (° C.) | 1047 | 1049 | 1048 | 1052 | 1056 |
| 200000 Poise Temperature (° C.) | 949 | 951 | 950 | 954 | 960 |
| Liquidus Temperature (° C.) | 1070 | 1070 | | | 860 |
| Liquidus Viscosity (kP) | 25 | 25 | | | 1688 |
| Zircon Breakdown Temperature (° C.) | 1135 | 1105 | | | |
| Zircon Breakdown Viscosity (kP) | 10 | 15 | | | |
| T200P − T35kP (° C.) | 483 | 486 | 492 | 480 | 487 |
| Anneal Point (° C.) − Softening Point (° C.) | −213.4 | −220.3 | −221.5 | −227 | −214.9 |
| [Anneal Point (° C.) + Softening Point (° C.)]/2 − $T^{200}$ | −878 | −880 | −884 | −873 | −881 |
| [Anneal Point (° C.) + Softening Point (° C.)]/2 − $T^{35000}$ | −395 | −394 | −392 | −393 | −395 |
| Ion-Exchange of Annealed parts in refined $KNO_3$ at 410° C. for 4 hours | | | | | |
| Thickness (mm) | 1.0 | 1.0 | 1.0 | 1.0 | 1.0 |
| Surface CS (MPa) | 648 | 654 | 628 | 589 | 704 |
| DOC (microns) | 42 | 42 | 45 | 49 | 43 |

TABLE 1-continued

Examples 1-67.

| | | | | | |
|---|---|---|---|---|---|
| Ion-Exchange of Annealed parts in refined KNO₃ at 410° C. for 6 hours | | | | | |
| Thickness (mm) | 1.0 | 1.0 | 1.0 | 1.0 | 1.0 |
| Surface CS (MPa) | 619 | 611 | 588 | 558 | 670 |
| DOC (microns) | 50 | 53 | 56 | 59 | 51 |

| Examples | 41 | 42 | 43 | 44 | 45 |
|---|---|---|---|---|---|
| Analyzed mol % | 177CPK | 177CPL | 177CPM | 177CPN | 177CPO |
| $SiO_2$ | 66.94 | 66.83 | 66.56 | 66.25 | 66.23 |
| $Al_2O_3$ | 8.93 | 9.03 | 8.96 | 8.96 | 8.97 |
| $P_2O_5$ | 0.48 | 0.73 | 0.94 | 1.19 | 1.38 |
| $Na_2O$ | 16.58 | 16.37 | 16.53 | 16.55 | 16.50 |
| $K_2O$ | 2.98 | 2.92 | 2.95 | 2.98 | 2.91 |
| MgO | 0.01 | 0.01 | 0.01 | 0.01 | 0.01 |
| ZnO | 3.97 | 3.99 | 3.93 | 3.95 | 3.89 |
| CaO | 0.02 | 0.02 | 0.02 | 0.02 | 0.02 |
| $SnO_2$ | 0.10 | 0.10 | 0.10 | 0.10 | 0.09 |
| $R_2O$—$Al_2O_3$ | 10.63 | 10.27 | 10.51 | 10.57 | 10.44 |
| $R_2O:Al_2O_3$ | 2.19 | 2.14 | 2.17 | 2.18 | 2.16 |
| Density (g/cm³) | 2.516 | 2.513 | 2.51 | 2.511 | 2.509 |
| Strain Point (° C.) | 503 | 503 | 504 | 502 | 501 |
| Anneal Point (° C.) | 550 | 551 | 550 | 550 | 548 |
| Softening Point (° C.) | 762.6 | 770.2 | 767.9 | 768.2 | 768.6 |
| [Anneal Point (° C.) + Softening Point (° C.)]/2 | 656 | 661 | 659 | 659 | 658 |
| Coefficient of Thermal Expansion × 10⁻⁷(1/° C.) | 99.7 | 98.4 | 98.8 | 99.6 | 99 |
| Stress Optical Coefficient (nm/mm/MPa) | 3.063 | 3.081 | 3.074 | 3.066 | 3.098 |
| Refractive Index | 1.5078 | 1.5071 | 1.5064 | 1.5063 | 1.5052 |
| 200 Poise Temperature (° C.) | 1533 | 1543 | 1532 | 1532 | 1529 |
| 35000 Poise Temperature (° C.) | 1051 | 1055 | 1055 | 1046 | 1058 |
| 200000 Poise Temperature (° C.) | 954 | 957 | 958 | 948 | 961 |
| Liquidus Temperature (° C.) | 865 | 880 | 860 | 855 | 880 |
| Liquidus Viscosity (kP) | 1510 | 1106 | 1381 | 2150 | 1242 |
| Zircon Breakdown Temperature (° C.) | | | | | |
| Zircon Breakdown Viscosity (kP) | | | | | |
| T200P − T35kP (° C.) | 482 | 487 | 477 | 486 | 471 |
| Anneal Point (° C.) − Softening Point (° C.) | −212.6 | −219.2 | −217.9 | −218.2 | −220.6 |
| [Anneal Point (° C.) + Softening Point (° C.)]/2 − $T^{200}$ | −877 | −882 | −874 | −873 | −871 |
| [Anneal Point (° C.) + Softening Point (° C.)]/2 − $T^{35000}$ | −395 | −395 | −396 | −387 | −400 |
| Ion-Exchange of Annealed parts in refined KNO₃ at 410° C. for 4 hours | | | | | |
| Thickness (mm) | 1.0 | 1.0 | 1.0 | 1.0 | 1.0 |
| Surface CS (MPa) | 670 | 680 | 689 | 667 | 670 |
| DOC (microns) | 47 | 48 | 50 | 53 | 53 |
| Ion-Exchange of Annealed parts in refined KNO₃ at 410° C. for 6 hours | | | | | |
| Thickness (mm) | 1.0 | 1.0 | 1.0 | 1.0 | 1.0 |
| Surface CS (MPa) | 632 | 643 | 650 | 634 | 627 |
| DOC (microns) | 57 | 56 | 60 | 63 | 66 |

| Examples | 46 | 47 | 48 | 49 | 50 |
|---|---|---|---|---|---|
| Analyzed mol % | 177CPP | 177CPQ | 177CPR | 177CPS | 177CPT |
| $SiO_2$ | 67.05 | 67.31 | 67.11 | 66.71 | 66.50 |
| $Al_2O_3$ | 8.94 | 8.95 | 8.98 | 9.01 | 8.99 |
| $P_2O_5$ | 0.24 | 0.46 | 0.69 | 0.94 | 1.17 |
| $Na_2O$ | 16.41 | 16.15 | 16.09 | 16.29 | 16.25 |
| $K_2O$ | 3.01 | 2.90 | 2.90 | 2.89 | 2.91 |
| MgO | 4.20 | 4.09 | 4.09 | 4.02 | 4.03 |
| ZnO | 0.00 | 0.00 | 0.00 | 0.00 | 0.00 |
| CaO | 0.05 | 0.05 | 0.05 | 0.05 | 0.05 |
| $SnO_2$ | 0.10 | 0.10 | 0.10 | 0.10 | 0.10 |
| $R_2O$—$Al_2O_3$ | 10.47 | 10.10 | 10.00 | 10.17 | 10.17 |
| $R_2O:Al_2O_3$ | 2.17 | 2.13 | 2.11 | 2.13 | 2.13 |

TABLE 1-continued

Examples 1-67.

| | | | | | |
|---|---|---|---|---|---|
| Density (g/cm³) | 2.455 | 2.451 | 2.451 | 2.45 | 2.449 |
| Strain Point (° C.) | 505 | 507 | 509 | 506 | 505 |
| Anneal Point (° C.) | 552 | 554 | 556 | 554 | 552 |
| Softening Point (° C.) | 771.1 | 777.2 | 778.8 | 776.6 | 776.4 |
| [Anneal Point (° C.) + Softening Point (° C.)]/2 | 662 | 666 | 667 | 665 | 664 |
| Coefficient of Thermal Expansion × 10⁻⁷ (1/° C.) | 99.7 | 98.8 | 98.9 | 98.6 | 98.7 |
| Stress Optical Coefficient (nm/mm/MPa) | 2.828 | 2.853 | 2.87 | 2.877 | 2.906 |
| Refractive Index | 1.5032 | 1.5019 | 1.5019 | 1.5011 | 1.5007 |
| 200 Poise Temperature (° C.) | 1549 | 1559 | 1555 | 1560 | 1562 |
| 35000 Poise Temperature (° C.) | 1061 | 1074 | 1074 | 1067 | 1079 |
| 200000 Poise Temperature (° C.) | 963 | 975 | 974 | 965 | 978 |
| Liquidus Temperature (° C.) | <780 | 835 | 845 | 855 | 885 |
| Liquidus Viscosity (kP) | >2.4E7 | 4821 | 2651 | 3054 | 1176 |
| Zircon Breakdown Temperature (° C.) | | | | | |
| Zircon Breakdown Viscosity (kP) | | | | | |
| T200P − T35kP (° C.) | 488 | 484 | 481 | 493 | 484 |
| Anneal Point (° C.) − Softening Point (° C. | −219.1 | −223.2 | −222.8 | −222.6 | −224.4 |
| [Anneal Point (° C.) + Softening Point (° C.)]/2 − T²⁰⁰ | −888 | −893 | −888 | −895 | −898 |
| [Anneal Point (° C.) + Softening Point (° C.)]/2 − T³⁵⁰⁰⁰ | −400 | −409 | −407 | −402 | −414 |
| Ion-Exchange of Annealed parts in refined KNO₃ at 410° C. for 4 hours | | | | | |
| Thickness (mm) | 1.0 | 1.0 | 1.0 | 1.0 | 1.0 |
| Surface CS (MPa) | 730 | 727 | 725 | 708 | 673 |
| DOC (microns) | 44 | 45 | 47 | 56 | 51 |
| Ion-Exchange of Annealed parts in refined KNO₃ at 410° C. for 6 hours | | | | | |
| Thickness (mm) | 1.0 | 1.0 | 1.0 | 1.0 | 1.0 |
| Surface CS (MPa) | 688 | 698 | 676 | 717 | 634 |
| DOC (microns) | 52 | 54 | 56 | 48 | 61 |

| Examples | 51 | 52 | 53 | 54 | 55 |
|---|---|---|---|---|---|
| Analyzed mol % | 177CPU | 519KRU | 519KSG | 519KSN | 519KST |
| SiO₂ | 66.25 | 66.75 | 67.51 | 66.61 | 65.65 |
| Al₂O₃ | 9.03 | 9.68 | 9.29 | 8.07 | 8.00 |
| P₂O₅ | 1.41 | 0.02 | 0.00 | 0.00 | 0.95 |
| Na₂O | 16.20 | 15.97 | 16.00 | 16.62 | 16.69 |
| K₂O | 2.91 | 2.84 | 2.86 | 2.96 | 2.96 |
| MgO | 4.06 | 2.01 | 2.07 | 5.51 | 5.58 |
| ZnO | 0.00 | 0.00 | 0.00 | 0.00 | 0.00 |
| CaO | 0.05 | 2.62 | 2.17 | 0.12 | 0.06 |
| SnO₂ | 0.10 | 0.10 | 0.10 | 0.10 | 0.11 |
| R₂O—Al₂O₃ | 10.08 | 9.12 | 9.56 | 11.51 | 11.65 |
| R₂O:Al₂O₃ | 2.12 | 1.94 | 2.03 | 2.43 | 2.46 |
| Density (g/cm³) | 2.448 | 2.47 | 2.46 | 2.46 | 2.46 |
| Strain Point (° C.) | 505 | 503 | 500 | 487 | 487 |
| Anneal Point (° C.) | 552 | 548 | 545 | 532 | 531 |
| Softening Point (° C.) | 777.5 | 764 | 761 | 754 | 748 |
| [Anneal Point (° C.) + Softening Point (° C.)]/2 | 665 | 656 | 653 | 643 | 640 |
| Coefficient of Thermal Expansion × 10⁻⁷(1/° C.) | 99.2 | 97.9 | | 102.4 | |
| Stress Optical Coefficient (nm/mm/MPa) | 2.846 | 2.844 | 2.853 | 2.824 | 2.835 |
| Refractive Index | 1.4996 | 1.507 | 1.507 | 1.505 | 1.502 |
| 200 Poise Temperature (° C.) | 1565 | 1536 | 1545 | 1508 | 1509 |
| 35000 Poise Temperature (° C.) | 1071 | 1049 | 1047 | 1035 | 1038 |
| 200000 Poise Temperature (° C.) | 969 | 952 | 950 | 940 | 943 |
| Liquidus Temperature (° C.) | 1015 | 740 | <780 | 760 | 905 |
| Liquidus Viscosity (kP) | | 56488 | >13929 | 21430 | 449 |
| Zircon Breakdown Temperature (° C.) | | 1090 | 1115 | 1100 | 1105 |
| Zircon Breakdown Viscosity (kP) | | 18.6 | 12.8 | 13.0 | 12.4 |

TABLE 1-continued

Examples 1-67.

| | | | | | |
|---|---|---|---|---|---|
| T200P − T35kP (° C.) | 495 | 487 | 498 | 472 | 471 |
| Anneal Point (° C.) − Softening Point (° C.) | −225.5 | −215.8 | −216 | −222 | −217 |
| [Anneal Point (° C.) + Softening Point (° C.)]/2 − $T^{200}$ | −901 | −880 | −892 | −865 | −869 |
| [Anneal Point (° C.) + Softening Point (° C.)]/2 − $T^{35000}$ | −406 | −393 | −394 | −392 | −398 |
| Ion-Exchange of Annealed parts in refined KNO₃ at 410° C. for 4 hours | | | | | |
| Thickness (mm) | 1.0 | | 0.55 | 0.55 | 0.55 |
| Surface CS (MPa) | 708 | | 747 | 690 | 648 |
| DOC (microns) | 51 | | 32 | 37 | 45 |
| Ion-Exchange of Annealed parts in refined KNO₃ at 410° C. for 6 hours | | | | | |
| Thickness (mm) | 1.0 | | 0.55 | 0.55 | 0.55 |
| Surface CS (MPa) | 679 | | 708 | 654 | 608 |
| DOC (microns) | 64 | | 39 | 45 | 53 |

| Examples | 56 | 57 | 58 | 59 | 60 |
|---|---|---|---|---|---|
| Analyzed mol % | 519KTA | 519KTE | 519KTH | 519KTI | 519KTL |
| SiO₂ | 65.60 | 65.61 | 65.61 | 65.89 | 66.32 |
| Al₂O₃ | 8.24 | 8.57 | 8.59 | 8.61 | 8.61 |
| P₂O₅ | 0.97 | 0.98 | 0.98 | 0.69 | 0.20 |
| Na₂O | 16.62 | 16.70 | 16.72 | 16.68 | 16.72 |
| K₂O | 2.76 | 2.44 | 2.41 | 2.40 | 2.40 |
| MgO | 5.64 | 5.55 | 5.53 | 5.56 | 5.59 |
| ZnO | 0.00 | 0.00 | 0.00 | 0.00 | 0.00 |
| CaO | 0.05 | 0.05 | 0.05 | 0.05 | 0.05 |
| SnO₂ | 0.11 | 0.11 | 0.11 | 0.11 | 0.11 |
| R₂O—Al₂O₃ | 11.15 | 10.56 | 10.54 | 10.47 | 10.52 |
| R₂O:Al₂O₃ | 2.35 | 2.23 | 2.23 | 2.22 | 2.22 |
| Density (g/cm³) | 2.45 | 2.45 | 2.45 | 2.45 | |
| Strain Point (° C.) | 495 | 502 | 505 | 504 | 505 |
| Anneal Point (° C.) | 540 | 549 | 550 | 551 | 552 |
| Softening Point (° C.) | 757 | 770 | 774 | 771 | 771 |
| [Anneal Point (° C.) + Softening Point (° C.)]/2 | 649 | 659 | 662 | 661 | 661 |
| Coefficient of Thermal Expansion × $10^{-7}$(1/° C.) | 100.1 | 100.1 | 100.1 | | |
| Stress Optical Coefficient (nm/mm/MPa) | 2.848 | | 2.866 | 2.871 | 2.840 |
| Refractive Index | 1.503 | | 1.503 | 1.503 | 1.504 |
| 200 Poise Temperature (° C.) | 1511 | | 1530 | 1535 | 1534 |
| 35000 Poise Temperature (° C.) | 1047 | | 1062 | 1061 | 1060 |
| 200000 Poise Temperature (° C.) | 951 | | 967 | 966 | 964 |
| Liquidus Temperature (° C.) | 915 | | 915 | | |
| Liquidus Viscosity (kP) | 425 | | 616 | | |
| Zircon Breakdown Temperature (° C.) | 1105 | | 1115 | | |
| Zircon Breakdown Viscosity (kP) | 14.2 | | 15.4 | | |
| T200P − T35kP (° C.) | 465 | | 468 | 474 | 474 |
| Anneal Point (° C.) − Softening Point (° C. | −217 | −220.89 | −224 | −220.08 | −219.49 |
| [Anneal Point (° C.) + Softening Point (° C.)]/2 − $T^{200}$ | −863 | | −868 | −874 | −873 |
| [Anneal Point (° C.) + Softening Point (° C.)]/2 − $T^{35000}$ | −398 | | −400 | −400 | −399 |
| Ion-Exchange of Annealed parts in refined KNO₃ at 410° C. for 4 hours | | | | | |
| Thickness (mm) | 0.55 | 0.55 | 0.55 | | |
| Surface CS (MPa) | 656 | 721 | 728 | | |
| DOC (microns) | 42 | 40.7 | 41 | | |
| Ion-Exchange of Annealed parts in refined KNO₃ at 410° C. for 6 hours | | | | | |
| Thickness (mm) | 0.55 | 0.55 | 0.55 | | |
| Surface CS (MPa) | 633 | 677 | 695 | | |
| DOC (microns) | 51 | 50 | 51 | | |

TABLE 1-continued

Examples 1-67.

| Examples | 61 | 62 | 63 | 64 | 65 |
|---|---|---|---|---|---|
| Analyzed mol % | 519KTP | 519KTR | 519KTT | 519KTY | 519KUN |
| $SiO_2$ | 66.55 | 66.30 | 66.00 | 65.64 | 66.49 |
| $Al_2O_3$ | 8.65 | 8.83 | 9.22 | 9.46 | 8.69 |
| $P_2O_5$ | 0.02 | 0.02 | 0.01 | 0.00 | 0.00 |
| $Na_2O$ | 16.67 | 16.73 | 16.71 | 16.77 | 16.54 |
| $K_2O$ | 2.39 | 2.46 | 2.39 | 2.45 | 2.39 |
| MgO | 5.55 | 4.34 | 2.46 | 0.18 | 5.61 |
| ZnO | 0.01 | 1.18 | 3.06 | 5.37 | 0.01 |
| CaO | 0.05 | 0.04 | 0.03 | 0.02 | 0.05 |
| $SnO_2$ | 0.11 | 0.11 | 0.11 | 0.10 | 0.21 |
| $R_2O-Al_2O_3$ | 10.41 | 10.36 | 9.88 | 9.76 | 10.24 |
| $R_2O:Al_2O_3$ | 2.20 | 2.17 | 2.07 | 2.03 | 2.18 |
| Density (g/cm$^3$) | 2.46 | 2.48 | 2.49 | 2.54 | |
| Strain Point (° C.) | 506 | 510 | 513 | 519 | 507 |
| Anneal Point (° C.) | 551 | 557 | 558 | 564 | 553 |
| Softening Point (° C.) | 774 | 775 | 776 | 774 | 776 |
| [Anneal Point (° C.) + Softening Point (° C.)]/2 | 663 | 666 | 667 | 669 | 665 |
| Coefficient of Thermal Expansion × 10$^{-7}$ (1/° C.) | | 98.8 | 98.8 | | |
| Stress Optical Coefficient (nm/mm/MPa) | 2.863 | 2.854 | 2.959 | 3.122 | 2.865 |
| Refractive Index | 1.504 | 1.505 | 1.507 | 1.513 | 1.505 |
| 200 Poise Temperature (° C.) | 1532 | 1527 | 1534 | 1528 | 1534 |
| 35000 Poise Temperature (° C.) | 1059 | 1061 | 1060 | 1055 | 1066 |
| 200000 Poise Temperature (° C.) | 963 | 965 | 966 | 963 | 971 |
| Liquidus Temperature (° C.) | <790 | | <780 | | |
| Liquidus Viscosity (kP) | >17010 | | >27715 | | |
| Zircon Breakdown Temperature (° C.) | 1075 | | 1095 | | |
| Zircon Breakdown Viscosity (kP) | 26.9 | | 20.1 | | |
| T200P − T35kP (° C.) | 473 | 466 | 474 | 473 | 468 |
| Anneal Point (° C.) − Softening Point (° C.) | −223 | −217.8 | −218 | −209.6 | −223 |
| [Anneal Point (° C.) + Softening Point (° C.)]/2 − T$^{200}$ | −870 | −861 | −867 | −859 | −870 |
| [Anneal Point (° C.) + Softening Point (° C.)]/2 − T$^{35000}$ | −396 | −395 | −393 | −386 | −402 |
| Ion-Exchange of Annealed parts in refined $KNO_3$ at 410° C. for 4 hours | | | | | |
| Thickness (mm) | 0.55 | | | | |
| Surface CS (MPa) | 735 | | | | |
| DOC (microns) | 37 | | | | |
| Ion-Exchange of Annealed parts in refined $KNO_3$ at 410° C. for 6 hours | | | | | |
| Thickness (mm) | 0.55 | | | | |
| Surface CS (MPa) | 690 | | | | |
| DOC (microns) | 46 | | | | |

| Examples | 66 | 67 |
|---|---|---|
| Analyzed mol % | 519KVP | 519KVW |
| $SiO_2$ | 65.45 | 65.91 |
| $Al_2O_3$ | 9.52 | 9.63 |
| $P_2O_5$ | 0.50 | 0.03 |
| $Na_2O$ | 16.71 | 16.72 |
| $K_2O$ | 2.09 | 2.09 |
| MgO | 2.46 | 2.47 |
| ZnO | 3.06 | 2.89 |
| CaO | 0.00 | 0.02 |
| $SnO_2$ | 0.21 | 0.21 |
| $R_2O-Al_2O_3$ | 9.28 | 9.18 |
| $R_2O:Al_2O_3$ | 1.97 | 1.95 |
| Density (g/cm$^3$) | 2.508 | |
| Strain Point (° C.) | 525 | |
| Anneal Point (° C.) | 571 | |
| Softening Point (° C.) | 794 | |
| [Anneal Point (° C.) + Softening Point (° C.)]/2 | 683 | |

TABLE 1-continued

Examples 1-67.

| | |
|---|---|
| Coefficient of Thermal Expansion × $10^{-7}$(1/° C.) | 97.2 |
| Stress Optical Coefficient (nm/mm/MPa) | |
| Refractive Index | 1.507 |
| 200 Poise Temperature (° C.) | 1534 |
| 35000 Poise Temperature (° C.) | 1073 |
| 200000 Poise Temperature (° C.) | 978 |
| Liquidus Temperature (° C.) | |
| Liquidus Viscosity (kP) | 7989 |
| Zircon Breakdown Temperature (° C.) | 1075 |
| Zircon Breakdown Viscosity (kP) | |
| T200P − T35kP (° C.) | 461 |
| Anneal Point (° C.) − Softening Point (° C.) | −223 |
| [Anneal Point (° C.) + Softening Point (° C.)]/2 − $T^{200}$ | −852 |
| [Anneal Point (° C.) + Softening Point (° C.)]/2 − $T^{35000}$ | −390 |
| Ion-Exchange of Annealed parts in refined $KNO_3$ at 410° C. for 4 hours | |
| Thickness (mm) | |
| Surface CS (MPa) | |
| DOC (microns) | |
| Ion-Exchange of Annealed parts in refined $KNO_3$ at 410° C. for 6 hours | |
| Thickness (mm) | |
| Surface CS (MPa) | |
| DOC (microns) | |

Examples 68-77

Examples 68-77 are exemplary glass compositions according to one or more embodiments of this disclosure. The glass compositions (in mol %) of Examples 68-77 are provided in Table 3, along with strain point temperature (as measured by beam bending viscometer), annealing point temperature (as measured by beam bending viscometer), softening point temperature (as measured by fiber elongation), sag temperature, temperature at log 11 viscosity (Poise), $T_{200}$, $T_{35000}$, $T_{200000}$, density, CTE, liquidus viscosity, zircon breakdown temperature, and zircon breakdown viscosity.

TABLE 3

| Examples | 68 | 69 | 70 | 71 | 72 |
|---|---|---|---|---|---|
| Analyzed mol % | 10/90 | 20/80 | 30/70 | 40/60 | 50/50 |
| $SiO_2$ | 65.34 | 65.41 | 65.49 | 65.57 | 65.64 |
| $Al_2O_3$ | 9.6 | 9.56 | 9.52 | 9.48 | 9.44 |
| $P_2O_5$ | 0.44 | 0.39 | 0.34 | 0.29 | 0.25 |
| $Na_2O$ | 16.87 | 16.86 | 16.84 | 16.82 | 16.81 |
| $K_2O$ | 2.13 | 2.16 | 2.19 | 2.22 | 2.25 |
| MgO | 2.52 | 2.52 | 2.51 | 2.5 | 2.5 |
| ZnO | 2.88 | 2.9 | 2.92 | 2.94 | 2.96 |
| $SnO_2$ | 0.21 | 0.2 | 0.19 | 0.18 | 0.17 |
| Strain point(° C.) | 524 | 523 | 521 | 520 | 519 |
| Anneal Point(° C.) | 570 | 568 | 567 | 566 | 565 |
| Softening point(° C.) | 792 | 790 | 789 | 787 | 785 |
| Sag temp (° C.) | 676 | 675 | 673 | 672 | 671 |
| T at log 11 (° C.) | 636 | 634 | 633 | 632 | 630 |
| [Anneal Point (° C.) + Softening Point (° C.)]/2 | 681 | 679 | 678 | 676 | 675 |
| 200 Poise Temperature (° C.) | 977 | 976 | 915 | 973 | 972 |
| 35000 Poise Temperature (° C.) | 1072 | 1070 | 1069 | 1068 | 1067 |
| 200000 Poise Temperature (° C.) | 1534 | 1534 | 1534 | 1534 | 1534 |
| Density (g/cm³) | 2.506 | 2.504 | 2.502 | 2.5 | 2.498 |
| Coefficient of Thermal Expansion × $10^{-7}$ (1/° C.) | 97.4 | 97.5 | 97.7 | 97.8 | 98 |
| Liquidus viscosity (kP) | 9962 | 11934 | 13907 | 15879 | 17852 |
| Zircon Breakdown Temperature (° C.) | 1077 | 1077 | 1077 | 1077 | 1077 |
| Zircon Breakdown Temperature (° C.) −35000 Poise Temperature (° C.) | 5 | 9 | 12 | 15 | 18 |

| Examples | 73 | 74 | 75 | 76 | 77 |
|---|---|---|---|---|---|
| Analyzed mol % | | | | | |
| $SiO_2$ | 65.72 | 65.79 | 65.87 | 65.94 | 65.26 |
| $Al_2O_3$ | 9.39 | 9.35 | 9.31 | 9.27 | 9.43 |
| $P_2O_5$ | 0.2 | 0.15 | 0.1 | 0.05 | 0.69 |
| $Na_2O$ | 16.79 | 16.77 | 16.76 | 16.74 | 17.02 |
| $K_2O$ | 2.28 | 2.3 | 2.38 | 2.36 | 2.06 |
| MgO | 2.49 | 2.48 | 2.48 | 2.47 | 2.53 |
| ZnO | 2.98 | 3 | 3.02 | 3.04 | 2.82 |
| $SnO_2$ | 0.15 | 0.14 | 0.13 | 0.12 | 0.2 |
| Strain point(° C.) | 518 | 516 | 515 | 514 | 527 |
| Anneal Point(° C.) | 563 | 562 | 561 | 559 | 572 |

TABLE 3-continued

| | | | | | |
|---|---|---|---|---|---|
| Softening point(° C.) | 783 | 781 | 780 | 779 | 792 |
| Sag temp (° C.) | 669 | 668 | 666 | 665 | |
| T at log 11 (° C.) | 629 | 628 | 626 | 625 | 638 |
| [Anneal Point (° C.) + Softening Point (° C.)]/2 | 673 | 672 | 670 | 669 | 682 |
| 200 Poise Temperature (° C.) | 971 | 970 | 968 | 967 | 1542 |
| 35000 Poise Temperature (° C.) | 1065 | 1064 | 1063 | 1062 | 1074 |
| 200000 Poise Temperature (° C.) | 1534 | 1534 | 1534 | 1534 | 980 |
| Density (g/cm³) | 2.496 | 2.494 | 2.492 | 2.490 | |
| Coefficient of Thermal Expansion × 10⁻⁷ (1/° C.) | 98.2 | 98.3 | 98.5 | 98.6 | |
| Liquidus viscosity (kP) | 19825 | 21797 | 23770 | 25742 | 3177 |
| Zircon Breakdown Temperature (° C.) | 1077 | 1077 | 1077 | 1077 | 1090 |
| Zircon Breakdown Temperature (° C.) – 35000 Poise Temperature (° C.) | 22 | 25 | 28 | 31 | 16 |

FIG. 10 is a log viscosity curve as a function of temperature for Examples 63, and 66, modeled Example 72, along with a known soda lime silicate glass composition. For comparison, a known alkali aluminosilicate glass composition (Comparative Ex. A) is shown in Table 2.

TABLE 2

| Examples | Comparative Ex. A |
|---|---|
| Analyzed mol % | |
| SiO₂ | 69.2 |
| Al₂O₃ | 8.5 |
| P₂O₅ | |
| Na₂O | 13.9 |
| K₂O | 1.2 |
| MgO | 6.4 |
| ZnO | |
| CaO | 0.5 |
| SnO₂ | 0.2 |
| R₂O—Al₂O₃ | 6.6 |
| R₂O:Al₂O₃ | 1.78 |
| Density (g/cm³) | 2.44 |
| Strain Point (° C.) | 560 |
| Anneal Point (° C.) | 609 |
| Softening Point (° C.) | 844 |
| [Anneal Point (° C.) + Softening Point (° C.)]/2 | 726.5 |
| Coefficient of Thermal Expansion × 10⁻⁷(1/° C.) | 83.6 |
| Stress Optical Coefficient (nm/mm/MPa) | |
| Refractive Index | |
| 200 Poise Temperature (° C.) | 1047 |
| 35000 Poise Temperature (° C.) | 1145 |
| 200000 Poise Temperature (° C.) | 1535 |
| Liquidus Temperature (° C.) | |

TABLE 2-continued

| Examples | Comparative Ex. A |
|---|---|
| Liquidus Viscosity (kP) | 1729 |
| Zircon Breakdown Temperature (° C.) | |
| Zircon Breakdown Viscosity (kP) | |
| T200P – T35kP (° C.) | 98 |
| Anneal Point (° C.) – Softening Point (° C.) | –235 |
| [Anneal Point (° C.) + Softening Point (° C.)]/2 – $T^{200}$ | –320.5 |
| [Anneal Point (° C.) + Softening Point (° C.)]/2 – $T^{35000}$ | –418.5 |

As shown in Table 2, Comparative Ex. A is a alkali aluminosilicate glass composition that exhibits significantly different attributes than the inventive glass compositions described herein. In particular Comparative Ex. A exhibits a relationship of (anneal point+softening point)/2 that is greater than 725° C. In addition, Comparative Ex. A exhibits a difference between $T_{200}$ and $T_{35000}$ is significantly less than 400° C., the relationship [(anneal point (° C.)+softening point (° C.))/2–$T_{200}$] greater than –800° C. In addition, Comparative Ex. A exhibits a sag temperature of about 723° C.

It will be apparent to those skilled in the art that various modifications and variations can be made without departing from the spirit or scope of the invention.

Aspect (1) of this disclosure pertains to a glass article comprising a glass composition, the glass composition comprising: $SiO_2$ in an amount in a range from about 63 mol % to about 75 mol %; $Al_2O_3$ in an amount in a range from about 7 mol % to about 13 mol %; $R_2O$ in an amount from about 13 mol % to about 24 mol %; $P_2O_5$ in an amount in a range from about 0 mol % to about 3 mol %; wherein the glass composition comprises one or both of MgO and ZnO, wherein the amount of MgO is in a range from about 0 mol % to about 7 mol % and ZnO is present in an amount in a range from about 0 mol % to about 7 mol %, wherein the glass article comprises an anneal point (° C.) and a softening point (° C.), and the relationship of (anneal point+softening point)/2 is in a range from about 625° C. to about 725° C.

Aspect (2) of this disclosure pertains to the glass article of Aspect (1), wherein the glass article comprises a temperature (° C.) at a viscosity of 200 poises ($T_{200}$) and a temperature (C) at a viscosity of 35000 poise ($T_{35000}$), and wherein $T_{200}$–$T_{35000}$ is in a range from about 400° C. to about 600° C.

Aspect (3) of this disclosure pertains to the glass article of Aspect (1) or Aspect (2), wherein the glass article comprises a temperature (C) at a viscosity of 200 poises ($T_{200}$), and wherein the difference between the relationship (anneal point+softening point)/2 and $T_{200}$ is less than –800° C.

Aspect (4) of this disclosure pertains to the glass article of any one of Aspects (1) through (3), wherein the glass article comprises a temperature (C) at a viscosity of 35000 poises ($T_{35000}$), and wherein the difference between the relationship (anneal point+softening point)/2 and $T_{35000}$ is less than –300° C.

Aspect (5) of this disclosure pertains to the glass article of any one of Aspects (2) through (4), wherein either one of or both $T_{200}$ and $T_{35000}$ are greater than about 1030° C.

Aspect (6) of this disclosure pertains to the glass article of any one of Aspects (1) through (5), wherein the glass article comprises a sag temperature in a range from about 620° C. to about 720° C.

Aspect (7) of this disclosure pertains to the glass article of any one of Aspects (1) through (6), wherein the amount of $Al_2O_3$ is in a range from about 8 mol % to about 11 mol %, the amount of $Na_2O$ is in an amount in a range from about 12 mol % to about 18 mol %, the amount of $K_2O$ is in a range from about 1 mol % to about 3.5 mol %.

Aspect (8) of this disclosure pertains to the glass article of any one of Aspects (1) through (7), further comprising CaO in an amount in a range from about 0.01 mol % to about 4 mol %.

Aspect (9) of this disclosure pertains to the glass article of any one of Aspects (1) through (8), wherein MgO is present in an amount in a range from about 0 mol % to about 3 mol %.

Aspect (10) of this disclosure pertains to the glass article of any one of Aspects (1) through (9), wherein ZnO is present in an amount in a range from about 0 mol % to about 5 mol %.

Aspect (11) of this disclosure pertains to the glass article of any one of Aspects (1) through (10), wherein the relationship (anneal point+softening point)/2 is less than about 700° C.

Aspect (12) of this disclosure pertains to the glass article of any one of Aspects (1) through (11), further comprising a liquidus viscosity greater than about 100 kP.

Aspect (13) of this disclosure pertains to the glass article of any one of Aspects (1) through (12), further comprising a zircon breakdown viscosity or less than about 35 kP.

Aspect (14) of this disclosure pertains to the glass article of any one of Aspects (1) through (13), wherein the glass article is strengthened.

Aspect (15) of this disclosure pertains to the glass article of any one of Aspects (1) through (14), wherein the glass article is fusion formed.

Aspect (16) of this disclosure pertains to an aluminosilicate glass article comprising: a glass composition comprising $Al_2O_3$ in an amount greater than 2 mol %; and wherein the glass article comprises an anneal point (C) and a softening point (° C.), and the relationship of (anneal point+softening point)/2 is in a range from about 625° C. to about 725° C.

Aspect (17) of this disclosure pertains to the glass article of Aspect (16), wherein the glass composition comprises a total amount of alkali metal oxides ($R_2O$) that is equal to or greater than about 5 mol %.

Aspect (18) of this disclosure pertains to the glass article of Aspect (16) or Aspect (17), wherein the glass composition comprises one or both of MgO and ZnO, wherein the amount of MgO is in a range from about 0 mol % to about 7 mol % and ZnO is present in an amount in a range from about 0 mol % to about 7 mol %.

Aspect (19) of this disclosure pertains to the glass article of any one of Aspects (16) through (18), wherein the total amount of amount of alkali metal oxides is in a range from about 5 mol % to about 20 mol %.

Aspect (20) of this disclosure pertains to the glass article of any one of Aspects (16) through (19), further comprising a temperature at a viscosity of 35 kilopoise of greater than about 1000° C.

Aspect (21) of this disclosure pertains to the glass article of any one of Aspects (16) through (20), further comprising a temperature at a viscosity of 200 kilopoise of greater than about 900° C.

Aspect (22) of this disclosure pertains to the glass article of any one of Aspects (16) through (21), further comprising an anneal point of less than about 580° C.

Aspect (23) of this disclosure pertains to the glass article of any one of Aspects (16) through (22), further comprising a strain point of less than about 530° C.

Aspect (24) of this disclosure pertains to the glass article of any one of Aspects (16) through (23), further comprising a density of about 2.6 g/cm$^3$ or less.

Aspect (25) of this disclosure pertains to the glass article of any one of Aspects (16) through (24), further comprising a softening point in a range from about 725° C. and 860° C.

Aspect (26) of this disclosure pertains to the glass article of any one of Aspects (16) through (25), wherein the glass article is strengthened.

Aspect (27) of this disclosure pertains to the glass article of any one of Aspects (16) through (26), wherein the glass article is fusion formed.

Aspect (28) of this disclosure pertains to a vehicle comprising: a body defining an interior and an opening in communication with the interior; a glass article disposed in the opening, the article comprising a glass composition, the glass composition comprising $Al_2O_3$ in an amount greater than 2 mol %, an anneal point (C), a softening point (° C.), and the relationship of (anneal point+softening point)/2 in a range from about 625° C. to about 725° C.

Aspect (29) of this disclosure pertains to the vehicle of Aspect (28), wherein the glass article comprises a glass composition, the glass composition comprising a total amount of alkali metal oxide in an amount of about 16 mol % or greater, and a sag temperature in a range from about 600° C. to about 700° C.

Aspect (30) of this disclosure pertains to the vehicle of Aspect (28) or Aspect (29), where the glass composition further comprises $Al_2O_3$ in an amount greater than 4 mol %.

Aspect (31) of this disclosure pertains to the vehicle of any one of Aspects (28) through (30), wherein the glass composition further comprises an alkali metal oxide selected from $Li_2O$, $Na_2O$ and $K_2O$, wherein the alkali metal oxide is present in an amount greater than about 5 mol %.

Aspect (32) of this disclosure pertains to the vehicle of Aspect (31), wherein the glass composition further comprises a total amount of amount of alkali metal oxides ($R_2O=Li_2O+Na_2O+K_2O$) in a range from about 5 mol % to about 24 mol %.

Aspect (33) of this disclosure pertains to the vehicle of any one of Aspects (28) through (32), wherein the glass article further comprises a temperature at a viscosity of 35 kilopoise of greater than about 1000° C.

Aspect (34) of this disclosure pertains to the vehicle of any one of Aspects (28) through (33), wherein the glass article further comprises a temperature at a viscosity of 200 kilopoise of greater than about 900° C.

Aspect (35) of this disclosure pertains to the vehicle of any one of Aspects (28) through (34), wherein the glass article further comprises an anneal point of less than about 600° C.

Aspect (36) of this disclosure pertains to the vehicle of any one of Aspects (28) through (35), wherein the glass article further comprises a strain point of less than about 550° C.

Aspect (37) of this disclosure pertains to the vehicle of any one of Aspects (28) through (36), wherein the glass article further comprises a density of about 2.6 g/cm$^3$ or less.

Aspect (38) of this disclosure pertains to the vehicle of any one of Aspects (28) through (37), wherein the glass article further comprises a softening point is in a range from about 725° C. and 860° C.

Aspect (39) of this disclosure pertains to the vehicle of any one of Aspects (28) through (38), wherein the glass article is strengthened.

Aspect (40) of this disclosure pertains to the vehicle of any one of Aspects (28) through (39), wherein the glass article further is fusion formed.

Aspect (41) of this disclosure pertains to a laminate comprising: a first glass layer; an interlayer disposed on the first glass layer; and a second glass layer disposed on the interlayer opposite the first glass layer wherein either one of or both the first glass layer and the second glass layer comprises the glass article according to any one of Aspects (1) through (15)

Aspect (42) of this disclosure pertains to the laminate of Aspect (41), wherein either one or both the first glass layer and the second glass layer comprise a thickness less than about 1.6 mm.

Aspect (43) of this disclosure pertains to a laminate comprising: a first glass layer; an interlayer disposed on the first glass layer; and a second glass layer disposed on the interlayer opposite the first glass layer wherein the second glass layer comprises the glass article according to any one of Aspects (1) through (15).

Aspect (44) of this disclosure pertains to the laminate of Aspect (43), wherein the first glass layer comprises a thickness of 1.6 mm or greater, and the second glass layer comprises a thickness less than about 1.6 mm.

Aspect (45) of this disclosure pertains to a method for forming a laminate comprising: stacking a first glass article, and a second glass article according to any one of Aspects (1) through (27) to form a stack, wherein the first glass article has a different composition than the second glass article and comprises a first surface and an second surface that opposes the first surface, wherein the second glass article comprises a third surface and a fourth surface that opposes the third surface, and wherein the second surface is adjacent to the third surface in the stack; placing the stack on a mold; heating the stack to a temperature that is above an annealing point of the first glass article to form a shaped stack; and placing an interlayer between the first glass article and the second glass layer.

Aspect (46) of this disclosure pertains to the method of Aspect (45), the shaped stack comprises a gap between the second surface and the third surface having a maximum distance of about 10 mm or less.

Aspect (47) of this disclosure pertains to the method of Aspect (46), wherein the maximum distance is about 5 mm or less.

Aspect (48) of this disclosure pertains to the method of Aspect (46), wherein the maximum distance is about 3 mm or less.

Aspect (49) of this disclosure pertains to a laminate comprising: a first curved glass layer comprising a first major surface, a second major surface opposing the first major surface, a first thickness defined as the distance between the first major surface and second major surface, and a first sag depth of about 2 mm or greater, the first curved glass layer comprising a first viscosity (poises); a second curved glass layer comprising a third major surface, a fourth major surface opposing the third major surface, a second thickness defined as the distance between the third major surface and the fourth major surface, and a second sag depth of about 2 mm or greater, the second curved glass layer comprising a second viscosity; and an interlayer disposed between the first curved glass layer and the second curved glass layer and adjacent the second major surface and third major surface, wherein the first viscosity at 630° C. is greater than the second viscosity at a temperature of 630° C., wherein the first sag depth is within 10% of the second sag depth and a shape deviation between the first glass layer and the second glass layer of +5 mm or less as measured by an optical three-dimensional scanner, and wherein one of or both the first major surface and the fourth major surface comprises an optical distortion of less than 200 millidiopters as measured by an optical distortion detector using transmission optics according to ASTM 1561, and wherein the third major surface or the fourth major surface comprises a membrane tensile stress of less than 7 MPa as measured by a surface stressmeter, according to ASTM C1279.

Aspect (50) of this disclosure pertains to the laminate of Aspect (49), wherein the first curved glass layer comprises the glass article of any one of Aspects (1) through (15).

Aspect (51) of this disclosure pertains to the laminate of Aspect (49), wherein the first curved glass layer comprises the glass article of any one of Aspects (16) through (27).

Aspect (52) of this disclosure pertains to the laminate of Aspect (49) or Aspect (51), wherein, at a temperature of about 630° C., the first viscosity is in a range from about 10 times the second viscosity to about 750 times the second viscosity.

Aspect (53) of this disclosure pertains to the laminate of any one of Aspects (49) through (52), wherein the first thickness is less than the second thickness.

Aspect (54) of this disclosure pertains to the laminate of any one of Aspects (49) through (53), wherein the first thickness is from about 0.1 mm to less than about 1.6 mm, and the second thickness is in a range from about 1.6 mm to about 3 mm.

Aspect (55) of this disclosure pertains to the laminate of any one of Aspects (49) through (54), wherein first curved layer comprises a first sag temperature and the second curved glass layer comprises a second sag temperature that differs from the first sag temperature.

Aspect (56) of this disclosure pertains to the laminate of Aspect (55), wherein the magnitude of the difference between the first sag temperature and the second sag temperature is in a range from about 30° C. to about 150° C.

Aspect (57) of this disclosure pertains to the laminate of any one of Aspects (49) through (56), wherein the shape deviation is about ±1 mm or less.

Aspect (58) of this disclosure pertains to the laminate of any one of Aspects (49) through (57), wherein the shape deviation is about ±0.5 mm or less Aspect (59) of this disclosure pertains to the laminate of any one of Aspects (49) through (58), wherein the optical distortion is about 100 millidiopters or less.

Aspect (60) of this disclosure pertains to the laminate of any one of Aspects (49) through (59), wherein the membrane tensile stress is about 5 MPa or less.

Aspect (61) of this disclosure pertains to the laminate of any one of Aspects (49) through (60), wherein the first sag depth is in a range from about 5 mm to about 30 mm.

Aspect (62) of this disclosure pertains to the laminate of any one of Aspects (49) through (61), wherein the third major surface or the fourth major surface comprises a surface compressive stress of less than 3 MPa as measured by a surface stress meter.

Aspect (63) of this disclosure pertains to the laminate of any one of Aspects (49) through (62), wherein the laminate is substantially free of visual distortion as measured by ASTM C1652/C1652M.

Aspect (64) of this disclosure pertains to the laminate of any one of Aspects (49) through (63), wherein the first curved glass layer is strengthened.

Aspect (65) of this disclosure pertains to the laminate of Aspect (64), wherein the first curved glass layer is chemically strengthened, mechanically strengthened or thermally strengthened.

Aspect (66) of this disclosure pertains to the laminate of Aspect (64) or Aspect (65), wherein the second glass curved layer is unstrengthened.

Aspect (67) of this disclosure pertains to the laminate of Aspect (64) or Aspect (65), wherein the second curved glass layer is strengthened.

Aspect (68) of this disclosure pertains to the laminate of any one of Aspects (49) through (67), wherein the second curved glass layer comprises a soda lime silicate glass.

Aspect (69) of this disclosure pertains to the laminate of any one of Aspects (49) through (68), wherein the first curved glass layer comprises a first length and a first width, either one of or both the first length and the first width is about 0.25 meters or greater.

Aspect (70) of this disclosure pertains to the laminate of any one of Aspects (49) through (69), wherein the first curved glass layer comprises a first length, and a first width, and the second curved glass layer comprises a second length that is within 5% of the first length, and a second width that is within 5% of the first width.

Aspect (71) of this disclosure pertains to the laminate of any one of Aspects (49) through (70), where the laminate is complexly curved.

Aspect (72) of this disclosure pertains to the laminate of any one of Aspects (49) through (71), wherein the laminate comprises automotive glazing or architectural glazing.

Aspect (73) of this disclosure pertains to a vehicle comprising: a body defining an interior and an opening in communication with the interior; and the laminate of any one of Aspects (49) through (72) disposed in the opening.

Aspect (74) of this disclosure pertains to the vehicle of Aspect (73), wherein the laminate is complexly curved.

Aspect (75) of this disclosure pertains to a vehicle comprising an exterior surface and the glass article of any one of Aspects (1) through (15).

Aspect (76) of this disclosure pertains to a vehicle comprising an exterior surface and the glass article of any one of Aspects (16) through (27).

Aspect (77) of this disclosure pertains to the vehicle of Aspect (75) or Aspect (76), wherein the exterior surface forms one of an engine block cover, headlight cover, taillight cover, door panel cover, or pillar cover.

Aspect (78) of this disclosure pertains to a vehicle comprising an interior surface and the glass article of any one of Aspects (1) through (15).

Aspect (79) of this disclosure pertains to a vehicle comprising an interior surface and the glass article of any one of Aspects (16) through (27).

Aspect (80) of this disclosure pertains to the vehicle of Aspect (78) or Aspect (79), wherein the interior surface forms one of a door trim, a seat back, a door panel, a dashboard, a center console, a floor board, a rear view mirror and a pillar.

What is claimed is:

1. A laminate, comprising:
a first curved glass layer comprising a first major surface, a second major surface opposing the first major surface, a first thickness defined as a distance between the first major surface and the second major surface, and a first sag depth of 2 mm or greater;
a second curved glass layer comprising a third major surface, a fourth major surface opposing the third major surface, a second thickness defined as a distance between the third major surface and the fourth major surface, and a second sag depth of 2 mm or greater;
an interlayer disposed between the first curved glass layer and the second curved glass layer and adjacent the second major surface and the third major surface; and
wherein the first glass layer comprises a glass composition, the glass composition comprising:
$SiO_2$ in an amount in a range from 63 mol % to 75 mol %;
$Al_2O_3$ in an amount in a range from 7 mol % to 13 mol %;
$R_2O$ in an amount from 13 mol % to 24 mol %, wherein $R_2O=Li_2O+Na_2O+K_2O$;
$K_2O$ in an amount in a range from 1 mol % to 3.5 mol %;
$P_2O_5$ in an amount in a range from 0 mol % to 3 mol %;
wherein the glass composition comprises one or both of MgO and ZnO,
wherein an amount of MgO is in a range from 0 mol % to 5 mol % and wherein an amount of ZnO is in a range from 0 mol % to 7 mol %, and
wherein the first glass layer comprises an anneal point temperature, a softening point temperature, and Tave= (the anneal point temperature+the softening point temperature)/2 is in a range from 625° C. to 725° C., wherein the anneal point temperature is less than 600° C.,
wherein the first glass layer comprises a strain point temperature of less than 550° C.

2. The laminate of claim 1, wherein the softening point temperature is in a range from 725° C. to 810° C.

3. The laminate of claim 1, wherein the first glass layer comprises a first temperature $T_{200}$ at a viscosity of 200 poises and a second temperature $T_{35000}$ at a viscosity of 35000 poises, and $T_{200}-T_{35000}$ is in a range from 400° C. to 600° C.

4. The laminate of claim 1, wherein the first glass layer comprises a first temperature $T_{200}$ at a viscosity of 200 poises, and a difference between Tave and $T_{200}$ is less than −800° C.

5. The laminate of claim 1, wherein the first glass layer comprises a first temperature $T_{35000}$ at a viscosity of 35000 poises, and a difference between Tave and $T_{35000}$ is less than −300° C.

6. The laminate of claim 3, wherein at least one of $T_{200}$ or $T_{35000}$ is greater than 1030° C.

7. The laminate of claim 1, wherein the first glass layer comprises a sag temperature in a range from 620° C. to 720° C.

8. The laminate of claim 1, wherein the first glass layer comprises $Al_2O_3$ in a range from 8 mol % to 11 mol %, and $Na_2O$ in a range from 12 mol % to 18 mol %.

9. The laminate of claim 1, wherein Tave is less than 700° C.

10. The laminate of claim 1, wherein the first glass layer is strengthened.

11. The laminate of claim 1, wherein the second thickness is greater than the first thickness.

12. The laminate of claim 1, wherein the first thickness is less than 1.6 mm.

13. The laminate of claim 1, wherein the second thickness is in a range from 1.7 mm to 6 mm.

14. The laminate of claim 1, wherein a membrane tensile stress at the third major surface or the fourth major surface is less than 7 MPa as measured by a surface stress meter according to ASTM C1279.

15. The laminate of claim 1, wherein the first sag depth is within 10% of the second sag depth.

16. The laminate of claim 1, wherein a shape deviation between the first glass layer and the second glass layer is +5 mm or less as measured by an optical three-dimensional scanner.

17. The laminate of claim 1, wherein at least one of the first major surface or the fourth major surface comprises an optical distortion of less than 200 millidiopters as measured by an optical distortion detector using transmission optics according to ASTM 1561.

18. The laminate of claim 1, wherein the first glass layer comprises a first viscosity at 630° C. and the second glass layer comprises a second viscosity at 630° C. and the first viscosity is greater than the second viscosity.

19. The laminate of claim 1, wherein a viscosity of the first glass layer at 630° C. is in a range from $2\times10^{10}$ poises to $1\times10^{13}$ poises.

20. The laminate of claim 19, wherein a viscosity of the second glass layer at 630° C. is in a range from $1\times10^9$ poises to $1\times10^{10}$ poises.

21. The laminate of claim 1, wherein the glass composition is substantially free of $Li_2O$.

22. The laminate of claim 1, wherein the glass composition is substantially free of $B_2O_3$.

* * * * *